United States Patent
Katagi et al.

(10) Patent No.: US 9,343,905 B2
(45) Date of Patent: May 17, 2016

(54) POWER CONTROL DEVICE, POWER MANAGEMENT DEVICE AND POWER MANAGEMENT SYSTEM

(75) Inventors: Masanobu Katagi, Kanagawa (JP); Masakazu Ukita, Kanagawa (JP); Shiho Moriai, Kanagawa (JP); Asami Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1024 days.

(21) Appl. No.: 13/482,369

(22) Filed: May 29, 2012

(65) Prior Publication Data

US 2012/0310428 A1 Dec. 6, 2012

(30) Foreign Application Priority Data

Jun. 3, 2011 (JP) .................................. 2011-125379

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 13/02 | (2006.01) |
| G05B 19/18 | (2006.01) |
| H02J 3/32 | (2006.01) |
| H02J 3/00 | (2006.01) |
| H04L 29/06 | (2006.01) |

(52) U.S. Cl.
CPC . *H02J 3/32* (2013.01); *H02J 3/008* (2013.01); *H04L 63/0435* (2013.01); *H04L 63/0869* (2013.01); *Y04S 40/24* (2013.01); *Y04S 50/10* (2013.01)

(58) Field of Classification Search
CPC ......... Y04S 10/14; Y04S 10/24; Y04S 40/12; Y04S 40/24; Y04S 50/10; G05B 15/00; H02J 2003/001; H02J 3/32; H02J 3/008; H04L 63/0869; H04L 63/0435
USPC ............... 700/286, 295, 297, 298; 307/48, 66
See application file for complete search history.

(56) References Cited

U.S. PATENT DOCUMENTS

| | | | | |
|---|---|---|---|---|
| 8,080,898 B2 * | 12/2011 | Fukuhara | .................. | H02J 3/32 307/44 |
| 8,405,354 B2 * | 3/2013 | Sakakibara | ............... | H02J 3/32 320/109 |
| 8,456,878 B2 * | 6/2013 | Min | ......................... | H02J 3/32 323/222 |
| 8,560,135 B2 * | 10/2013 | Tomita | ...................... | H02J 3/32 700/291 |
| 8,716,891 B2 * | 5/2014 | Choi | ......................... | H02J 3/32 307/71 |
| 8,901,893 B2 * | 12/2014 | Shigemizu | ................ | H02J 3/32 320/134 |
| 8,975,859 B2 * | 3/2015 | Takehara | .............. | H01M 10/44 320/101 |

(Continued)

FOREIGN PATENT DOCUMENTS

JP 2002-233053 A 8/2002

*Primary Examiner* — Ronald Hartman, Jr.
(74) *Attorney, Agent, or Firm* — Hazuki International, LLC

(57) ABSTRACT

A power control device forms energy storage equipment together with a storage battery. The power control device includes: a communication portion that communicates with a power management device, which manages charge and discharge of the storage battery; a power conditioner that supplies electricity to a predetermined destination for supply; a control portion that controls operation of the power conditioner based on instructions from the power management device that are received by the communication portion; and an authentication processing portion that performs authentication processing with the power management device.

5 Claims, 36 Drawing Sheets

(56) References Cited

U.S. PATENT DOCUMENTS

| | | | | |
|---|---|---|---|---|
| 9,035,598 B2* | 5/2015 | Ukita | ...... | H02J 3/008 320/107 |
| 2007/0005192 A1* | 1/2007 | Schoettle | ...... | H02J 9/062 700/286 |
| 2010/0270974 A1* | 10/2010 | Sakakibara | ...... | H02J 3/32 320/132 |
| 2011/0210614 A1* | 9/2011 | Min | ...... | H02J 3/32 307/82 |
| 2011/0238232 A1* | 9/2011 | Tomita | ...... | H02J 3/32 700/291 |
| 2012/0206104 A1* | 8/2012 | Tsuchiya | ...... | B60L 11/1842 320/134 |
| 2013/0049471 A1* | 2/2013 | Oleynik | ...... | H02J 3/01 307/65 |
| 2013/0124000 A1* | 5/2013 | Matsumoto | ...... | H02J 9/062 700/295 |
| 2013/0162037 A1* | 6/2013 | Kim | ...... | H02J 7/0068 307/24 |
| 2014/0042978 A1* | 2/2014 | Nishibayashi | ...... | H02J 7/007 320/134 |
| 2014/0222237 A1* | 8/2014 | Hibiya | ...... | H02J 3/14 700/295 |
| 2015/0194707 A1* | 7/2015 | Park | ...... | H01M 10/4257 429/50 |

\* cited by examiner

FIG.12
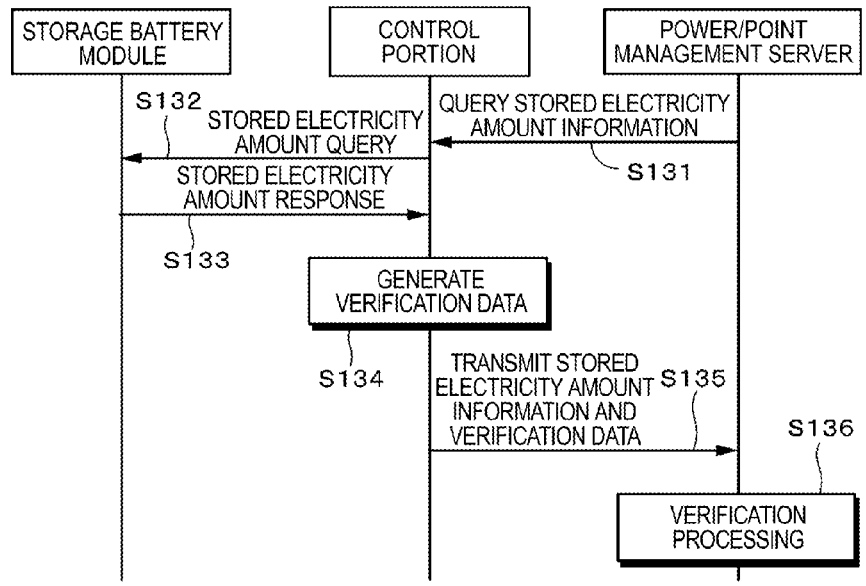
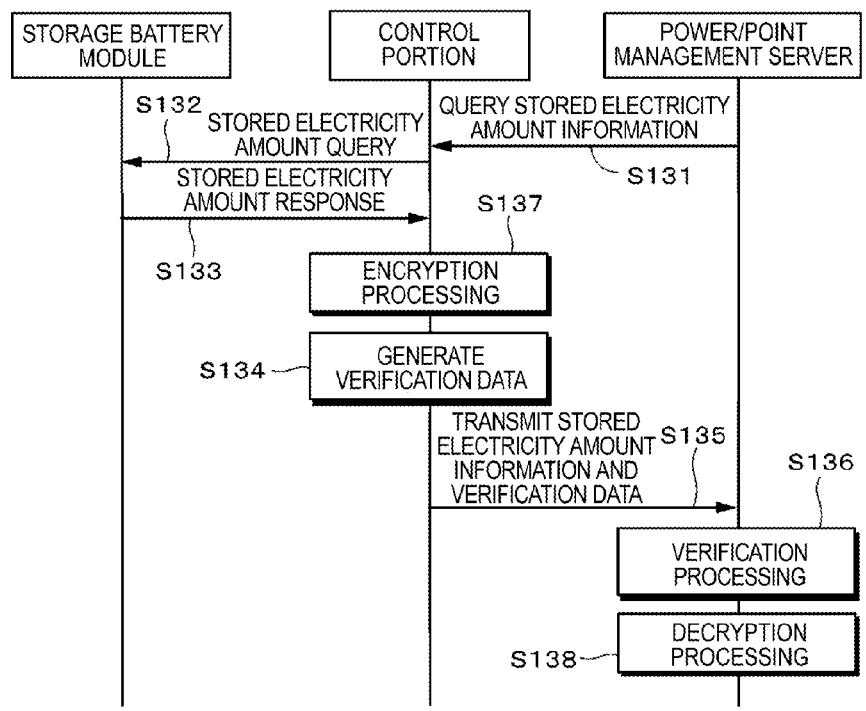

FIG.13
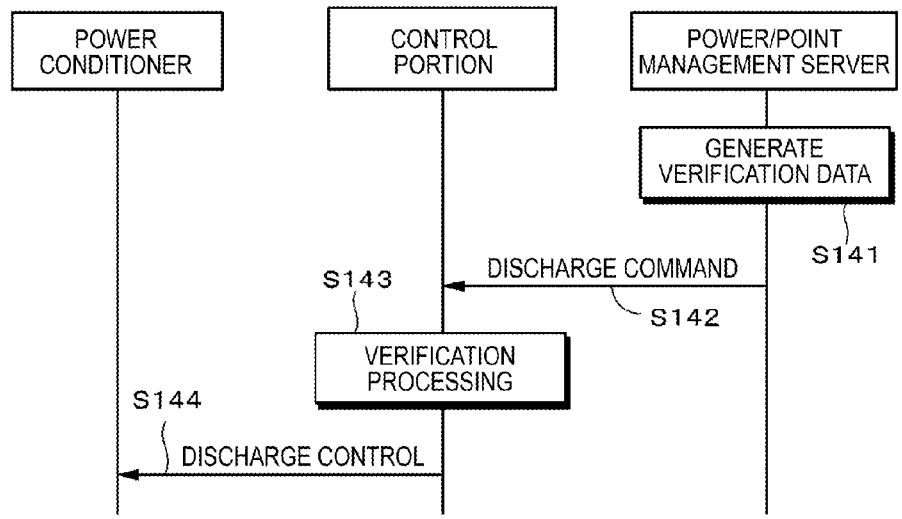
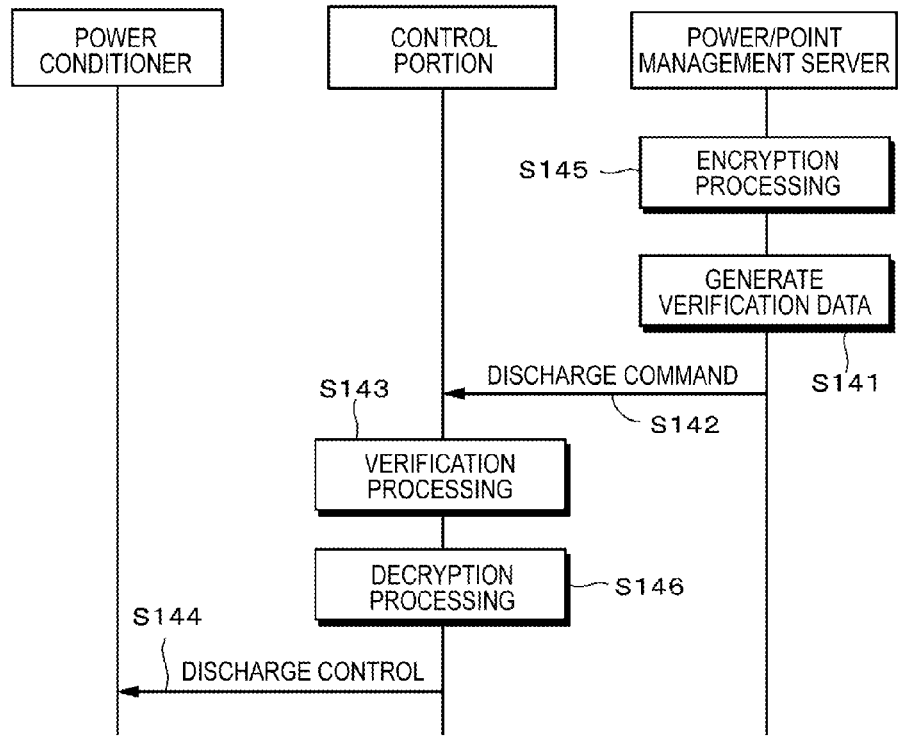

FIG.36

| USER ID | PASSWORD | EQUIPMENT ID |
|---|---|---|
| AAAAA | gugoeuzu34 | 1111111 |
| BBBBB | 5kfieu6593 | 22222222 |
| CCCCC | gk4k398sh | 33333333 |
| DDDDD | ggcidhg4j2 | 44444444 |
| EEEEE | ggdi6fk30d | 55555555 |
| FFFFFF | gxi1i2odpa | 66666666 |

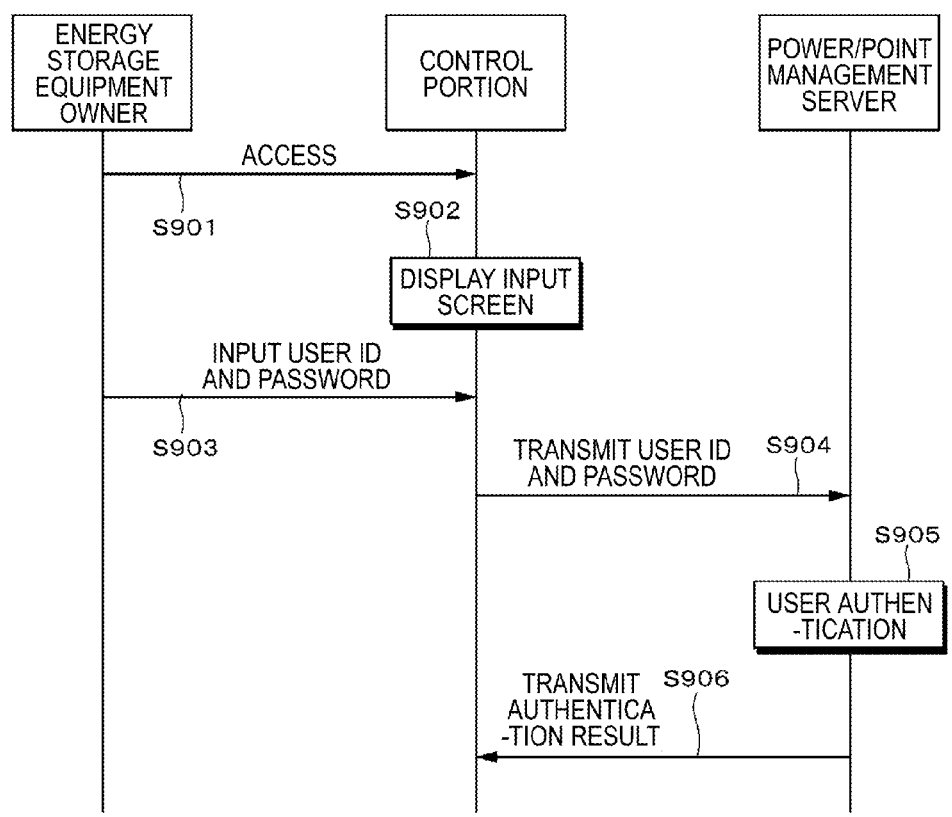

PLEASE INPUT USER ID AND PASSWORD

USER ID:

PASSWORD:

(NEXT)

B

PERFORMING AUTHENTICATION

PLEASE WAIT FOR A MOMENT

C

PLEASE SELECT A COURSE
FROM THE FOLLOWING:

● COURSE A (SALE OF ELECTRICITY BY OWNER IS POSSIBLE)
○ COURSE B (USE OF GENERATED ELECTRICITY IS POSSIBLE IN OWN HOME)
○ COURSE C (SALE OF ELECTRICITY BY OWNER IS POSSIBLE, AND USE OF GENERATED ELECTRICITY IS POSSIBLE IN OWN HOME)

D

USER ID AND PASSWORD ARE INCORRECT

PLEASE INPUT USER ID AND PASSWORD

USER ID:

PASSWORD:

(NEXT)

POWER CONTROL DEVICE, POWER MANAGEMENT DEVICE AND POWER MANAGEMENT SYSTEM

BACKGROUND

The present technology relates to a power control device, a power management device and a power management system.

At present, the use of energy storage equipment is on the increase in corporations and ordinary households etc. The energy storage equipment, which is equipped with storage batteries that can charge and discharge electricity, can obtain power through power generation equipment utilizing natural energies or can store electricity that is purchased from an electricity company.

At the present time, of power that is stored by the energy storage equipment, power that exceeds the power consumed by an owner of the power generation equipment and the energy storage equipment is bought back by an electricity company. In the future, when it is likely that the use of power generation equipment and energy storage equipment will spread even further, along with advancing power deregulation, it is conceivable that there will be an increase in people participating in electricity trading, through trading of electricity in an energy trading market. If there is a high possibility that profits can be obtained through participation in an electricity market, it is thought that there will be an increase in people who adopt power generation equipment and energy storage equipment and attempt to participate in the electricity market.

Here, an energy storage system has been proposed (refer to Japanese Patent Application Publication No. JP-A-2002-233053, for example) in which fluctuations in electricity prices are predicted in accordance with an algorithm, electricity is purchased and stored in energy storage equipment when a low price is predicted, and the electricity stored in the energy storage equipment is sold when a high price is predicted, thus attempting to obtain a profit.

SUMMARY

In the energy storage system disclosed in Japanese Patent Application Publication No. JP-A-2002-233053, as a sale of electricity is performed when the electricity is predicted to have a high price, a person utilizing the energy storage system can expect a profit. Thus, it is possible to offer an incentive not only to corporations etc. but also to general households to adopt power generation equipment and energy storage equipment.

In the energy storage system disclosed in Japanese Patent Application Publication No. JP-A-2002-233053, various pieces of information, such as a purchased electricity amount, a purchase timing, an electricity price, a sold electricity amount etc. are transmitted and received. However, if suitable security measures are not implemented with respect to these pieces of information, there is a risk that the information may be easily read out by a malicious third party and tampered with, and the energy storage system thus misused.

In light of the foregoing, the present technology provides a power control device, a power management device and a power management system that are capable of increasing reliability of energy storage equipment and a management device that manages the energy storage equipment.

To address this, according to a first aspect of the present technology, there is provided a power control device that forms energy storage equipment together with a storage battery and that includes: a communication portion that communicates with a power management device that manages charge and discharge of the storage battery; a power conditioner that supplies electricity to a predetermined destination for supply; a control portion that controls operation of the power conditioner based on instructions from the power management device that are received by the communication portion; and an authentication processing portion that performs authentication processing with the power management device.

According to a second aspect of the present technology, there is provided a power management device that includes: a reception portion that receives stored electricity amount information indicating an amount of stored electricity in a storage battery, the stored electricity amount information being transmitted from a power control device that forms energy storage equipment together with the storage battery; a point issuing portion that issues points with respect to each of the energy storage equipment in accordance with the amount of stored electricity indicated by the stored electricity amount information; and an identification information database that stores identification information corresponding to the power control device.

According to a third aspect of the present technology, there is provided a power control device that forms energy storage equipment together with a storage battery and that includes: a reception portion that receives instructions from a power management device that manages charge and discharge of the storage battery; a power conditioner that supplies electricity to a predetermined destination for supply; a control portion that controls operation of the power conditioner based on the instructions from the power management device; an identifier generation portion that generates a predetermined identifier; and a transmission portion that transmits stored electricity amount information indicating an amount of stored electricity in the storage battery together with the identifier to the power management device.

According to a fourth aspect of the present technology, there is provided a power management device that includes: a reception portion that receives stored electricity amount information indicating an amount of stored electricity in a storage battery and a predetermined identifier, the stored electricity amount information and the predetermined identifier being transmitted from a power control device that forms energy storage equipment together with the storage battery; a point issuing portion that performs a query, with respect to the power control device, about the stored electricity amount information indicating the amount of stored electricity in the storage battery, and issues points with respect to each of the energy storage equipment in accordance with the amount of stored electricity indicated by the stored electricity amount information; and an identifier verification portion that verifies validity of the stored electricity amount information based on the identifier.

According to a fifth aspect of the present technology, there is provided a power control device that forms energy storage equipment together with a storage battery and that includes: a reception portion that receives instructions from a power management device that manages charge and discharge of the storage battery; a power conditioner that supplies electricity to a predetermined destination for supply; a control portion that controls operation of the power conditioner based on the instructions from the power management device; a power determination portion that determines whether an amount of stored electricity in the storage battery and a supply power amount from the power conditioner to the storage battery satisfy predetermined conditions; and a transmission portion that transmits, to the power management device, stored electricity amount information indicating the amount of stored electricity in the storage battery and determination result information indicating a determination result by the power determination portion.

According to a sixth aspect of the present technology, there is provided a power management device that includes a reception portion that receives stored electricity amount information and determination result information transmitted from a power control device, and a point issuing portion that issues points with respect to each of energy storage equipment in accordance with an amount of stored electricity indicated by the stored electricity amount information when the determination result information satisfies predetermined conditions. The power control device forms the energy storage equipment together with a storage battery and includes: a reception portion that receives instructions from the power management device that manages charge and discharge of the storage battery; a power conditioner that supplies electricity to a predetermined destination for supply; a control portion that controls operation of the power conditioner based on the instructions from the power management device; a power determination portion that determines whether an amount of stored electricity in the storage battery and a supply power amount from the power conditioner to the storage battery satisfy the predetermined conditions, and a transmission portion that transmits, to the power management device, the stored electricity amount information indicating the amount of stored electricity in the storage battery and the determination result information indicating a determination result by the power determination portion.

According to a seventh aspect of the present technology, there is provided a power control device that forms energy storage equipment together with a storage battery and that includes: a reception portion that receives instructions from a power management device that manages charge and discharge of the storage battery; a power conditioner that is connected to a discharge meter and that supplies electricity to a predetermined destination for supply, the discharge meter measuring an amount of discharge to a power network; a control portion that controls operation of the power conditioner based on the instructions from the power management device; and a power determination portion that determines whether an amount of electricity output from the power conditioner to the discharge meter and the amount of electricity that is output to the power network via the discharge meter satisfy predetermined conditions.

According to an eighth aspect of the present technology, there is provided a power management device that includes a reception portion that receives stored electricity amount information indicating an amount of stored electricity in a storage battery, the stored electricity amount information being transmitted from a plurality of power control devices that each form, together with the storage battery, energy storage equipment. The power management device also includes: a point issuing portion that performs a query, with respect to the plurality of power control devices, about the stored electricity amount information, and issues points with respect to each of the power control devices in accordance with the amount of stored electricity indicated by the stored electricity amount information that is received by the reception portion; and a query control portion that controls the query by the point issuing portion about the stored electricity amount information.

According to a ninth aspect of the present technology, there is provided a power management device that includes: a reception portion that receives stored electricity amount information indicating an amount of stored electricity in a storage battery, the stored electricity amount information being transmitted from a power control device that forms energy storage equipment together with the storage battery; a point issuing portion that issues points with respect to each of the energy storage equipment in accordance with the amount of stored electricity indicated by the stored electricity amount information; a software database that stores software; a verification data generation portion that generates tampering verification data that is used to verify whether software supplied to the power control device, from among the software stored in the software database, has been tampered with; and a software supply portion that supplies the tampering verification data and the software stored in the software database to the power control device.

According to a tenth aspect of the present technology, there is provided a power control device that forms energy storage equipment together with a storage battery and that includes: a reception portion that receives instructions from a power management device that manages charge and discharge of the storage battery; a power conditioner that supplies electricity to a predetermined destination for supply; a control portion that controls operation of the power conditioner based on the instructions from the power management device; an input portion that receives an input of authentication information from a user; and a transmission portion that transmits the authentication information to the power management device.

According to an eleventh aspect of the present technology, there is provided a power management device that includes: a communication portion that receives stored electricity amount information and authentication information that are transmitted from a power control device that forms energy storage equipment together with a storage battery, the stored electricity amount information indicating an amount of stored electricity in the storage battery and the authentication information being input on the power control device by a user; a point issuing portion that issues points for each of the energy storage equipment in accordance with the amount of stored electricity indicated by the stored electricity amount information; and a user authentication portion that performs authentication of the user based on the authentication information.

According to a twelfth aspect of the present technology, there is provided a power management system that includes: a power control device, which forms energy storage equipment together with a storage battery; and a power management device. The power control device includes: a first communication portion that communicates with the power management device and transmits stored electricity amount information indicating an amount of stored electricity in the storage battery; a power conditioner that supplies electricity to a predetermined destination for supply; a control portion that controls operation of the power conditioner; and a first authentication processing portion that performs authentication processing with the power management device. The power management device includes: a second communication portion that communicates with the power control device and receives the stored electricity amount information; a point issuing portion that issues points for each of the energy storage equipment in accordance with the amount of stored electricity indicated by the stored electricity amount information; and a second authentication processing portion that performs the authentication processing with the power control device.

According to the present technology, it is possible to enhance reliability of a power control device and energy storage equipment and of a power management device that

BRIEF DESCRIPTION OF THE DRAWINGS

FIG. 12A is a sequence diagram showing processing when the tampering verification processing is applied to transmission and reception of stored electricity amount information;

FIG. 12B is a sequence diagram showing processing when encryption processing is additionally applied to the processing shown in FIG. 12A;

FIG. 13A is a sequence diagram showing processing when the tampering verification processing is applied to transmission and reception of commands between the power/point management server and the power control device;

FIG. 13B is a sequence diagram showing processing when the encryption processing is additionally applied to the processing shown in FIG. 13A;

FIG. 36 is a diagram showing a configuration of a user authentication table;

FIG. 37 is a sequence diagram showing a flow of user authentication processing; and FIGS. 38A-38D are diagrams showing examples of a screen which is displayed on a display portion in the user authentication processing.

DETAILED DESCRIPTION OF THE EMBODIMENT(S)

Figure 1:
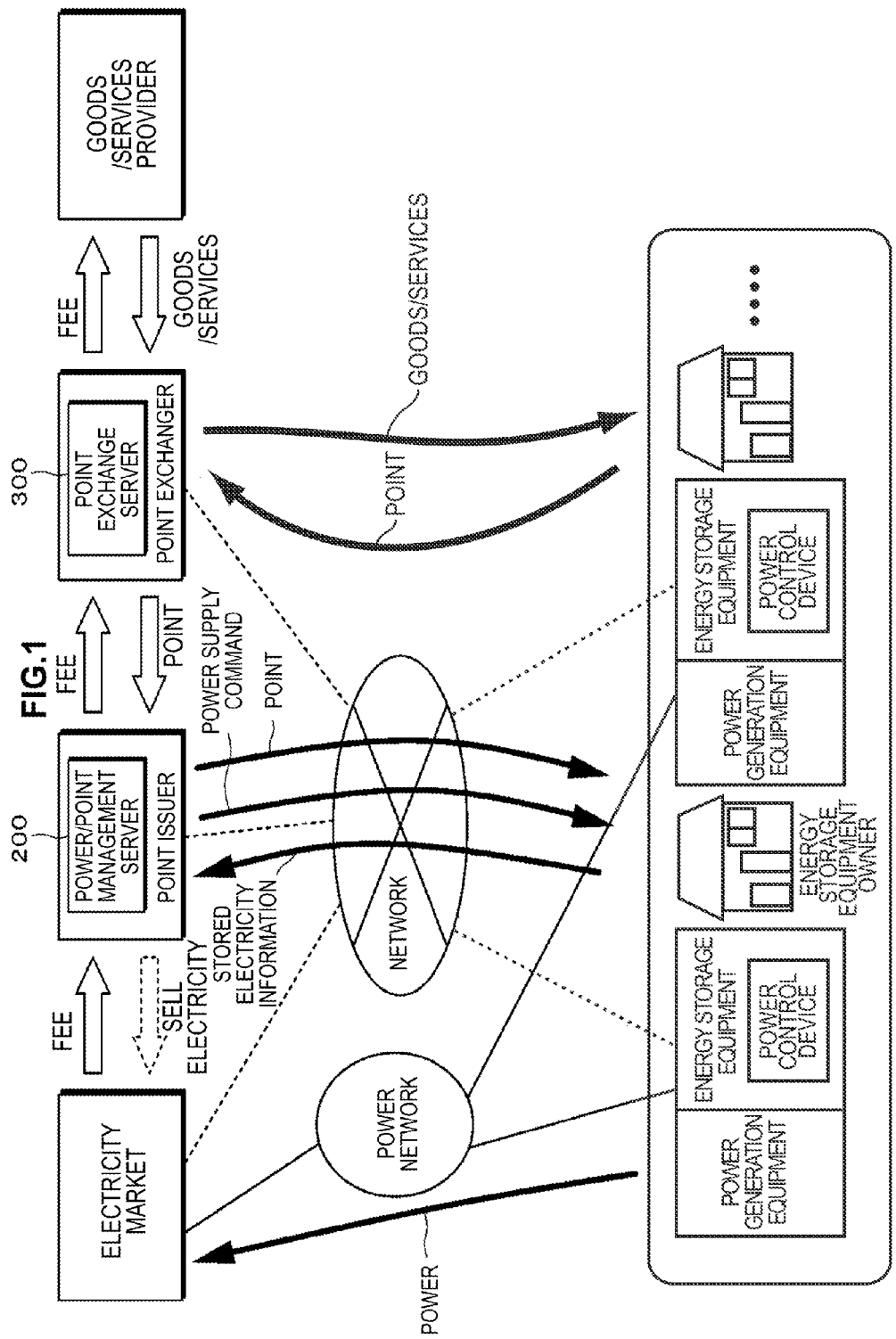
FIG. 1 is a diagram showing an overall configuration of a power management system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. Configuration of power management system
1.1 Configuration of power management system
1.2 Configuration of power control device, energy storage equipment and power generation equipment
1.3 Configuration of power/point management server and point exchange server
1.4 Processing by power/point management server: power management processing
1.5 Processing by power/point management server: point issuing processing
1.6 Processing by power control device
2. Security problems in power management system
3. First embodiment
3.1 Configuration of power control device
3.2 Configuration of power/point management server
3.3 Authentication processing
3.4 Verification processing
4. Second embodiment
4.1 Configuration of power/point management server
4.2 Configuration of power control device
4.3 Processing according to second embodiment
5. Third embodiment
5.1 Configuration of power control device
5.2 Configuration of power/point management server
5.3 Processing according to third embodiment
6. Fourth embodiment
6.1 Configuration of power control device
6.2 Processing according to fourth embodiment
6.3 First modified example of fourth embodiment
6.4 Second modified example of fourth embodiment
7. Fifth embodiment
7.1 Configuration of power control device
7.2 Processing according to fifth embodiment
7.3 Modified example of fifth embodiment
8. Sixth embodiment
9. Seventh embodiment
10. Eighth embodiment
11. Ninth embodiment
11.1 Configuration of power/point management server
11.2 Processing according to ninth embodiment
12. Effects of present technology
13. Modified examples 1. Configuration of Power Management System 1.1 Configuration of Power Management System FIG. 1 is a diagram showing an overall configuration of a power management system according to the present technology. The power management system is connected to power generation equipment 40. The power management system includes a power control device 10 that forms energy storage equipment 100 and a power/point management server 200. The power/point management server 200 issues points in accordance with an instruction of a power supply destination by the energy storage equipment 100, and in accordance with an amount of electricity stored in the energy storage equipment 100. The power/point management server 200 corresponds to a power management device within the scope of the appended claims.

The power management system according to the present technology is a system that intends to obtain higher profits by purchasing electricity from an electricity market when an electricity price is low in the electricity market, such as at night etc. and storing the electricity, and by selling the electricity to the electricity market when the electricity price is high. Additionally, profits are obtained by charging the energy storage equipment 100 utilizing electricity obtained from the power generation equipment 40, and by selling the electricity on the electricity market.

The electricity market is a market that is formed by energy trading between persons wishing to sell electricity and persons wishing to purchase electricity. Previously, public electricity companies monopolized the supply of electricity in each region, but in recent years, there has been an increase in movement towards deregulation so that electricity can be freely bought and sold by persons other than existing electricity companies.

The energy storage equipment 100 has a storage battery module that can store electricity, and is equipment for energy storage that is capable of charging and discharging electricity. The energy storage equipment 100 is installed in a private household, in collective housing such as an apartment block, or in buildings and facilities of companies or various organizations. The energy storage equipment 100 is provided with the power control device 10 that performs power control, such as charging the storage battery module and discharging electricity from the storage battery module. The energy storage equipment 100 is connected to a power network, and performs charging using power from the power network and discharging to the power network in accordance with management by the power/point management server 200. The energy storage equipment 100 and the power control device 10 will be explained in detail later. Note that, in the following explanation, a party that owns the energy storage equipment 100 will be referred to as an energy storage equipment owner, irrespective of owner type, such as a corporation or a private household etc.

The power/point management server 200 is connected to the power control device 10 via a network, and is a server that issues points with respect to each energy storage equipment owner in accordance with an amount of electricity stored in the energy storage equipment 100. In addition, the power/point management server 200 is connected to the electricity market via a network, and also acquires an electricity price in the electricity market. Based on that electricity price, the power/point management server 200 issues power supply commands to the power control device 10 to perform charging or discharging of electricity etc. The charging of the energy storage equipment 100 is performed using electricity obtained from the power generation equipment 40, and electricity is sold to the electricity market by discharging electricity from the energy storage equipment 100. Further, the charging of the energy storage equipment 100 may be performed by purchasing electricity from the electricity market based on the management by the power/point management server 200.

The power/point management server 200 is installed in a building or facility of a company or an operator (hereinafter referred to as a point issuer) that provides a point service to the energy storage equipment owner. Electricity is stored in the energy storage equipment 100 owned by the energy storage equipment owner, but buying and selling of electricity by the charging and discharging of the energy storage equipment 100 is performed based on the management by the power/point management server 200. Therefore, the point issuer is responsible for the electricity trading on the electricity market. The point issuer sells the electricity from the power generation equipment 40 and the electricity stored by the energy storage equipment 100 on the electricity market, and acquires a fee in accordance with the electricity price in the electricity market, thus obtaining a profit. It is preferable for the power/point management server 200 to have a plurality of the energy storage equipment under its management.

As the buying and selling of the electricity is performed based on the management of the power/point management server 200, the energy storage equipment owner can participate in the electricity market without concern for the electricity price in the electricity market. Points are awarded by the power/point management server 200 in accordance with the amount of electricity stored in the energy storage equipment 100. As will be explained later, these points can be exchanged for goods and services and the energy storage equipment owner can obtain a profit in this way. In this way, with the present technology, the points act just like currency in accordance with the amount of electricity stored.

Note that an individual contract may be concluded between the energy storage equipment owner and the point issuer. For example, the contract may establish whether or not the electricity obtained from the power generation equipment 40 and the electricity stored in the storage battery module can be used by the energy storage equipment owner as power to operate his or her own electrical devices (hereinafter referred to as home consumption), whether or not the energy storage equipment owner can sell electricity freely of his or her own will, whether or not charging of the storage battery module can be performed using late-night electricity when the electricity price is cheap, and so on.

Further, it is preferable for the contract to establish which command takes priority when a command from the power/point management server 200 to charge or discharge electricity is issued while the power is being used for home consumption on the command of the energy storage equipment owner, or while electricity is being sold at the will of the energy storage equipment owner. In addition, it is preferable for the contract to establish whether or not the energy storage equipment owner can perform charging or discharging of electricity at his or her own will when a command is issued by the power/point management server 200 to stop operation of the energy storage equipment 100.

This type of individual contract between the energy storage equipment owner and the point issuer is concluded, for example, by the point issuer presenting a plurality of contracts to the energy storage equipment owner and by the energy storage equipment owner selecting one of the contracts.

The power management system is configured in the manner described above, and, in the power management system, in order to use the points issued to the energy storage equipment owner, it is preferable for there to be a point exchanger and a goods/services provider.

The point exchanger is a party that opens an exchange at which the points held by the energy storage equipment owner can be exchanged with the goods and services provided by the goods/services provider, and thus exchanges the points for the goods and services in accordance with the wishes of the energy storage equipment owner. The exchange may be an actual store or commercial facility, or may provide goods and services through electronic information exchange, such as by an electronic trading server or the like.

The point exchanger obtains a fee from the point issuer by ceding, to the point issuer, the points that are held by the point exchanger as a result of the trade of the points for the goods and services. In this way, the point exchanger can obtain a profit. An exchange rate between the points and the fee may be established in advance between the point issuer and the point exchanger. It should be noted that the point issuer and the point exchanger can be the same party. In this case, the exchange of the fee for the points is not necessary.

The goods/services provider provides the goods and services to the point exchanger. When the point exchanger exchanges the points held by the energy storage equipment owner for the goods and services, the goods/services provider receives, from the point exchanger, a fee that corresponds to the exchanged points. In this way, the goods/services provider can obtain a profit.

The goods and services are goods and services that provide a physical or emotional effect or satisfaction, among which tangible entities are the goods, and intangible entities, of which nothing remains after sale and purchase, are the services.

The goods include, for example, commodities, vouchers and the like. More specifically, the commodities are, for example, everyday necessities, household electrical appliances, electronic devices, foodstuffs and the like. The vouchers are, for example, gift certificates, beer certificates, travel tickets, book tokens, air tickets, tickets to events and so on. The services include leisure services, medical services, accommodation services, educational services, transportation services, dining out services, consultancy services and so on. In addition, it may be possible to exchange the points for points of other point services, such as mileage points and the like. The goods and services are not limited to the above-described examples, and may be anything that is an object of economic trading.

The number of points necessary in exchange for the various goods and services provided by the goods/services provider may be determined by the goods/services provider based on the exchange rate between the points and the fee, the exchange rate being established between the point issuer and the point exchanger. Note that the goods/services provider and the point exchanger may be the same party. Furthermore, the goods/services provider, the point issuer and the point exchanger may be the same party.

In addition, in the above explanation of the point exchanger, the goods and services are provided to the energy storage equipment owner via the point exchanger. However, a method of providing the goods and services is not limited to the above example. For example, when the goods/services provider owns and manages an actual store or business facility etc., the energy storage equipment owner may visit the store etc. and the energy storage equipment owner may exchange points with the goods/services provider for the goods and services on sale at the store etc. Then, the goods/services provider may pass on the points obtained through the point exchange to the point issuer and may receive a fee that accords with the number of points.

When the goods and services exchange is the electronic trading server, the goods and services may be directly provided to the energy storage equipment owner from the goods/services provider. The goods may be, for example, content that can be provided via a network, such as video, music, electronic books and the like. In this case, these goods may be provided directly from the goods/services provider to the energy storage equipment owner via the network.

Figure 2:
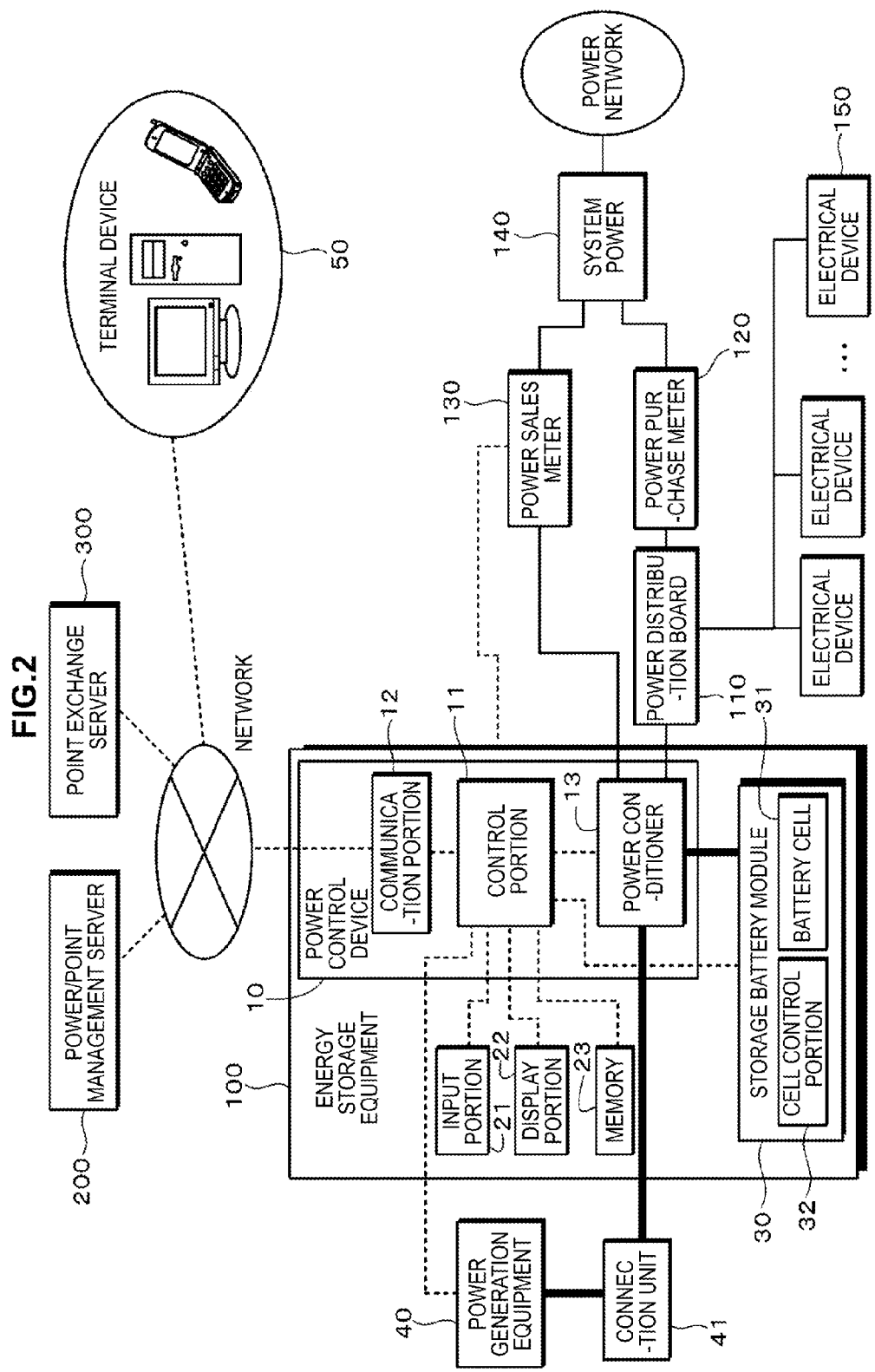
FIG. 2 is a block diagram showing a configuration of energy storage equipment that is provided with a power control device.

1.2 Configuration of Power Control Device, Energy Storage Equipment and Power Generation Equipment Next, a configuration of the power control device 10 and the energy storage equipment 100 will be explained. FIG. 2 is a block diagram showing the configuration of the power control device 10 and the energy storage equipment 100. Note that the power generation equipment 40 that performs power generation is connected to the energy storage equipment 100, but the power control device 10 and the energy storage equipment 100 can function without the power generation equipment 40. In FIG. 2, among lines connecting each of the blocks, thick lines indicate DC power lines, thin lines indicate AC power lines and broken lines indicate transmission lines for control signals and information signals.

The energy storage equipment 100 is formed of the power control device 10 and a storage battery module 30. The storage battery module 30 includes a battery cell 31 that stores electricity and a cell control portion 32 that performs management control of the battery cell 31. The battery cell 31 may adopt any form of battery as long as it can be charged and discharged, such as a lithium-ion secondary battery, a lithium-ion polymer secondary battery and a nickel hydrogen battery etc. Note that, in FIG. 2, the battery cell 31 is shown by one block, but a number of the battery cells 31 is not limited to one, and a plurality of battery cells 31 may be used. The cell control portion 32 includes, for example, a central processing unit (CPU), a random access memory (RAM), a read only memory (ROM), and a sensor etc. that manages a state (temperature, amount of electricity stored etc.) of the battery cell 31. The cell control portion 32 measures the amount of electricity stored in the storage battery module 30. Further, along with performing management of the battery cell 31, the cell control portion 32 transmits, to a control portion 11 of the power control device 10, information indicating the state of the battery cell 31.

The power control device 10 includes the control portion 11, a communication portion 12 and a power conditioner 13. The power control device 10 performs power control of the energy storage equipment 100, such as charging and discharging, in accordance with the management of the power/point management server 200 that is installed on the point issuer side.

The control portion 11 is connected to the communication portion 12 and the power conditioner 13. The control portion 11 is formed, for example, of a CPU, a RAM and a ROM. Programs read by the CPU are stored in the ROM. The RAM is used as a work area of the CPU. The CPU executes various processing based on the programs stored in the ROM, and thus performs control of the whole power control device 10.

In addition, the power control device 10 transmits control signals in response to commands from the power/point management server 200 that are received by the communication portion 12. The commands include a command that instructs charging (hereinafter referred to as a charge command), a command that instructs discharging (hereinafter referred to as a discharge command) and a command that, when there is no input and output of electricity into and out of the storage battery module 30, instructs the electricity generated by the power generation equipment 40 to be directly discharged or applied to home consumption (hereinafter referred to as a stop command). The power control device 10 also performs mode switching control in the power conditioner 13.

Furthermore, the control portion 11 is connected to the power generation equipment 40 and, by communicating with the power generation equipment 40, the control portion 11 acquires an amount of electricity generated by the power generation equipment 40, verifies an operation status of the power generation equipment 40 and so on.

The communication portion 12 functions as a reception portion and a transmission portion, and is, for example, a network interface that performs communication with the power/point management server 200 of the point issuer via a network such as the Internet, a dedicated line or the like, based on a specific protocol. Any type of communication method may be used, such as communication using wired communication, a wireless local area network (LAN), wireless fidelity (Wi-Fi), a 3G line and so on. The power control device 10 receives the charge command, the discharge command and the stop command transmitted from the power/point management server 200 via the communication portion 12.

In addition, based on the control by the control portion 11, the communication portion 12 transmits, to the power/point management server 200, stored electricity amount information, which indicates an amount of electricity stored in the storage battery module 30. Note that the stored electricity amount information is generated and transmitted in response to a command from a point issuing portion 223 of the power/point management server 200 that queries the stored electricity amount information.

Further, the communication portion 12 performs communication via the network with a terminal device 50 that is owned by the energy storage equipment owner, such as a personal computer, a smart phone, a mobile telephone or the like. In this way, the energy storage equipment owner can check a stored electricity status, a discharge status etc. or can perform operation mode settings etc. when away from home.

Furthermore, the communication portion 12 may be connected, via the network, to a server of an electricity company in the electricity market, or to a server of a broker etc. who mediates in electricity trading on the electricity market, and the communication portion 12 may acquire information about electricity price in the electricity market. In addition, based on the control of the control portion 11, the communication portion 12 may perform communication with the server of the electricity company that is necessary to the electricity trading, such as issuing a sell order to the electricity market.

The power conditioner 13 is connected by a DC power line to the storage battery module 30. Additionally, the power conditioner 13 is connected by an AC power line to a system power 140, via a power distribution board 110 and a power purchase meter 120. Furthermore, the power conditioner 13 is connected by an AC power line to the system power 140 via a power sales meter 130.

The power conditioner 13 is provided with a two-way inverter and converts alternating current power from the system power 140 to direct current power and outputs the direct current power to the storage battery module 30. The storage battery module 30 is charged in this way. In addition, it is also possible to charge the storage battery module 30 by supplying the power obtained through power generation by the power generation equipment 40 to the storage battery module 30. Further, direct current power that is taken from the storage battery module 30 is converted to alternating current power and output to the system power 140 via the power sales meter 130. The storage battery module 30 is discharged in this way. Note that the power conditioner 13 can measure an amount of electricity supplied to the storage battery module 30 and to the power sales meter 130.

The power conditioner 13 operates in three modes, namely, a mode to store electricity in the storage battery module 30 (a charge mode), a mode to discharge electricity from the storage battery module 30 (a discharge mode), and a mode in which the storage battery module 30 is not charged or discharged (a stop mode). Switching of the operation modes of the power conditioner 13 is performed by a control signal from the control portion 11. The power conditioner 13 measures the amount of electricity discharged when electricity is discharged from the storage battery module 30, and measures the amount of electricity stored when the storage battery module 30 is charged.

In the present embodiment, charging is performed by purchasing electricity by supplying electricity from the power network to the storage battery module 30. Further, electricity is sold by transmitting, to the power network via the system power 140, electricity taken from the storage battery module 30 by the power conditioner 13.

It should be noted that, when electricity is sold by the output of the electricity from the power conditioner 13 to the system power 140, the amount of the electricity output (the amount of electricity sold) to the system power 140 from the power conditioner 13 is measured by the power sales meter 130. Along with measuring the amount of electricity, the power sales meter 130 may also measure a time at which the measurement is performed. The power sales meter 130 is connected to the control portion 11, and the measured amount of electricity sold is notified to the control portion 11. Note that, in order to secure the reliability of measurement results of the power sales meter 130, specific authentication or the like may be conducted in advance by the point issuer.

It is preferable that the power conditioner 13 be provided with power meters (sensors) that measure the electricity that passes through the DC power line between the power conditioner 13 and the storage battery module 30, and the electricity that passes through the DC power line connecting the power conditioner 13 and the power generation equipment 40. The control portion 11 can also acquire stored electricity amount data and generated electricity amount information from the measurement results by the power meters of the power conditioner 13.

The power control device 10 is configured in the manner described above, and an input portion 21, a display portion 22 and a memory 23 are further connected to the control portion of the power control device 10. The input portion 21 is an input device that is used for a user to input instructions to the power control device 10. The input portion 21 is, for example, a touch screen that is integrally formed with the display portion 22, or is formed of buttons, switches or a dial etc. When an input is made on the input portion 21, a control signal corresponding to the input is generated and output to the control portion 11. Then, the control portion 11 performs arithmetic processing and control in response to the control signal.

The display portion 22 is a display device that is formed, for example, from a liquid crystal display (LCD), a plasma display panel (PDP), an organic electro-luminescence (EL) panel and so on. Various information is displayed on the display portion 22, such as a charge state and discharge state of the energy storage equipment 100, points awarded from the point issuer, information of the contract between the energy storage equipment owner and the point issuer etc.

The memory 23 is a storage medium that is formed of a hard disk, a flash memory or the like. The memory 23 stores and holds point information representing the points issued by the point issuer, contract information representing content of the contract between the energy storage equipment owner and the point issuer and authentication information that is used in authentication with the power/point management server 200 and so on. The point information and the contract information etc. stored in the memory 23 are displayed on the display portion 22. As a result, the energy storage equipment owner can check how many points he or she currently holds, a history of point increases or decreases in the past, and contract content etc. The contract information stored in the memory 23 is, for example, information that indicates whether the power control device 10 prioritizes an instruction from the energy storage equipment owner or an instruction from the power/point management server 200, information about a contract period for use of services by the power management system and so on. The contract information is used in power supply control by the control portion 11.

Note that, when the point issuer and point exchanger are the same corporation or organization etc., and the services relating to the power management system are provided as so-called cloud services over the Internet, the memory 23 is not needed. The above-described various pieces of information are all managed and held on the power/point management server 200 on the point issuer side.

The power control device 10 and the energy storage equipment 100 are configured in the manner described above. Then, in the present embodiment, the power generation equipment 40 is connected to the power conditioner 13 via a connection unit 41.

It is preferable for the power generation equipment 40 to be power generation equipment that uses energies referred to as natural energies or renewable energies that have a low environmental load. Examples include power generation equipment that utilize solar energy, solar thermal energy, wind energy, hydro energy, micro-hydro energy, tidal energy, ocean wave energy, water thermal energy (using differences in water temperature), ocean current energy, biomass energy, geothermal energy, sound energy or vibration energy etc. Further, the power generation equipment 40 may be equipment that generates power using human power, such as an aerobike that is equipped with power generation functions, or a floor that has a structure in which power is generated by a person walking on it (known as a power generating floor). The power generation equipment 40 is not limited to the power generation equipment utilizing the above-described energies, and may be any power generation equipment as long as it adopts a power generation method that has a low environmental load.

The power obtained from the power generation equipment 40 is supplied to the power conditioner 13 and is used, based on the control of the control portion 11 of the power control device 10, to charge the storage battery module 30, to perform electricity discharge in order to sell the electricity and in home consumption.

Note that a plurality of electrical devices 150 are connected to the power distribution board 110 that is provided between the power conditioner 13 and the system power 140. The power that is obtained from the power generation equipment 40 and the power that is stored in the storage battery module 30 is transmitted to the electrical device 150 via the power conditioner 13 and the power distribution board 110. In this way, the energy storage equipment owner can use the electrical device 150. Further, it is also possible for the energy storage equipment owner to use the electrical device 150 by the power from the system power 140 being transmitted to the electrical device 150 via the power distribution board 110.

In a general household, the electrical device 150 is an electronic device such as a television receiver or an audio device, or a household electric appliance such as a refrigerator, a microwave oven, a washing machine, an air conditioner and so on. In a corporation, the electrical device 150 is a personal computer, a copier, a facsimile machine, a printer, an air conditioner and so on. Additionally, in a store or a business facility etc. the electrical device 150 is a lighting device, an air conditioner, or a transportation device such as an elevator and so on.

Figure 3:
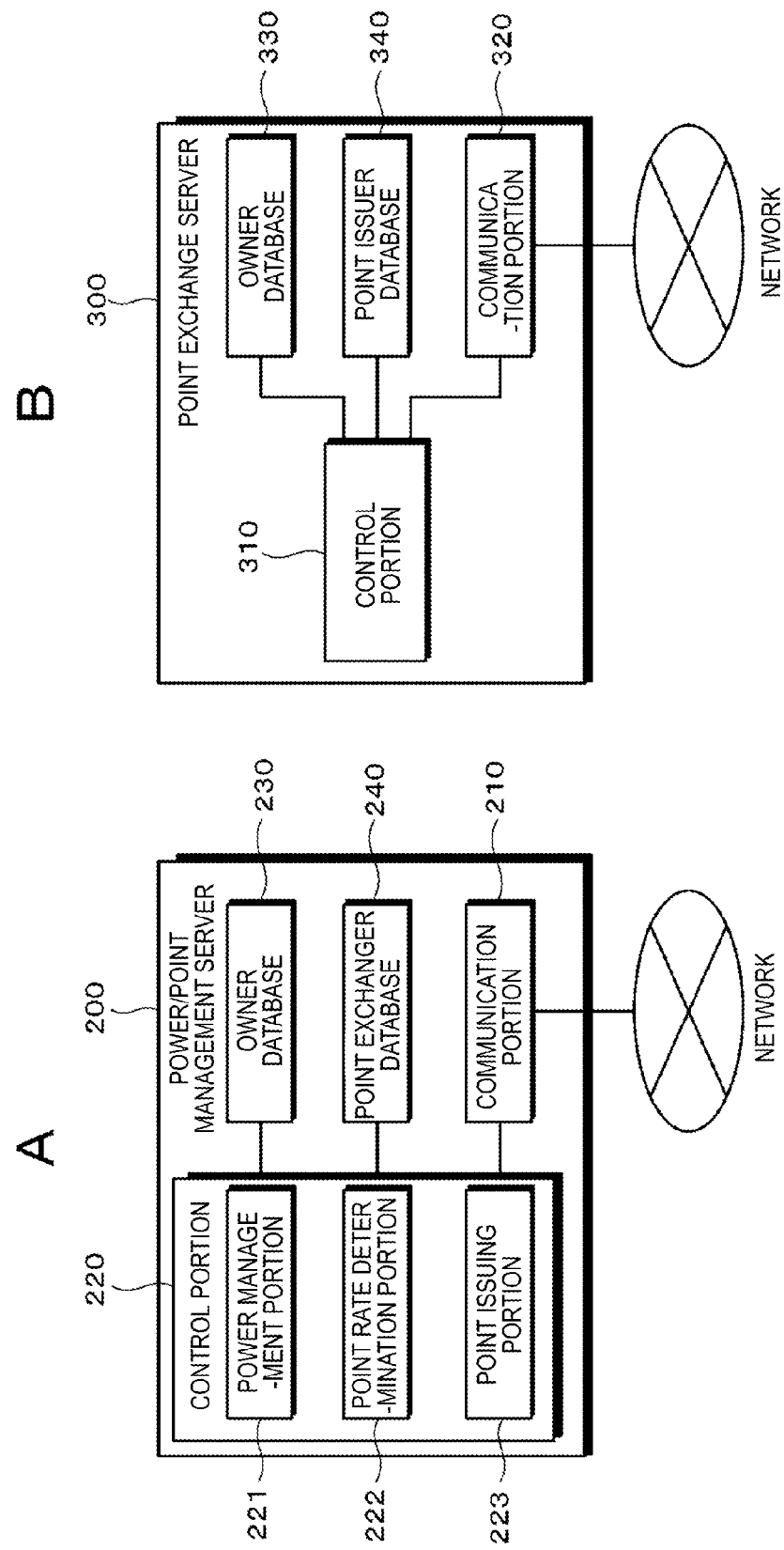
FIG. 3A is a block diagram showing a configuration of a power/point management server.
FIG. 3B is a block diagram showing a configuration of a point exchange server.

1.3 Configuration of Power/Point Management Server and Point Exchange Server Next, the power/point management server 200 used on the point issuer side will be explained. FIG. 3A is a block diagram showing a configuration of the power/point management server 200. The power/point management server 200 includes a communication portion 210, a control portion 220, a power management portion 221, a point rate determination portion 222, a point issuing portion 223, an owner database 230 and a point exchanger database 240.

The communication portion 210 functions as a reception portion and a transmission portion and is, for example, a network interface that performs communication with the energy storage equipment 100 via a network, such as the Internet, based on a specific protocol. Any type of communication method may be used, such as communication using wired communication, a wireless LAN, Wi-Fi, a 3G line and so on. The communication portion 210 transmits, to the power control device 10, the charge command, the discharge command and the stop command, which are issued by the power management portion 221. Additionally, the communication portion 210 transmits the command that queries the stored electricity amount information indicating the amount of the electricity stored in the storage battery module 30.

The communication portion 210 receives the stored electricity amount information, which indicates the amount of electricity stored in the storage battery module 30 and which is transmitted from the power control device 10. Note that the transmission of the stored electricity amount information is performed in response to the query command from the point issuing portion 223 of the power/point management server 200. Further, the communication portion 210 may be connected, via the network, to a server of an electricity company in the electricity market, or to a server of a broker etc. who mediates in electricity trading on the electricity market, and the communication portion 210 may acquire information about the electricity price in the electricity market. In addition, based on the instruction of the power management portion 221, the communication portion 210 may perform communication with the server of the electricity company that is necessary to the electricity trading, such as issuing a sell order to the electricity market.

The control portion 220 is formed, for example, of a CPU, a RAM and a ROM etc. Programs read by the CPU are stored in the ROM. The RAM is used as a work area of the CPU. The CPU executes various processing based on the programs stored in the ROM, and thus performs control of the whole power/point management server 200. In addition, by executing specific programs, the control portion 220 functions as the power management portion 221, the point rate determination portion 222 and the point issuing portion 223.

The power management portion 221 uses electricity price information received by the communication portion 210 and generated electricity amount information, which indicates the amount of electricity generated by the power generation equipment 40, to determine an amount of electricity supplied to the storage battery module 30, a transmission amount to the electricity market, a transmission period, and an amount of electricity applied to home consumption in accordance with specific algorithms, and then issues the charge command, the discharge command and the stop command. The destination for the supply of power is specified by these various commands. When the charge command is issued, the power supply destination is the storage battery module 30. When the discharge command is issued, the power supply destination is the power network, and when the stop command is issued, the power supply destination is the power network or the electrical device. The issued command is transmitted by the communication portion 210 to the power control device 10. Power management processing to perform issuing and transmission of the commands will be explained in detail later.

The point rate determination portion 222 determines a rate (hereinafter referred to as a point rate) between the points awarded to the energy storage equipment owner and the amount of electricity stored in the storage battery module 30 that is represented by the stored electricity amount data. In the present embodiment, the points are awarded to the energy storage equipment owner in accordance with the amount of electricity stored in the storage battery module 30. Point rate information that indicates the point rate is supplied to the point issuing portion 223.

The point issuing portion 223 issues points based on the amount of electricity stored in the storage battery module 30 that is indicated by the stored electricity amount information from the power control device 10, and on the point rate information that is supplied from the point rate determination portion 222. When issuing the points, the point issuing portion 223 first issues, to the power control device 10, a command that queries the stored electricity amount information, in order to acquire the stored electricity amount information to be used as a reference in issuing the points. The issued query command is transmitted to the power control device 10 by the communication portion 210.

The points issued by the point issuing portion 223 are managed per each of the energy storage equipment owners in the owner database 230 etc. Further, point information that indicates the issued points may be transmitted to the power control device 10 via the network. Point rate determination and point management will be explained in more detail later.

The owner database 230 stores owner information that is information relating to the energy storage equipment owner who owns the energy storage equipment 100. The owner information includes, for example, a name, address and telephone number of the energy storage equipment owner, and an energy storage equipment installation address. Note, however, that the owner information is not limited to the above items. Agreement may be obtained with the energy storage equipment owner with regard to the acquisition of information, and the information may include any information that can conceivably be used on the point issuer side.

In addition, the contract information, which indicates content of the contract between the point issuer and the energy storage equipment owner, is also stored in the owner database 230. The power management portion 221 can refer to the contract information when performing the power management processing.

The owner information is, for example, presented in written form or the like by the energy storage equipment owner when concluding the contract between the energy storage equipment owner and the point issuer, and is then stored by being input in the owner database 230 by the point issuer. Further, when the energy storage equipment owner starts use of the power management system, an input screen may be displayed on the display portion 22 that prompts the energy storage equipment owner to input the owner information on the display portion 22 of the power control device 10. When the energy storage equipment owner performs the input using the input portion 21 in accordance with instructions on the input screen, the input owner information is transmitted to the owner database 230 via the network and is stored.

The point exchanger database 240 stores point exchanger information, which is information relating to the point exchanger. The point exchanger information includes, for example, a name of the point exchanger, a company name, an organization name, address, a telephone number and contract content etc. Note, however, that the point exchanger information is not limited to the above items. Agreement may be obtained with the point exchanger with regard to the acquisition of information, and the information may include any information that can conceivably be used on the point issuer side.

The point exchanger information is, for example, presented in written form or the like by the point exchanger when concluding the contract between the point issuer and the point exchanger, and is then stored by being input in the point exchanger database 240 by the point issuer. Further, the point exchanger information may be stored in the point exchanger database 240 by performing transmission and reception via the network. Note that, when the point issuer and the point exchanger are managed by the same corporation or organization etc., the point exchanger information and the point exchanger database 240 are not necessary.

Next, a point exchange server 300 that is used on the point exchanger side will be explained. FIG. 3B is a block diagram showing a configuration of the point exchange server 300. The point exchange server 300 includes a control portion 310, a communication portion 320, an owner database 330 and a point issuer database 340.

The control portion 310 is formed of a CPU, a RAM and a ROM etc., and executes various processing based on programs, and thus performs control of the whole point exchange server 300.

The communication portion 320 is, for example, a network interface that performs communication with the energy storage equipment 100 via a network, such as the Internet, based on a specific protocol. The point exchange server 300 is connected via the network to the energy storage equipment owner. As a result, points, goods and services can be exchanged via the network. It should be noted, however, that when the services relating to the power management system are provided as cloud services, the points are transmitted from the point issuer to the point exchanger based on instructions of the energy storage equipment owner. Further, the goods and services that can be provided via the network (electronic books, music content, video content, various coupons etc.) may be provided by the communication portion 320. Note that, as described above, the points and the goods and services may be exchanged at an actual exchange or the like.

The owner database 330 stores owner information that is information relating to the energy storage equipment owner. The owner information includes, for example, a name, address, telephone number and registration number of the energy storage equipment owner, and a history of goods and services exchanges etc. Note, however, that the owner information is not limited to the above items. Agreement may be obtained with the energy storage equipment owner with regard to the acquisition of information, and the information may include any information that can conceivably be used on the point exchanger side. It should also be noted that the owner information may be shared with that stored in the owner database 230 of the power/point management server 200.

The point issuer database 340 stores point issuer information that is information relating to the point issuer. The point issuer information is, for example, a name of the point issuer, a company name, an organization name, address, a telephone number and contract content etc. Note, however, that the point issuer information is not limited to the above items. Agreement may be obtained with the point issuer with regard to the acquisition of information, and the information may include any information that can conceivably be used on the point exchanger side.

1.4 Processing by Power/Point Management Server: Power Management Processing

Next, processing performed by the power/point management server 200 will be explained. The processing by the power/point management server 200 is divided into power management processing, which instructs the charging of the storage battery module 30 by purchasing electricity or instructs the discharging of electricity from the storage battery module 30 in order to sell electricity, and point issuing processing, which issues points to the energy storage equipment owner.

Figure 4:
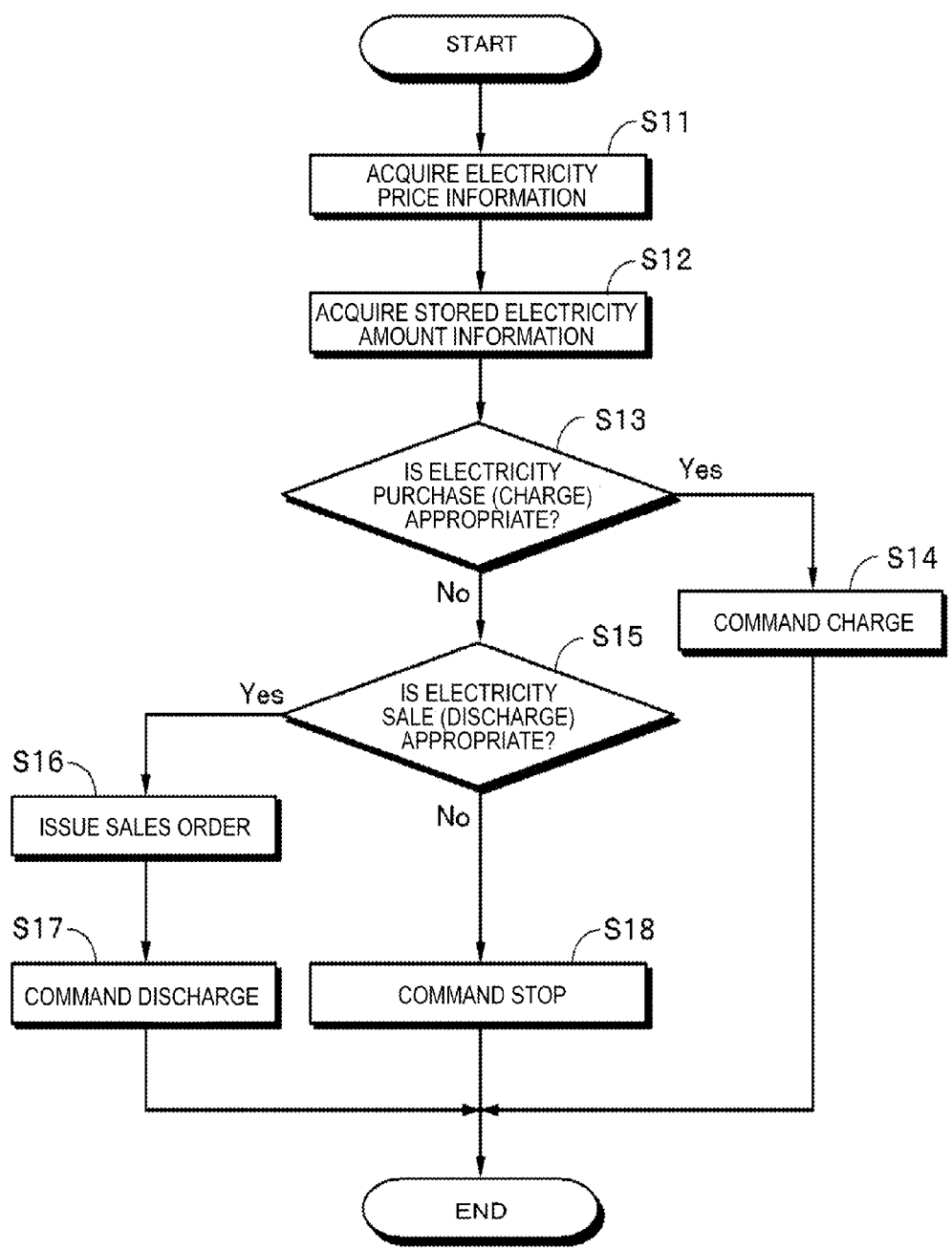
FIG. 4 is a flowchart showing a flow of power management processing that is performed by the power/point management server.

First, the power management processing will be explained. FIG. 4 is a flowchart showing a flow of the power management processing. First, at step S11, information about the electricity price in the electricity market is acquired from a server of an electricity company in the electricity market or from a broker that mediates in electricity trading in the electricity market. At step S12, stored electricity amount data that indicates the amount of electricity stored in the storage battery module 30 is acquired from the power control device 10. Note that the acquisition of the stored electricity amount data is not limited to when the power management processing is performed, and it may be constantly and regularly acquired. In this case, in the power management processing, processing is performed based on the stored electricity amount that is indicated by the latest stored electricity amount data at that point in time.

Next, at step S13, it is determined whether or not it is appropriate to perform charging by purchasing electricity. The determination of whether or not the purchase of electricity is appropriate can be made, for example, by setting a predetermined threshold electricity purchase price in advance and by comparing the electricity price in the electricity market with the threshold electricity purchase price. When the electricity price in the electricity market is lower than the threshold electricity purchase price, it is determined that the purchase of electricity is appropriate. Further, the determination of whether or not the purchase of electricity is appropriate can be made, for example, using a method described hereinafter, as disclosed in Japanese Patent Application Publication No. JP-A-2002-233053.

First, time series data of the electricity price information received at the above-described step S11 is accumulated, fluctuations in the electricity price are analyzed and fluctuations over time are predicted, and an optimum electricity purchase amount and purchase timing are determined. First, by analyzing time series data of past electricity prices, a predicted value in the fluctuation of the electricity price (a reference predicted value) is calculated. A method to predict a future value from the past time series data is, for example, pattern analysis using a neural network. Additionally, in order to perform a highly accurate prediction, a fluctuation sensitivity of the electricity price may be calculated using a correlation of the electricity price when past meteorological information and external factors, such as trends in electricity demand etc., are present, and the calculated fluctuation sensitivity may be incorporated into the prediction. For example, when it is known that the electricity price increases by 1 yen/kWh when the air temperature rises by 1 degree Celcius, the fluctuation sensitivity with respect to that meteorological condition is 1 yen/(kWh·° C.). By incorporating the fluctuation sensitivity into the reference predicted value, the predicted value of the electricity price that takes into account meteorological conditions and external factors, such as trends in electricity demand etc. (a purchase electricity price predicted value) is calculated using the following Formula 1.

Purchase electricity price predicted value=reference predicted value(calculated from time series data)×sensitivity to meteorological conditions× sensitivity to external factors.  [Formula 1]

Further, statistical processing is performed on the calculated purchase electricity price predicted value and the time series data of the past electricity price, and a minimum expected value (an electricity purchase reference price) of the electricity price up to a certain time is calculated. Then, it is determined that the purchase of electricity is appropriate when the electricity price in the electricity market indicated by the electricity price information falls below the electricity purchase reference price. On the other hand, when the electricity price indicated by the electricity price information is higher than the electricity purchase reference price, it is determined that the purchase of electricity is not appropriate.

Note that the algorithm used to determine charging is not limited to the above example, and any algorithm may be used, as long as it is an algorithm that determines the purchase amount and the timing of the purchase based on price fluctuations in the electricity market, on the predicted value of the price fluctuations and on a volume of electricity that can be purchased. For example, a program that is used in automatic buying and selling in another existing market, such as a stock market, can be modified to suit the electricity market and used.

When it is determined at step S13 that the purchase of electricity is appropriate (yes at step S13), the processing advances to step S14. At step S14, the charge command that instructs charging is transmitted to the power control device 10 that is under management. Note that, along with the charging instruction, it is preferable that the charge command also includes instructions with respect to a charging period, an amount of electricity to be stored and so on.

On the other hand, when it is determined at step S13 that the purchase of electricity is not appropriate (no at step S13), the processing advances to step S15. Then, it is determined at step S15 whether or not it is appropriate to sell the electricity. The determination of whether or not the sale of electricity is appropriate can be made, for example, by setting a predetermined threshold electricity sell price in advance and by comparing the electricity price in the electricity market with the threshold electricity sell price. When the electricity price in the electricity market is higher than the threshold electricity sell price, it is determined that the sale of electricity is appropriate. Further, the determination of whether or not the sale of electricity is appropriate can be made, for example, using a method described hereinafter, as disclosed in Japanese Patent Application Publication No. JP-A-2002-233053.

An electricity sell price is determined by multiplying the amount of stored electricity by the electricity price. Further, costs are incurred in the operation of the energy storage equipment when storing electricity. In order to simplify the explanation, it is assumed that the costs required to store electricity are a fixed amount each day. Profits obtained by operating an energy storage system are calculated using the following formulas.

Profit obtained by operating energy storage system=electricity sales fee−electricity purchase fee−electricity storage costs  [Formula 2]

Electricity purchase fee=electricity purchase amount× electricity price at time of purchase  [Formula 3]

Electricity sales fee=purchased electricity amount× (100−discharge rate(%/day)×number of days of electricity storage)×electricity price at time of sale  [Formula 4]

Electricity storage costs=cost unit price(yen/day)× number of days of electricity storage  [Formula 5]

Prediction of the fluctuations over time of the electricity price is performed in the same manner as that described above and a predicted value of the profits obtained in the operation of the energy storage system (an electricity sales profit predicted value) is calculated. An expected value of a maximum value of profits up to a certain time (an electricity sales reference profit) is calculated by performing statistical processing on the above predicted value, and it is determined that the sale of electricity is appropriate when the profit calculated at a given timing is higher than the electricity sales reference profit.

Note that the algorithm used to determine the sale of electricity is not limited to the above example, and any algorithm may be used, as long as it is an algorithm that determines the sales amount and the timing of the sale based on price fluctuations in the electricity market, on the predicted value of the price fluctuations and on a volume of electricity that can be sold. For example, a program that is used in automatic buying and selling in another existing market, such as a stock market, can be modified to suit the electricity market and used.

When it is determined at step S15 that the sale of electricity is appropriate (yes at step S15), the processing advances to step S16. At the next step S16, a sales order is issued to the electricity market. Then, after a transaction is established with the electricity market, at step S17, the discharge command is transmitted to the power control device 10. Note that, along with the discharge instruction, it is preferable that the discharge command also includes instructions with respect to a discharge period, an amount of electricity to be discharged and so on.

On the other hand, if it is determined at step S15 that the sale of electricity is not appropriate (no at step S15), the processing advances to step S18. When the processing advances to step S18, this means that it has been determined that the purchase of electricity is not appropriate and, further, that the sale of electricity is not appropriate. In this case, the stop command is transmitted to the power control device 10 in order for the energy storage equipment 100 to be in a stopped state.

The power management processing is performed in the manner described above. The electricity stored in the energy storage equipment 100 is bought and sold by the power/point management server 200 determining a relationship with the electricity price in the electricity market. In this way, the point issuer can obtain a profit. Further, the energy storage equipment owner does not need to worry about the electricity price in the electricity market.

1.5 Processing by Power/Point Management Server: Point Issuing Processing

Figure 5:
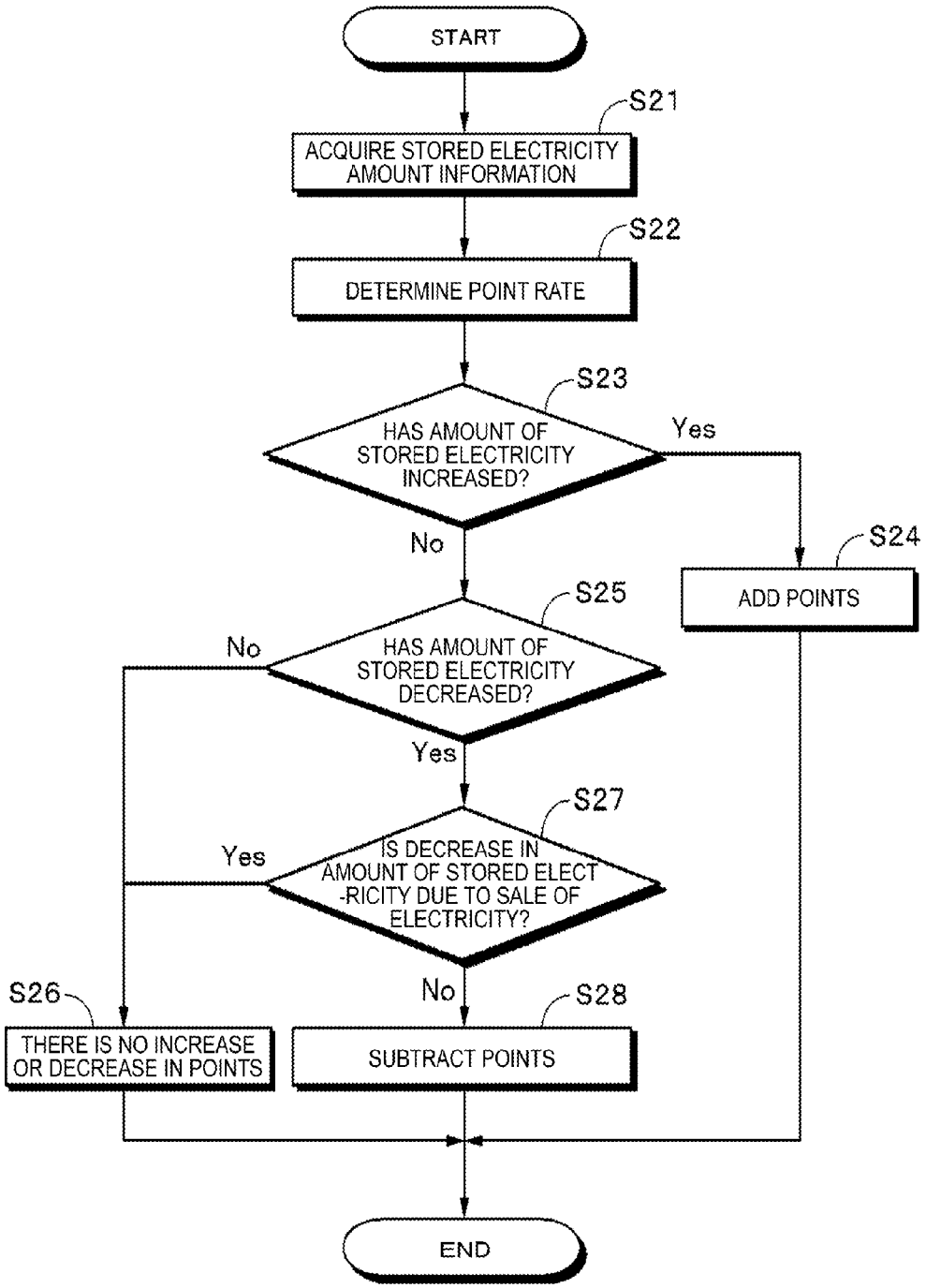
FIG. 5 is a flowchart showing a flow of point issuing processing performed by the power/point management server.

Next, the point issuing processing will be explained. FIG. 5 is a flowchart showing a flow of the point issuing processing. The point issuing processing is processing to award points to the energy storage equipment owner in accordance with the amount of electricity stored in the storage battery module 30. First, at step S21, the stored electricity amount data with respect to the storage battery module 30 is acquired. Note that the acquisition of the stored electricity amount data is not limited to when the point issuing processing is performed, and it may be constantly and regularly acquired. In this case, in the point issuing processing, processing is performed based on the stored electricity amount that is indicated by the latest stored electricity amount data at that point in time.

Next, at step S22, a point rate is determined. Here, a method for determining the point rate will be explained. First, a rate with respect to a price of the goods and services provided by the goods/services provider and the points necessary to obtain those goods and services (a goods/services rate) is fixed.

Next, an average price of an electricity market price is determined. This average electricity price is a reference in the calculation of the point rate. The average electricity price is, for example, calculated as a unit price per unit of electricity.

Figure 6:
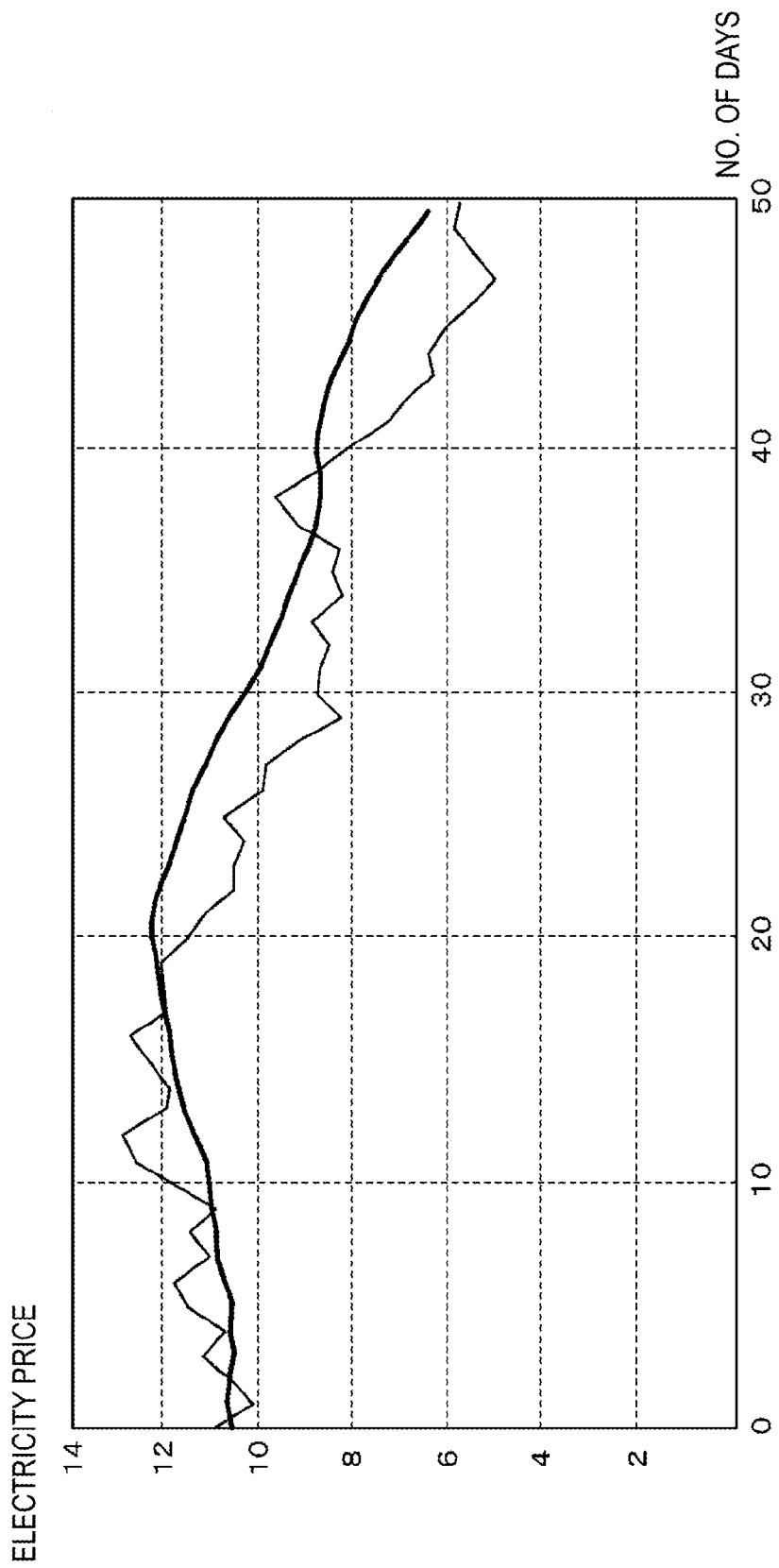
FIG. 6 is a diagram illustrating an example of calculating an average electricity price.
Figure 7:
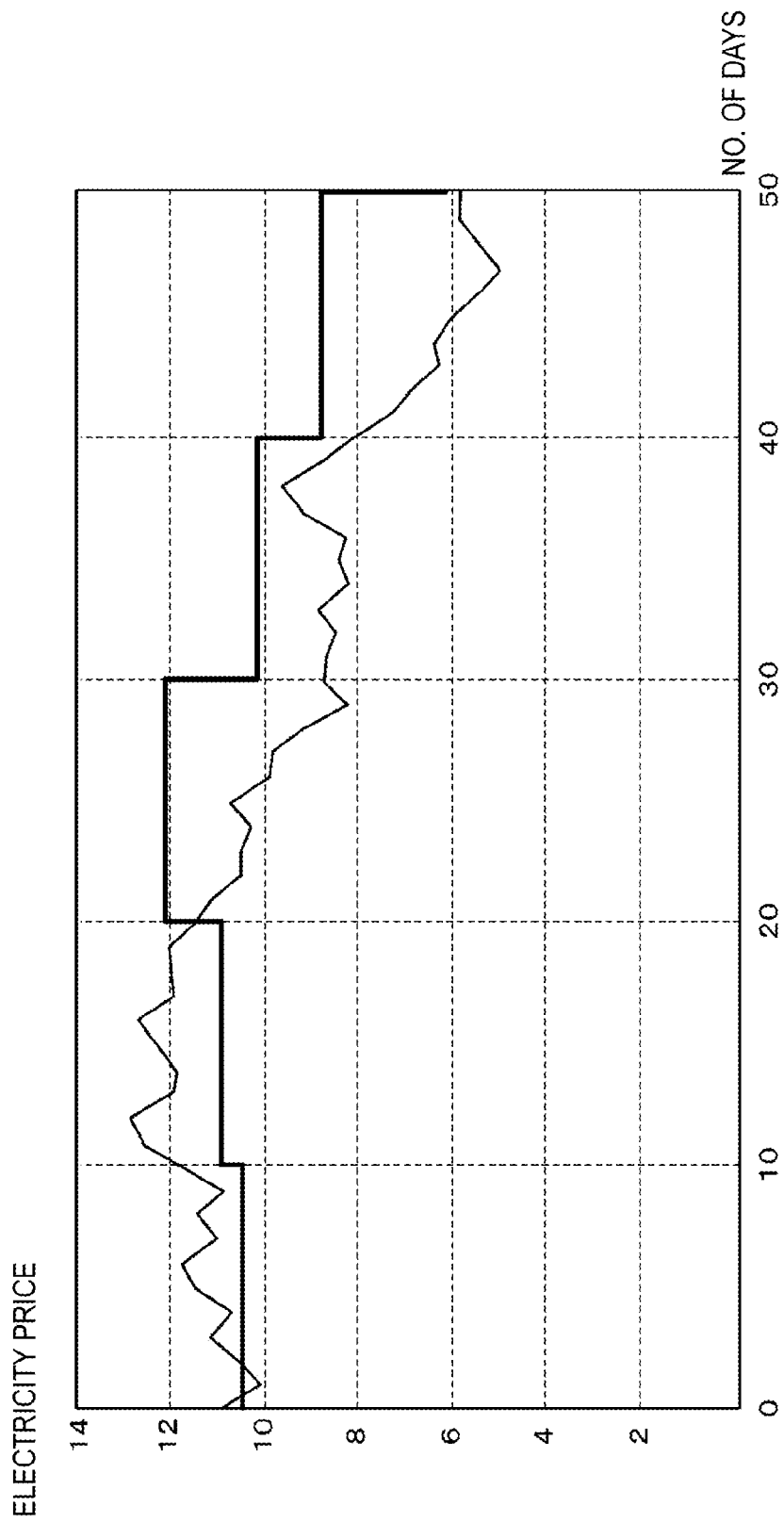
FIG. 7 is a diagram illustrating another example of calculating the average electricity price.

The calculation of the average electricity price can be performed by a variety of methods. FIG. 6 and FIG. 7 show examples of the calculation. FIG. 6 shows an example of calculating a moving average over 10 days, using a graph whose vertical axis is the electricity price and whose horizontal axis is a number of days. A fine line shows the electricity market price, and a thick line shows the moving average. In this case, the point rate also fluctuates, but a magnitude of the fluctuations is small compared to the fluctuations in the electricity market price. Thus, it is possible to reduce price fluctuation risk caused by the fluctuations in the electricity market price.

For example, the point rate determination may be performed daily at midnight (zero hours) and the determined point rate may be used for the following 24 hours. Note that that determination of the point rate may be performed at a predetermined interval, such as once a week, once a month or once a year, and the determined point rate may be used until the time of the next point rate determination.

Further, FIG. 7 shows a case in which the average electricity price is calculated every 10 days with respect to the daily electricity market price over the past 10 days, and the calculated average electricity price is used as the reference for the point rate calculation with respect to the next 10 days. A fine line shows the electricity price and a thick line shows the average electricity price. In this case also, the magnitude of the fluctuations in the point rate is small compared to the fluctuations in the electricity market price. Thus, it is possible to reduce price fluctuation risk caused by the fluctuations in the electricity market price. The period used to calculate this average electricity price is not limited to a 10-day period and may be 1 week, 1 month or 1 year etc.

Then, the average electricity price calculated in the above-described manner is converted into points, based on the goods/services rate. In this way, the rate between the amount of stored electricity and the points (namely, the point rate) is determined For example, when the number of points necessary to be converted to a 1000 yen voucher (the goods and services) is 100 points, the goods/services rate is 1 point per 10 yen. Then, if it is assumed that the average electricity price over a predetermined period of the electricity market price is 10 yen per 1 kWh, the point rate is 1 point per 1 kWh. When 1 kWh of electricity is stored in the energy storage equipment 100, 1 point is awarded to the energy storage equipment owner. Note that this rate is an example for the purpose of explanation.

By setting the point rate using the average electricity price (the average of the electricity market price that fluctuates on the electricity market) as the reference in the above-described manner, the fluctuations in the point rate are small in comparison to the fluctuations in the electricity market price. As a result, it is possible to inhibit the energy storage equipment owner from being exposed to electricity price fluctuation risk. In this way, it is possible to offer incentives for energy storage equipment to be adopted in general households and corporations, and further, to attempt to participate in the electricity market via the system according to the present technology.

Furthermore, when the individual contract is concluded between the energy storage equipment owner and the point issuer as described above, the contract content can also be used as a reference in determining the point rate. The individual contract determines, for example, whether or not the charging of the storage battery module 30 is performed using only late-night electricity that is cheap in price, whether or not the electricity stored in the storage battery module 30 can be used in the home consumption by the energy storage equipment owner, and whether or not the electricity can be freely sold at the will of the owner.

Specifically, in the case of a contract in which a degree of freedom of the energy storage equipment owner is low, it is preferable for the point rate to be set high so that the energy storage equipment owner can obtain more profit. A case in which the degree of freedom is low, for example, is when the energy storage equipment owner cannot use the electricity stored in the storage battery module 30 for home consumption, and cannot freely buy and sell the electricity (namely, all of the stored electricity is only sold, under the management of the power/point management server 200 on the point issuer side). In this case, all of the determinations for buying and selling the electricity are performed by the power/point management server 200, and the will of the energy storage equipment owner is not taken into account, and it is thus preferable for the high point rate to be set.

On the other hand, in case of a contract in which the degree of freedom of the energy storage equipment owner is high, it is preferable for the point rate to be set low so that it is advantageous to the point issuer. For example, in the case of the contract in which the energy storage equipment owner can use the electricity stored in the storage battery module 30 for home consumption, a case is possible in which, even if the point issuer tries to sell the electricity, the amount of electricity stored in the storage battery module 30 is not sufficient to meet the desired amount of electricity to be sold. Thus, in this type of case, it is preferable to set the point rate such that it is advantageous to the point issuer.

The explanation returns to the flowchart in FIG. 5. Next, at step S23, it is determined whether or not the amount of electricity stored in the storage battery module 30 has increased in comparison to the amount of stored electricity acquired a previous time. When it is determined that the amount of stored electricity has increased (yes at step S23), the processing advances to step S24.

Then, at step S24, points are issued by the point issuing portion 223 based on the point rate determined at step S22, and the points are added. Note that the points are not added with respect to the amount of stored electricity itself, but are added with respect to the amount of increase in the amount of stored electricity from the previous time of point issuing. In addition to managing point information that indicates the current number of points etc., the point issuing portion 223 may also manage a history of point increases and decreases etc. Further, the point issuing portion 223 may transmit the point information to the power control device 10 via the network and the communication portion 12.

On the other hand, when it is determined at step S23 that the amount of stored electricity has not increased (no at step S23), the processing advances to step S25. Next, at step S25, it is determined whether or not the amount of stored electricity has decreased in comparison to the amount of stored electricity acquired the previous time. When it is determined that the amount of stored electricity has not decreased (no at step S25), the processing advances to step S26.

When it is determined at the above-described step S23 that the amount of stored electricity has not increased and it is further determined at step S25 that the amount of stored electricity has not decreased, this means that there has been no change in the amount of stored electricity. Thus, at step S26, the points are neither increased nor decreased.

The explanation returns to step S25. When it is determined at step S25 that the amount of stored electricity has decreased in comparison to the amount of stored electricity acquired the previous time (yes at step S25), the processing advances to step S27. Next, at step S27, it is determined whether or not the decrease in the amount of stored electricity is a result of the sale of electricity based on the instruction of the power/point management server 200.

When it is determined that the decrease in the amount of stored electricity is not the result of the sale of electricity based on the instruction of the power/point management server 200 (no at step S27), the processing advances to step S28. Then, at step S28, points are subtracted by the issuing of minus points by the point issuing portion 223. When the decrease in the amount of stored electricity is not the result of the sale of electricity based on the instruction of the power/point management server 200, the amount of stored electricity may have decreased due to consumption of the electricity for home consumption by the energy storage equipment owner. In addition, there is a case in which the energy storage equipment owner has sold the electricity at his or her will. As it is considered that the electricity that can be used in the sale of electricity by the point issuer has been caused to decrease by the energy storage equipment owner, points are subtracted. The points are subtracted with respect to the amount of decrease in the amount of stored electricity from the previous time of point issuing.

On the other hand, when it is determined that the decrease in the amount of stored electricity is the result of the sale of electricity (yes at step S27), the processing advances to step S26 and the points are neither increased nor decreased. When the amount of stored electricity has decreased due to the sale of electricity, this means that the point issuer has obtained a profit from the sale of the electricity, and in such a case, it is not reasonable to cause the points of the energy storage equipment owner to be decreased. Note that, when the contract does not allow the energy storage equipment owner to use the stored electricity for home consumption, the processing at step S27 is not necessary.

1.6 Processing by the Power Control Device

Figure 8:
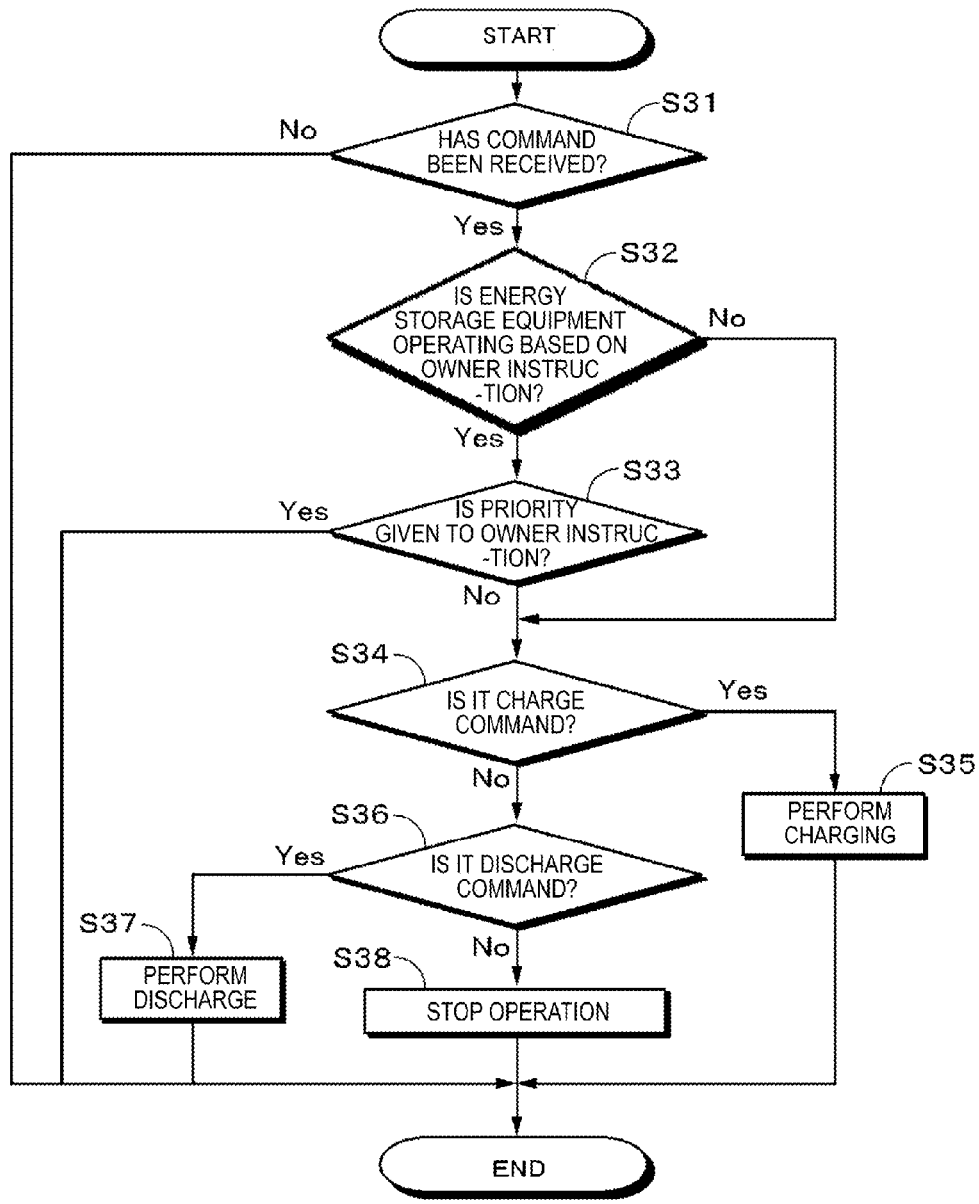
FIG. 8 is a flowchart showing a flow of power supply control processing that is performed by the power control device.

Next, power control performed by the power control device 10 will be explained. FIG. 8 is a flowchart showing processing performed by the power control device 10. As described above, power supply control is performed by the control portion 11 in accordance with commands from the power/point management server 200.

First, it is determined at step S31 whether or not a command has been received from the power/point management server 200. When the command has not been received (no at step S31), processing is not performed. When the command has been received (yes at step S31), the processing advances to step S32, and it is determined whether or not the energy storage equipment 100 is operating as a result of an instruction by the energy storage equipment owner.

When the energy storage equipment 100 is operating as a result of the instruction by the energy storage equipment owner (yes at step S32), the processing advances to step S33. Then, at step S33, it is determined whether or not the contract between the energy storage equipment owner and the point issuer is a contract in which the instruction of the energy storage equipment owner is given priority. The determination of whether or not the contract is one that gives priority to the instruction of the energy storage equipment owner can be performed by referring to the contract information that indicates the contract content and that is stored in the memory 23. Alternatively, the determination can be performed by accessing the power/point management server 200 via the network and referring to the contract information stored in the owner database 230. When the instruction of the energy storage equipment owner is given priority (yes at step S33), the processing is ended because operation control in accordance with commands from the power/point management server 200 is not performed.

On the other hand, in the case of the contract in which the instruction of the energy storage equipment owner is not given priority (no at step S33), the processing advances to step S34. Also, when it is determined at the above-described step S32 that the energy storage equipment 100 is not operating as a result of the instruction of the energy storage equipment owner (no at step S32), the processing advances to step S34.

Next, at step S34, it is determined whether or not the command from the power/point management server 200 is the charge command. When the command is the charge command, the processing advances to step S35 and the power conditioner 13 is caused to operate in the charge mode. The storage battery module 30 is charged in this manner. On the other hand, when the command is not the charge command (no at step S34), the processing advances to step S36 and it is determined whether or not the command is the discharge command.

Then, when the command is the discharge command (yes at step S36), the processing advances to step S37, the power conditioner 13 is caused to operate in the discharge mode and thus electricity is discharged from the storage battery module 30. The sale of electricity to the electricity market is performed in this manner. On the other hand, when the command is not the discharge command (no at step S36), the processing advances to step S38. When the command is neither the charge command nor the discharge command, this means that the command is the stop command, and at step S38, the power conditioner 13 is switched to the stop mode. In the stop mode, the electricity from the power generation equipment 40 is not stored in the storage battery module 30, and is directly discharged or is allocated to home consumption. The power supply control is performed in this way, based on the commands from the power/point management server 200.

Note that when, between the energy storage equipment owner and the point issuer, it is agreed that the energy storage equipment owner cannot operate the energy storage equipment 100 based on his or her own instruction, step S32 and step S33 are not necessary.

Further, in the case of the contract in which the instruction from the energy storage equipment owner is given priority when an operation instruction is issued from the energy storage equipment owner when the energy storage equipment 100 is operating, the operation instructed by the energy storage equipment owner is performed. On the other hand, in the case of the contract in which the instruction of the energy storage equipment owner is not given priority, the operation instructed by the energy storage equipment owner is not performed and the operation being performed up to that point is continued.

Note that when the contract between the energy storage equipment owner and the point issuer is a contract in which the generated electricity is stored and is further allocated to home consumption, and then any remaining electricity after that is sold as excess electricity based on the management of the power/point management server 200, the points may be awarded by a method that differs from the above-described processing. This is because, in the above-described point issuing processing, the points are basically issued based on the increase and decrease in the amount of stored electricity in the storage battery module 30. Further, this is because the timing of the sale of electricity is not necessarily limited to an advantageous timing for the point issuer (a timing that differs from the timing determined to be appropriate for the sale of electricity by the power/point management server 200). As a method that differs from the above-described point issuing processing, for example, a method is conceivable in which the point rate is not set based on the average electricity price over a predetermined period, but is set based on the electricity market price at a point in time at which the electricity is sold, and the points are issued based on that point rate.

2. Security Problems in Power Management System

The power supply control and issuing of points between the power control device 10 and the power/point management server 200 according to the present technology is performed in the manner described above. However, if appropriate security measures are not taken with respect to the power control device 10 and the power/point management server 200, respectively, various problems may occur. Specifically, security threats such as those described below can be assumed.

(1) When the power control device 10 and the power/point management server 200 are connected, if it is not verified whether or not the power control device 10 and the energy storage equipment 100 are valid equipment, there is a risk that the invalid energy storage equipment 100 may be connected to the power/point management server 200. If the invalid power control device 10 is connected and used, it is possible, for example, that an operation not based on the instruction of the power/point management server 200 may be performed. As a result, there is a risk that improper point acquisition may occur, or an operation not anticipated by the power management system may be performed.

Further, when the power control device 10 and the power/point management server 200 are connected, if it is not verified whether or not the power/point management server 200 is a valid server, there is a risk that the power control device 10 may be connected to an invalid server other than the server of the point issuer. In this case, there is a risk, for example, that a malicious third party may masquerade as the point issuer.

(2) There are many cases in which the communication between the power control device 10 and the power/point management server 200 is performed using the Internet etc., and it is conceivable that the communication is not always performed using a dedicated line. There is therefore a risk that communication data, such as the stored electricity amount data, that is transmitted and received between the power control device 10 and the power/point management server 200 may be read or tampered with by a malicious third party etc.

In addition, according to the present technology, various commands, such as the charge command and the discharge command, are transmitted from the power/point management server 200 to the power control device 10. If the content of the command is analyzed and, further, tampered with, there is a risk that the power control device 10 and the energy storage equipment 100 may perform an operation that is not intended by the energy storage equipment owner and the point issuer. For example, in a case in which, even if the power/point management server 200 has instructed the discharge of electricity at a certain time, the electricity discharge is not performed due to tampering by a third party, it is not possible to sell an agreed amount of electricity on the electricity market.

(3) If a defective or malfunctioning power control device 10 and energy storage equipment 100 can be connected to the power/point management server 200, there is a risk that an unforeseeable fault or the like may occur in the power management system. In addition, even if there is no defect or malfunction at the time of connection, if a malfunction occurs in the power control device 10 and the energy storage equipment 100 after connection and the connected state is continued, there is also a risk that an unforeseeable fault or the like may occur in the power management system.

(4) In the power management system according to the present technology, the points are issued in accordance with the amount of electricity stored in the storage battery module 30. Thus, when it is possible to hold the stored electricity amount data when there is a large amount of stored electricity, and to transmit the stored electricity amount data a plurality of times to receive the issuing of points, a large number of points are acquired even when the amount of stored electricity is actually small.

(5) In the power management system according to the present technology, the points are issued in accordance with the amount of electricity stored in the storage battery module 30. Thus, if measurement is not performed accurately and an accurate value of the amount of stored electricity is not acquired, it is not possible to accurately issue the points. In addition, if the stored electricity amount data is overwritten by a malicious energy storage equipment owner etc., there is a risk that many points may be fraudulently acquired.

(6) The sale of electricity is executed by the power/point management server 200 issuing the discharge command to the power control device 10. However, simply by transmitting the discharge command, it is difficult to verify whether or not the instructed amount of electricity to be discharged is actually and accurately sold on the electricity market.

(7) In the power management system according to the present technology, it is preferable for the power/point management server 200 to have many of the energy storage equipment owners under its management and for the point issuer to bundle together many of the energy storage equipment owners. In this case, many of the power control devices 10 are connected to the power/point management server 200. As a result, for example, if data is transmitted simultaneously from each of the power control devices 10, the load on the power/point management server 200 becomes extremely large and there is a risk that a fault may occur in the power/point management server 200.

For example, if the stored electricity amount data etc. is transmitted to the power/point management server 200 at a timing chosen by the energy storage equipment owner, when the load on the power/point management server 200 becomes large, the system is simultaneously vulnerable to a denial of service (DoS) attack. Further, even when the power/point management server 200 transmits to the power control device 10 a command instructing the transmission of the stored electricity amount data, if the power/point management server 200 transmits the command simultaneously to many of the power control devices 10, the stored electricity amount data is transmitted at approximately the same timing and the load on the power/point management server 200 becomes large.

(8) If it is possible for a party other than the point issuer to easily analyze an internal configuration of the energy storage equipment 100 and communication content between the power control device 10 and the power/point management server 200 etc., there is a risk that access to information that is not intended by the design, or tampering with information etc. may be carried out. For example, there is a risk that the operation may be changed by intercepting and tampering with communication between each of the blocks (the control portion 11, the power conditioner 13 and the storage battery module 30 etc.) that form the energy storage equipment 100 etc.

(9) If access restrictions to the energy storage equipment 100 are not taken into account, there is a risk that the power control device 10 may be misused by fraudulent access by a party other than the energy storage equipment owner.

3. First Embodiment

3.1 Configuration of Power Control Device

A first embodiment will be explained, which is an embodiment that addresses the problems described above in sections (1) and (2). The first embodiment inhibits occurrence of the problem described in section (1) above by mutual authentication between a power control device 1100 and a power/point management server 2100.

Figure 9:
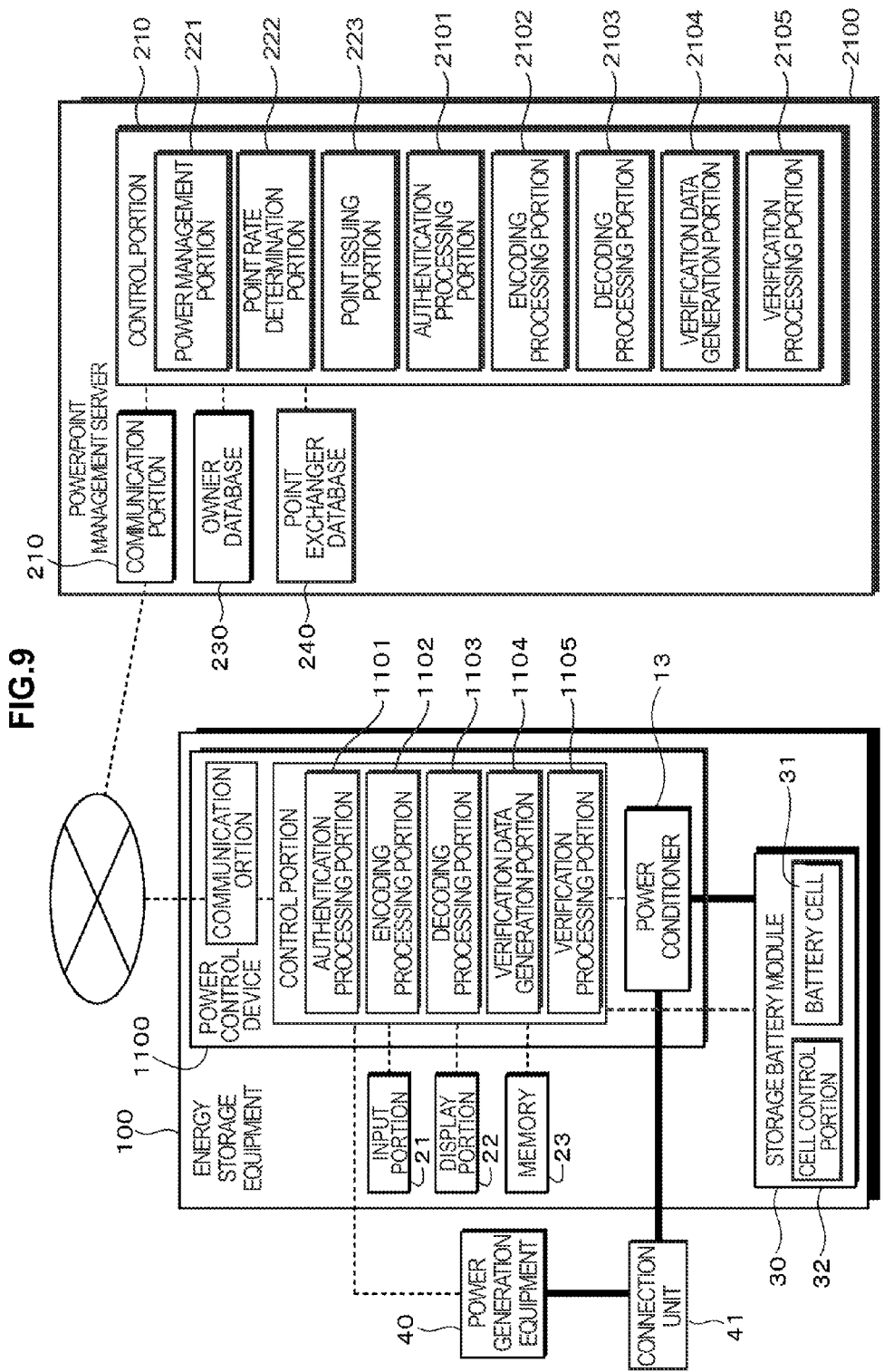
FIG. 9 is a block diagram showing a configuration of a power control device and a power/point management server according to a first embodiment of the present technology.

Further, the first embodiment inhibits occurrence of the problem described in section (2) above by performing encryption processing and tampering verification processing on the various pieces of information, data and commands etc. that are transmitted and received between the power control device 1100 and the power/point management server 2100. FIG. 9 is a block diagram showing a configuration of the power control device 1100 and the power/point management server 2100 according to the first embodiment.

First, the power control device 1100 will be explained. The control portion 11 is formed, for example, of a CPU, a RAM and a ROM. The CPU executes various processing based on programs stored in the ROM, and thus performs control of the whole power control device 1100. In addition, by executing predetermined programs, the control portion 11 functions as an authentication processing portion 1101, an encryption processing portion 1102, a decryption processing portion 1103, a verification data generation portion 1104 and a verification processing portion 1105. Note that, apart from the control portion 11, the configuration is the same as that explained with reference to FIG. 2 above, and an explanation is therefore omitted here.

The authentication processing portion 1101 is a functional portion that performs mutual authentication processing with an authentication processing portion 2101 of the power/point management server 2100. The mutual authentication processing performed by the authentication processing portion 1101 will be explained in detail later. If the mutual authentication is successful, it becomes possible to perform encrypted communication between the power control device 1100 and the power/point management server 2100 using confidential information that is shared in advance or shared in a process of the mutual authentication processing.

The encryption processing portion 1102 performs encryption processing on the information, data and commands etc. transmitted from the power control device 1100 to the power/point management server 2100, using a common key encryption system, for example. Using a common key, the decryption processing portion 1103 decrypts data that is transmitted to the power control device 1100 and that has been encrypted on the power/point management server 2100 side using the common key encryption system, for example.

The verification data generation portion 1104 generates verification data that is used to verify whether or not the information, data and commands etc. transmitted from the power control device 1100 to the power/point management server 2100 have been tampered with, and whether or not a transmission source is correct. The verification data is message authentication code (MAC) and the like. The verification processing portion 1105 verifies the verification data and thus verifies whether or not the received data has been tampered with. The verification processing will be explained in more detail later.

It should be noted that although, in principle, the encryption processing and the verification processing using the verification data cannot be said to be completely safe unless separate keys are used for each of the processing, if authenticated encryption is used, the processing can be simultaneously executed using a single key. A public key cipher and a digital signature may be used in the data encryption processing and the data verification.

3.2 Configuration of Power/Point Management Server

Next, the configuration of the power/point management server 2100 will be explained. The control portion 220 is formed, for example, of a CPU, a RAM and a ROM etc. The CPU executes various processing based on programs stored in the ROM, and thus performs control of the whole power/point management server 2100. In addition, by executing specific programs, the control portion 220 functions as the power management portion 221, the point rate determination portion 222, the point issuing portion 223, the authentication processing portion 2101, an encryption processing portion 2102, a decryption processing portion 2103, a verification data generation portion 2104 and a verification processing portion 2105. Note that, apart from the control portion 220, the configuration is the same as that explained with reference to FIG. 2 above, and an explanation is therefore omitted here.

The authentication processing portion 2101 is a functional portion that performs the mutual authentication with the authentication processing portion 1101 of the power control device 1100. The encryption processing portion 2102 performs encryption processing on the information, data and commands etc. transmitted from the power/point management server 2100 to the power control device 1100, using the common key encryption system, for example. Using a common key, the decryption processing portion 2103 decrypts data that is transmitted to the power/point management server 2100 and that has been encrypted on the power control device 1100 side using the common key encryption system, for example.

The verification data generation portion 2104 generates verification data that is used to verify whether or not the information, data and commands etc. transmitted from the power/point management server 2100 to the power control device 1100 have been tampered with, and whether or not a transmission source is correct. The verification processing portion 2105 verifies the verification data and thus verifies whether or not the received data has been tampered with, and also verifies whether or not the data has been transmitted from the valid power control device 1100.

3.3 Authentication Processing

Figure 10:
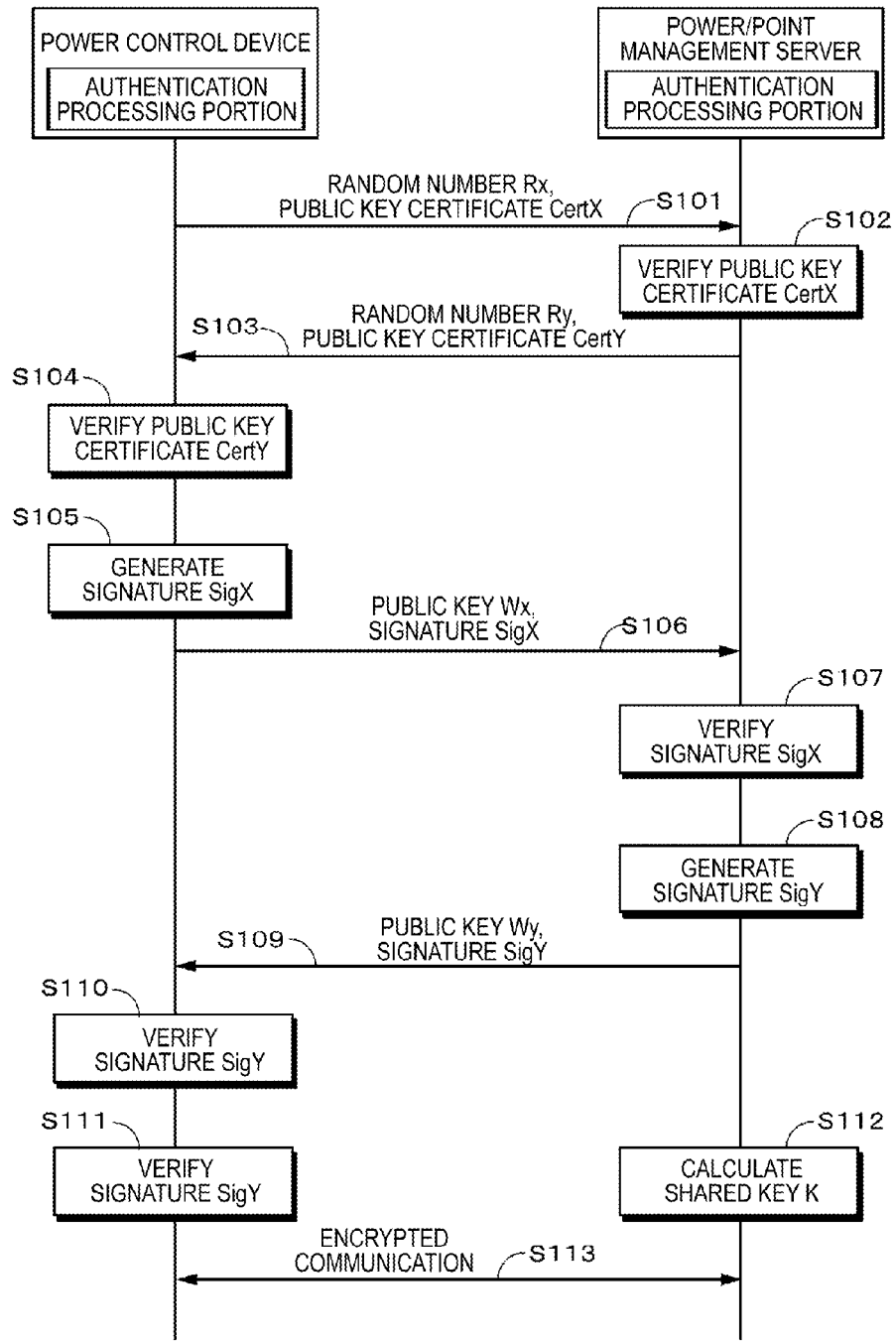
FIG. 10 is a sequence diagram showing a flow of mutual authentication processing that is performed between the power control device and the power/point management server.

Next, the mutual authentication processing between the power control device 1100 and the power/point management server 2100 will be explained. FIG. 10 is a sequence diagram showing a flow of mutual authentication and of shared key processing using a public key cipher. Note that the mutual authentication processing is performed between the authentication processing portion 1101 of the power control device 1100 and the authentication processing portion 2101 of the power/point management server 2100, using a known challenge response system. The Diffie-Hellmann key exchange system is used as a shared key system.

First, at step S101, the power control device 1100 transmits to the power/point management server 2100 a random number Rx and a public key certificate CertX as a challenge. Next, at step S102, the power/point management server 2100 receives the random number Rx and the public key certificate CertX, and verifies the validity of the public key certificate CertX using public key certificates disclosed by a certificate authority (CA). For example, when the public key certificate CertX is not valid, or when a term of validity of the public key certificate CertX has expired, it is determined that the authentication has failed.

At step S103, the power/point management server 2100 transmits a random number Ry and a public key certificate CertY to the power control device 1100. Next, at step S104, the power control device 1100 receives the random number Ry and the public key certificate CertY, and verifies the validity of the public key certificate CertY using the public key certificates disclosed by the certificate authority (CA).

Next, at step S105, a signature SigX (Ry//Wx) is generated on the power control device 1100 side using a secret key rx of the power control device 1100. Then, at step S106, the power control device 1100 transmits, to the power/point management server 2100, a public key Wx and the signature SigX of the power control device 1100.

Then, at step S107, acquisition of the public key Wx and verification of the signature SigX is performed on the power/point management server 2100 side. If the verification processing of the signature SigX using the public key Wx is successful, the authentication is successful. If there is no match in the verification processing, it is determined that the authentication has failed. Next, at step S108, a signature SigY (Rx//Wy) is generated on the power/point management server 2100 side using a secret key ry of the server. Then, at step S109, the power/point management server 2100 transmits, to the power control device 1100, a public key Wy and the signature SigY of the power/point management server 2100.

Further, at step S110, acquisition of the public key Wy and verification of the signature SigY is performed on the power control device 1100 side. If the verification processing of the signature SigY using the public key Wy is successful, the authentication is successful. If there is no match in the verification processing, it is determined that the authentication has failed.

At step S111, a shared key K is calculated on the power control device 1100 side using Wy and rx. Meanwhile, at step S112, the shared key K is calculated on the power/point management server 2100 side using Wx and ry. Then, as shown at step S113, encrypted communication using the shared key encryption system becomes possible between the power control device 1100 and the power/point management server 2100.

The mutual authentication and shared key processing for encryption are performed between the power control device 1100 and the power/point management server 2100 in the manner described above. Examples of the shared key encryption system include the Triple Data Encryption Standard (Triple DES), the Advanced Encryption Standard (AES) and CLEFIA (Sony Corporation trademark) etc. However, the method to perform mutual authentication and shared key processing for encryption between the power control device 1100 and the power/point management server 2100 is not limited to the above-described examples, and any method may be adopted as long as mutual authentication can be performed.

3.4 Verification Processing

Figure 11:
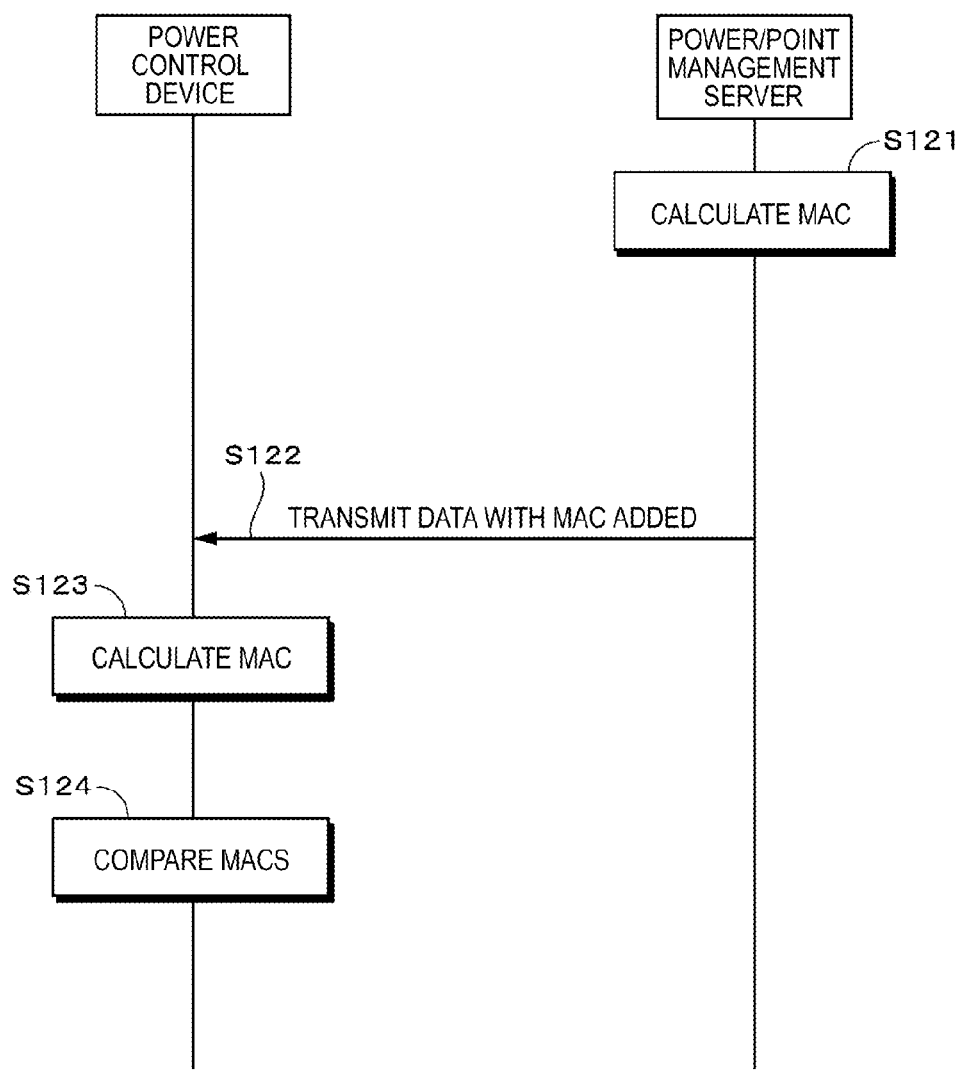
FIG. 11 is a sequence diagram showing a flow of tampering verification processing using verification data.

The power control device 1100 and the power/point management server 2100 use the verification data to perform tampering verification on the various pieces of information, data and commands etc. that are transmitted and received, and to verify a transmission source. The verification data is, for example, a MAC. The MAC is a message authentication code that is used to verify that transmitted data has not been tampered with, using the shared key encryption system. FIG. 11 is a sequence diagram showing a flow of the verification processing using a MAC as the verification data. Note that in FIG. 11 shows verification processing for data that is transmitted from the power/point management server 2100 to the power control device 1100.

First, at step S121, the verification data generation portion 2104 of the power/point management server 2100 calculates a MAC based on the data to be transmitted to the power control device 1100. Next, at step S122, the transmission data with the MAC added is transmitted to the power control device 1100.

Then, at step S123, based on the transmission data transmitted from the power/point management server 2100, the verification processing portion 1105 of the power control device 1100 calculates a MAC using the same method as that used by the verification data generation portion 2104 of the power/point management server 2100.

Further, at step S124, verification is performed by comparing the MAC calculated at step S121 with the MAC calculated at step S123. If the MACs match each other, it can be confirmed that the transmission data has not been tampered with. On the other hand, if the MACs do not match each other, this means that the transmission data has been tampered with.

Note that a method for calculating the MAC is not particularly limited and a known method can be used, such as CMAC using a common key block cipher or HMAC using a keyed hash function, for example. Alternatively to a MAC, a digital signature based on a public key cipher can also be used as the verification data.

FIG. 12A is a sequence diagram showing processing when the above-described verification processing is applied to transmission and reception of the stored electricity amount information that indicates the amount of electricity stored in the storage battery module 30. Note that it is assumed that the transmission of the stored electricity amount information is performed in response to the query command from the power/point management server 2100 to the power control device 1100. The query command transmitted to the power control device 1100 in the above-described manner is issued by the point issuing portion 223.

First, at step S131, the power/point management server 2100 transmits, to the power control device 1100, the command that queries the stored electricity amount information. Next, at step S132, the control portion 11 of the power control device 1100 transmits a query to the cell control portion 32 of the storage battery module 30 to query the amount of stored electricity. At step S133, in response to the query, the cell control portion 32 supplies the stored electricity amount information to the control portion 11, the stored electricity amount information indicating the amount of electricity stored in the storage battery module 30 at the time of the query.

Next, at step S134, the verification data generation portion 1104 of the control portion 11 generates a MAC, as the verification data, based on the stored electricity amount information. Then, at step S135, the stored electricity amount information to which the MAC is added is transmitted to the power/point management server 2100 via the communication portion 12.

Then, at step S136, the verification processing portion 2105 of the power/point management server 2100 uses the MAC transmitted from the power control device 1100 to verify whether or not the stored electricity amount information has been tampered with, and to verify whether or not it has been transmitted from a valid transmission source. As described above, the verification is performed by the verification processing portion 2105 of the power/point management server 2100 also generating a MAC from the stored electricity amount data in the same manner as the power control device 1100, and then comparing the generated MAC with the transmitted MAC.

As a result of the verification, if the MACs match each other, the point issuing processing in accordance with the amount of stored electricity is performed by the point issuing portion 223. On the other hand, if the MACs do not match each other, this means that the stored electricity amount information has been tampered with or the stored electricity amount data has been transmitted from an invalid transmission source, and the point issuing is not performed.

As described above, the verification processing is performed with respect to the information transmitted and received between the power control device 1100 and the power/point management server 2100, utilizing the MAC, digital signature and the like as the verification data. In this way, it is possible to inhibit the fraudulent acquisition of points by manipulating the amount of stored electricity.

It should be noted that encryption processing may additionally be performed with respect to the transmission and reception of the stored electricity amount information. FIG. 12B is a sequence diagram showing processing when encryption processing is applied to the transmission and reception of the stored electricity amount information. Step S131 to step S136 in FIG. 12B are the same as those shown in FIG. 12A.

At step S137, the encryption processing portion 1102 encrypts the stored electricity amount information. Then, at step S135, the stored electricity amount data that has been encrypted and to which the verification data has also been added is transmitted to the power/point management server 2100.

Then, at step S138, the stored electricity amount data is decrypted by the decryption processing portion 2103 of the power/point management server 2100. By encrypting the transmitted and received stored electricity amount information in this manner, it is possible to inhibit the stored electricity amount information from being read and misused by a third party.

Note that, in FIG. 12B, both the encryption processing and the tampering verification processing are applied to the information, but it is not necessary to use both the series of processing, and the encryption processing only may be applied. However, from the point of view of security, it is preferable for both the encryption processing and the tampering verification processing to be applied.

In addition, with the present technology, the various commands, such as the charge command, the discharge command etc., issued by the power management portion 221 of the power/point management server 2100 are transmitted to the power control device 1100. If the content of these commands is analyzed and, further, tampered with, there is a risk that operation not intended by the energy storage equipment owner and the point issuer may be performed by a third party.

Here, it is preferable for the above-described verification processing to be applied also to the transmission and reception of the commands.

FIG. 13A is a sequence diagram showing processing when the above-described tampering verification processing is applied to the transmission and reception of the commands between the power/point management server 2100 and the power control device 1100. Note that, in FIG. 13A and FIG. 13B, the explanation is made taking as an example a case in which the discharge command is transmitted to the power control device 1100 from the power/point management server 2100. However, the tampering verification processing can be applied to the various commands that are transmitted and received between the power/point management server 2100 and the power control device 1100.

First, at step S141, the verification data generation portion 2104 of the power/point management server 2100 generates, for example, a MAC or a digital signature as the verification data. Next, at step S142, the discharge command with the verification data added is transmitted to the power control device 1100 via the communication portion 210. Then, at step S143, the verification processing portion 1105 of the power control device 1100 uses the verification data to perform the tampering verification processing, and thus verifies whether or not the discharge command from the power/point management server 2100 has been tampered with and whether or not the discharge command has been transmitted from the valid power/point management server 2100. As a result of the verification, if it is determined that the discharge command has not been tampered with and has been transmitted from the valid power/point management server 2100, at step S144, the control portion 11 controls the power conditioner 13 such that the electricity is discharged from the storage battery module 30. On the other hand, if it is determined that the discharge command has been tampered with, or that it has not been transmitted from the valid power/point management server 2100, the discharge of electricity is not performed.

In addition, the above-described encryption processing may also be performed with respect to the transmission and reception of the various commands. FIG. 13B is a sequence diagram showing processing when the encryption processing is applied to the transmission and reception of the commands. Note that step S141 to step S144 in FIG. 13B are the same as those of FIG. 13A.

At step S145, the encryption processing portion 1102 of the power/point management server 2100 encrypts the discharge command that is to be transmitted from the power/point management server 2100 to the power control device 1100. Then, the discharge command that has been encrypted and to which the verification data has also been added is transmitted to the power control device 1100 via the communication portion 210.

Next, at step S143, the verification processing portion 1105 of the power control device 1100 verifies whether or not the discharge command has been tampered with. As a result of the verification, if it is determined that the discharge command has not been tampered with, the control portion 11 controls the power conditioner 13 such that the electricity is discharged from the storage battery module 30. On the other hand, when it is determined that the discharge command has been tampered with, the discharge of electricity is not performed. Then, at step S146, the decryption processing portion 1103 of the power control device 1100 decrypts the discharge command.

By performing the mutual authentication processing in the manner described above, it is possible to inhibit the problem described in section (1) above, namely, to inhibit connection to the invalid device, equipment or server. Further, by performing the encryption processing and the tampering verification processing on the communication content, it is possible to inhibit the problem described in section (2) above, namely, to inhibit the communication content from being read and tampered with by a third party.

4. Second Embodiment

Figure 14:
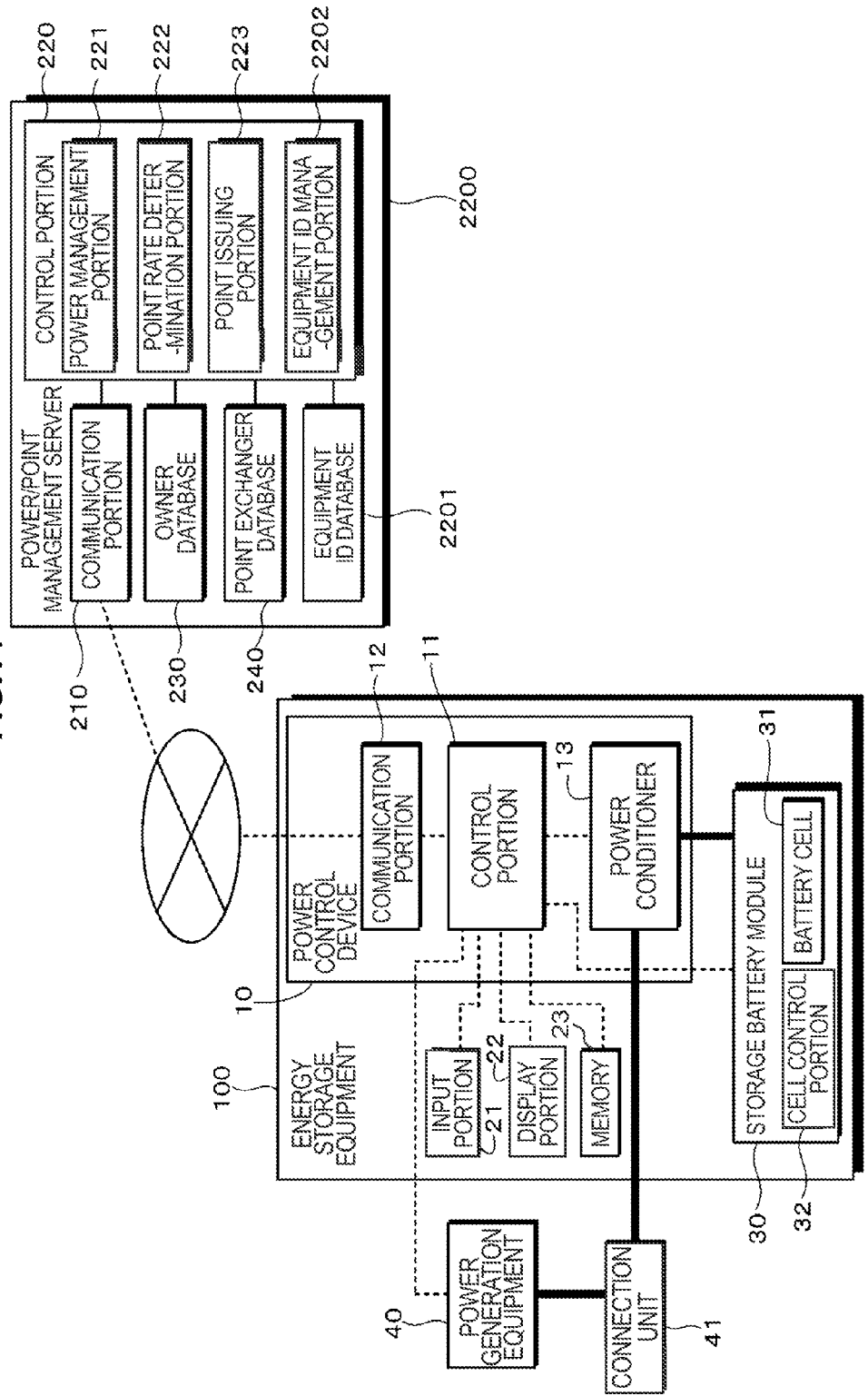
FIG. 14 is a block diagram showing a configuration of the power control device and a power/point management server according to a second embodiment of the present technology.

Next, a second embodiment will be explained, which is an embodiment that addresses the threat described in section (3) above. FIG. 14 is a block diagram showing a configuration of the power control device 10 and of a power/point management server 2200 according to the second embodiment.

4.1 Configuration of Power/Point Management Server

The configuration of the power/point management server 2200 will be explained. An equipment ID database 2201 is a database that stores and holds equipment identification (ID) that identifies the power control device 10 that is under the management of the power/point management server 2200. The equipment ID database 2201 may store the equipment ID in association with the owner information stored in the owner database 230. Note that, in FIG. 14, the equipment ID database 2201 is denoted by a block that is separate to the owner database 230, but a single mass storage medium may serve as both the owner database 230 and the equipment ID database 2201.

The equipment ID is an ID that is assigned to each of the power control devices 10 and that can identify the power control device 10. The equipment ID corresponds to identification information corresponding to a power control device within the scope of the appended claims. The equipment ID is assigned to the power control device 10 in advance, such as at the time of manufacture, and is stored, for example, in the ROM of the control portion 11 of the power control device 10.

The control portion 220 executes various processing based on programs, and thus performs control of the whole power/point management server 2200. Further, by executing predetermined programs, the control portion 220 also functions as the power management portion 221, the point rate determination portion 222, the point issuing portion 223 and an equipment ID management portion 2202. Note that, apart from the equipment ID management portion 2202, the configuration is the same as that explained with reference to FIG. 2 above, and an explanation is therefore omitted here.

Figure 15:
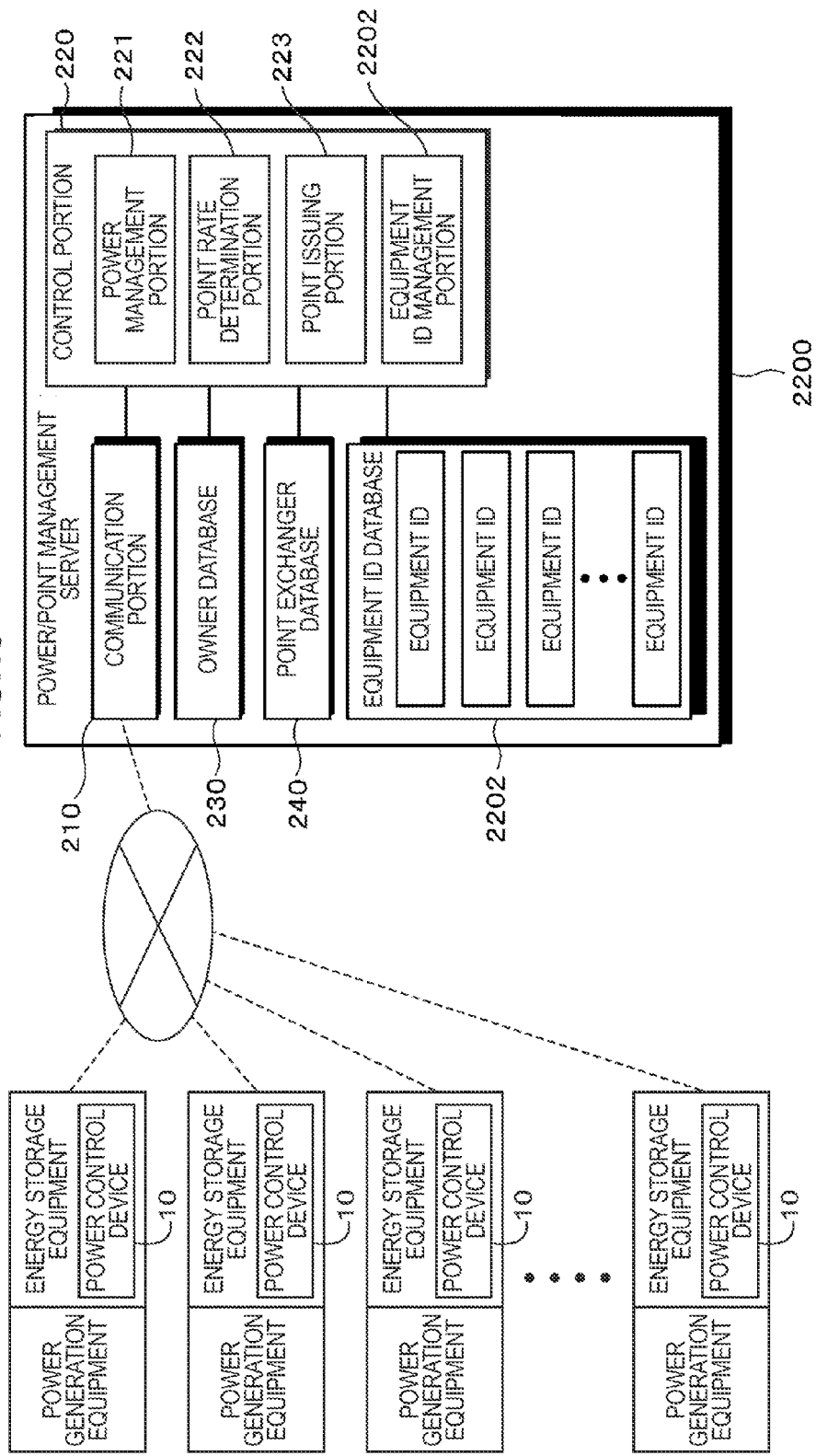
FIG. 15 is a diagram showing a management state of the power control devices by the power/point management server.

The equipment ID management portion 2202 manages the equipment IDs that are stored in the equipment ID database 2201. The equipment ID management portion 2202 performs processing in order to register the equipment ID of each of the power control devices 10 in the equipment ID database 2201, or to delete the equipment ID, and thus manages a plurality of the power control devices 10, 10 . . . 10, as shown in FIG. 15.

4.3 Processing According to Second Embodiment

Figure 16:
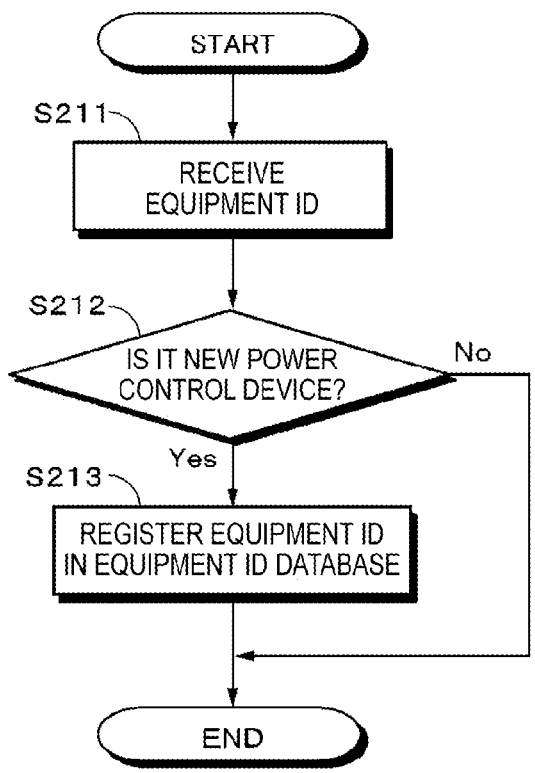
FIG. 16 is a flowchart showing a flow of equipment ID registration processing.

Hereinafter, processing performed by the equipment ID management portion 2202 will be explained. First, equipment ID registration processing will be explained with reference to a flowchart shown in FIG. 16. Firstly, at step S211, the power/point management server 2200 receives the equipment ID from the power control device 10 that is newly connected. The equipment ID may be transmitted to the power/point management server 2200 at the point in time at which the power control device 10 is connected to the power/point management server 2200.

Next, at step S212, the equipment ID management portion 2202 determines whether or not the connected power control device 10 is the new device. The determination can be made, for example, by referring to the equipment ID database 2201 and, if the equipment ID received at step S211 is not in the equipment ID database 2201, it can be determined that it is the new power control device 10.

As a result of the determination, if it is not the new power control device 10 (no at step S212), as the equipment ID is already registered in the equipment ID database 2201, the registration processing is not necessary and the processing ends. On the other hand, if the new power control device 10 is connected to the power/point management server 2200 (yes at step S212), the processing advances to step S213.

Then, at step S213, the equipment ID management portion 2202 registers the received equipment ID in the equipment ID database 2201.

Figure 17:
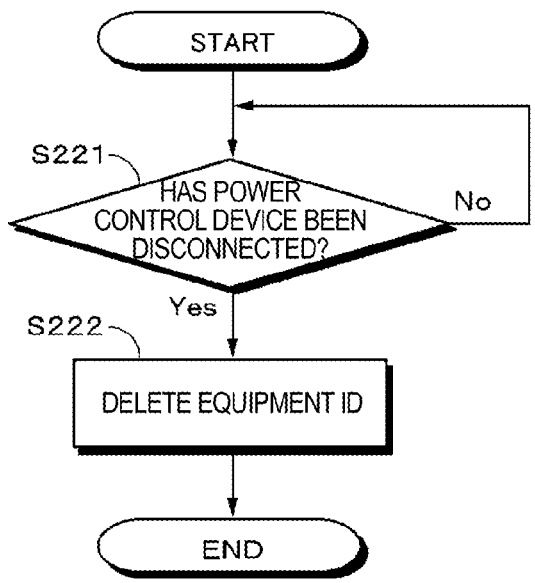
FIG. 17 is a flowchart showing a flow of equipment ID deletion processing.

Next, deletion processing to delete the equipment ID of the power control device 10 will be explained with reference to a flowchart shown in FIG. 17. The deletion of the equipment ID is performed when a failure occurs in the power control device 10 and the power control device 10 is inoperable, or when the power control device 10 is disposed of.

First, at step S221, it is determined whether or not the connection between the power control device 10 and the power/point management server 2200 has been disconnected. For example, when the stored electricity amount data is not transmitted from the power control device 10 for a specific period of time, it can be determined that the connection has been disconnected. Further, when the connection is disconnected, the power control device 10 may transmit a predetermined signal to the power/point management server 2200 to notify the disconnection, and it may be determined that the connection has been disconnected when the power/point management server 2200 receives the predetermined signal.

In addition, when the energy storage equipment owner notices an abnormality or fault etc. in the power control device 10 or the energy storage equipment 100 etc., the energy storage equipment owner may be allowed to instruct the connection to be cut and the equipment ID to be deleted from the equipment ID database 2201, by performing a predetermined operation input on the input portion 21.

When the connection between the power control device 10 and the power/point management server 2200 is disconnected (yes at step S221), next, at step S222, the equipment ID corresponding to the disconnected power control device 10 is deleted from the equipment ID database 2201.

If, due to some failure, the power control device 10 is temporarily inoperable, there is a case in which the power control device 10 is once more operable due to repair or so on. In this case, the equipment ID may be deleted after a predetermined period of time has elapsed after it is determined that the connection between the power control device 10 and the power/point management server 2200 has been disconnected. In this way, it is possible to inhibit the equipment ID from being mistakenly deleted.

With the present technology, as described above, the point issuing portion 223 acquires the stored electricity amount information that indicates the amount of electricity stored in the storage battery module 30, and issues the points based on the stored electricity amount information. Here, if the amount of stored electricity does not change for a predetermined period of time, the point issuing portion 223 notifies the equipment ID management portion 2202 of this fact. The equipment ID management portion 2202 may delete the equipment ID as an indication that the energy storage equipment owner no longer uses the service of the power management system.

In this way, the power/point management server 2200 stores and manages the equipment ID of each of the power control devices 10 under its management on the equipment ID database 2201. Further, the equipment ID of the power control device 10 that has been disposed of etc. is deleted. In this way, it is possible to always ascertain the number of the power control devices 10 that are under the management of the power/point management server 2200.

5. Third Embodiment

5.1 Configuration of Power Control Device

Figure 18:
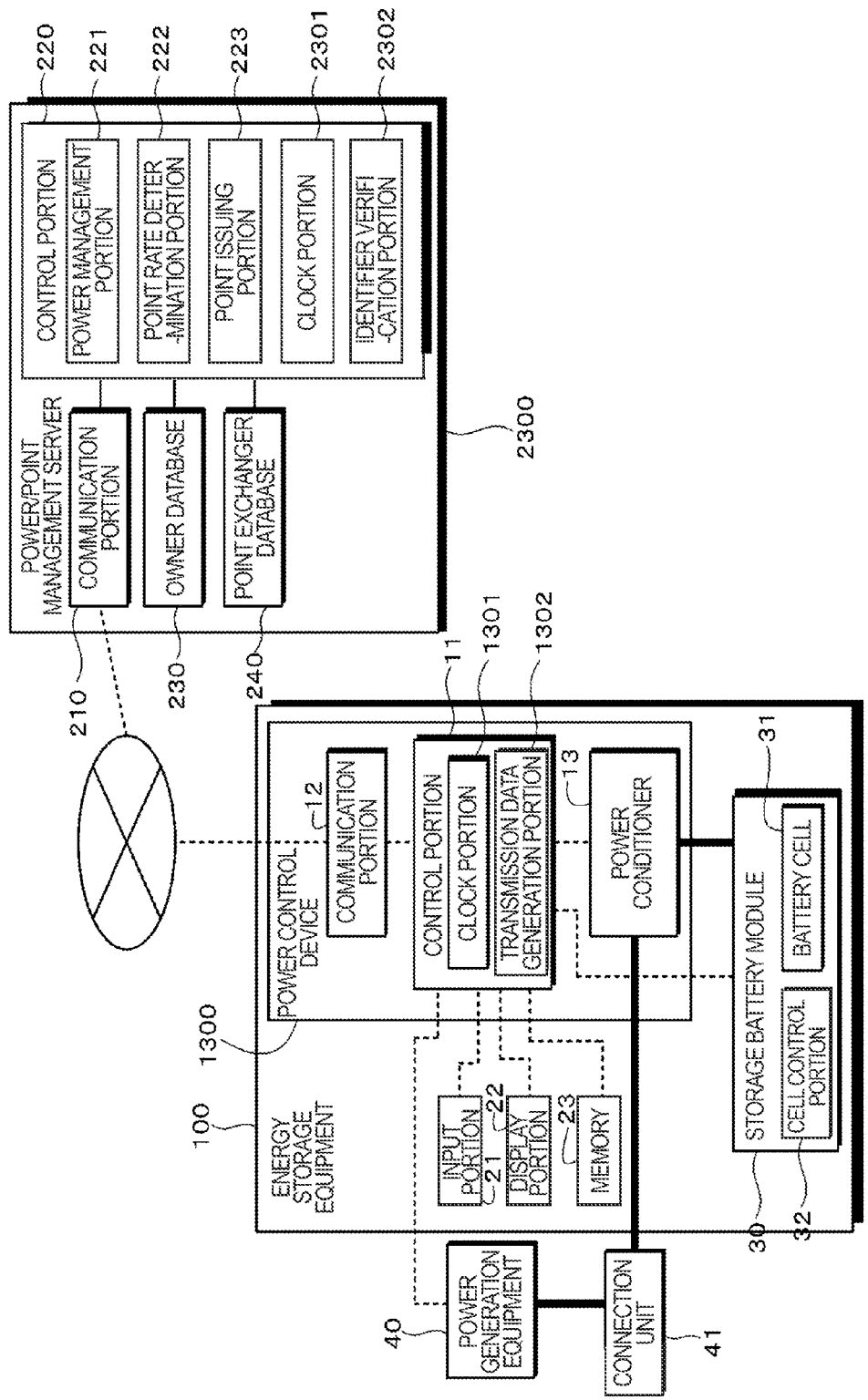
FIG. 18 is a block diagram showing a configuration of a power control device and a power/point management server according to a third embodiment of the present technology.

Next, a third embodiment will be explained, which is an embodiment that addresses the threat described in section (4) above. FIG. 18 is a block diagram showing the configuration of the energy storage equipment 100 and a configuration of a power/point management server 2300 according to the third embodiment. According to the third embodiment, by executing predetermined programs, the control portion 11 of a power control device 1300 functions as a clock portion 1301 and as a transmission data generation portion 1302. Note that, apart from the clock portion 1301 and the transmission data generation portion 1302, the configuration is the same as that explained with reference to FIG. 2 above, and an explanation is therefore omitted here.

The clock portion 1301 measures a current time and generates time information. The clock portion 1301 corresponds to an identifier generation portion within the scope of the appended claims. The transmission data generation portion 1302 generates the stored electricity amount data to be transmitted to the power/point management server 2300. The transmission data generation portion 1302 generates the stored electricity amount data by adding a predetermined identifier to the stored electricity amount information that indicates the amount of electricity stored in the storage battery module 30. The stored electricity amount information included in the stored electricity amount data is a reference for the point issuing by the power/point management server 2300, as described above. The generation and transmission of the stored electricity amount data is performed in response to the command from the point issuing portion 223 of the power/point management server 2300 querying the amount of stored electricity.

Figure 19:
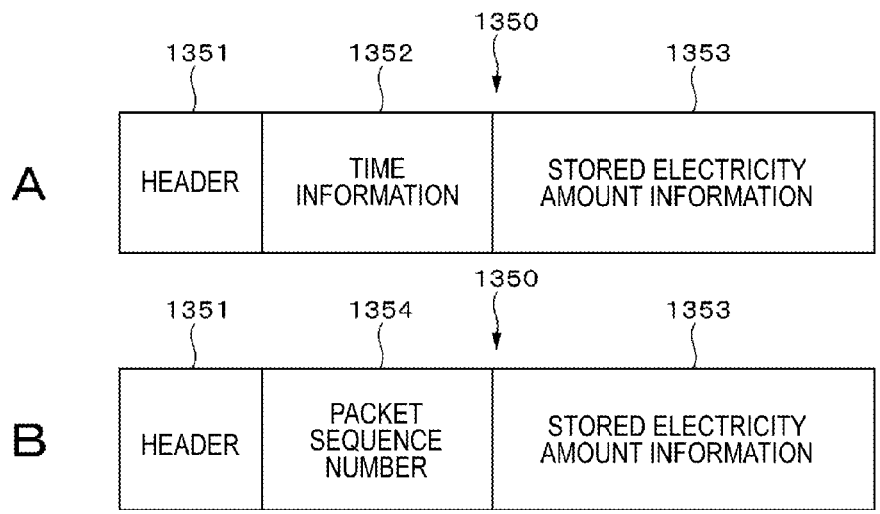
FIG. 19A is a diagram showing a configuration of the stored electricity amount information and an identifier.
FIG. 19B is a diagram showing a configuration of the stored electricity amount information and an identifier.

FIG. 19A and FIG. 19B show examples of the stored electricity amount data generated by the transmission data generation portion 1302. Stored electricity amount data 1350 shown in FIG. 19A is formed of a header 1351, time information 1352 that is an identifier, and stored electricity amount information 1353. The time information 1352 is acquired from the clock portion 1301 and indicates, for example, a date and time at which the command querying the amount of stored electricity is received from the power/point management server 2300.

When the transmission data generation portion 1302 acquires the time information and the stored electricity amount information, the transmission data generation portion 1302 generates the stored electricity amount data by adding the header and the time information to the stored electricity amount information. The generated stored electricity amount data is transmitted to the power/point management server 2300 via the communication portion 12 and the network.

5.2 Configuration of Power/Point Management Server

The power/point management server 2300 will be explained. By executing predetermined programs, the control portion 220 of the power/point management server 2300 also functions as a clock portion 2301 and an identifier verification portion 2302. Note that, apart from the clock portion 2301 and the identifier verification portion 2302, the configuration is the same as that explained with reference to FIG. 2 above, and an explanation is therefore omitted here.

The clock portion 2301 measures a current time and generates time information. Note that, the clock portion 2301 of the power/point management server 2300 and the clock portion 1301 of the power control device 1300 are synchronized, and a time indicated by the generated time information is substantially the same. As a method for synchronization, for example, a method is conceivable in which the time information generated by the clock portion 2301 of the power/point management server 2300 is transmitted to the power control device 1300 and the power control device 1300 sets the clock portion 1301 based on that time information.

The identifier verification portion 2302 verifies whether or not the stored electricity amount data transmitted from the power control device 1300 is valid. As described above, the generation and the transmission of the stored electricity amount data is performed in response to the query command from the power/point management server 2300. Thus, it is possible to determine whether or not the stored electricity amount data is valid based on the time indicated by the time information included in the stored electricity amount data, and on the time at which the power/point management server 2300 transmits the query command to the power control device 1300.

When the time indicated by the time information included in the stored electricity amount data and the time at which the power/point management server 2300 transmits the query command are substantially the same or when they are within a predetermined close range, it can be determined that the stored electricity amount data is valid. This is because, when the times are substantially the same or are within the predetermined close range, it can be said that the stored electricity amount data is generated in response to the query command from the power/point management server 2300.

On the other hand, when the time indicated by the time information included in the stored electricity amount data and the time at which the power/point management server 2300 issued the command instructing the generation and transmission of the stored electricity amount data are not within the predetermined close range, it is determined that the stored electricity amount data is not valid, namely that it has not been generated in response to the latest query command.

Verification results from the identifier verification portion 2302 are supplied to the point issuing portion 223. Then, when the supplied verification result indicates that the stored electricity amount data is valid, the point issuing portion 223 issues points in accordance with the stored electricity amount information. On the other hand, when the verification result indicates that the stored electricity amount data is not valid, the point issuing portion 223 does not issue the points.

5.3 Processing According to Third Embodiment

Figure 20:
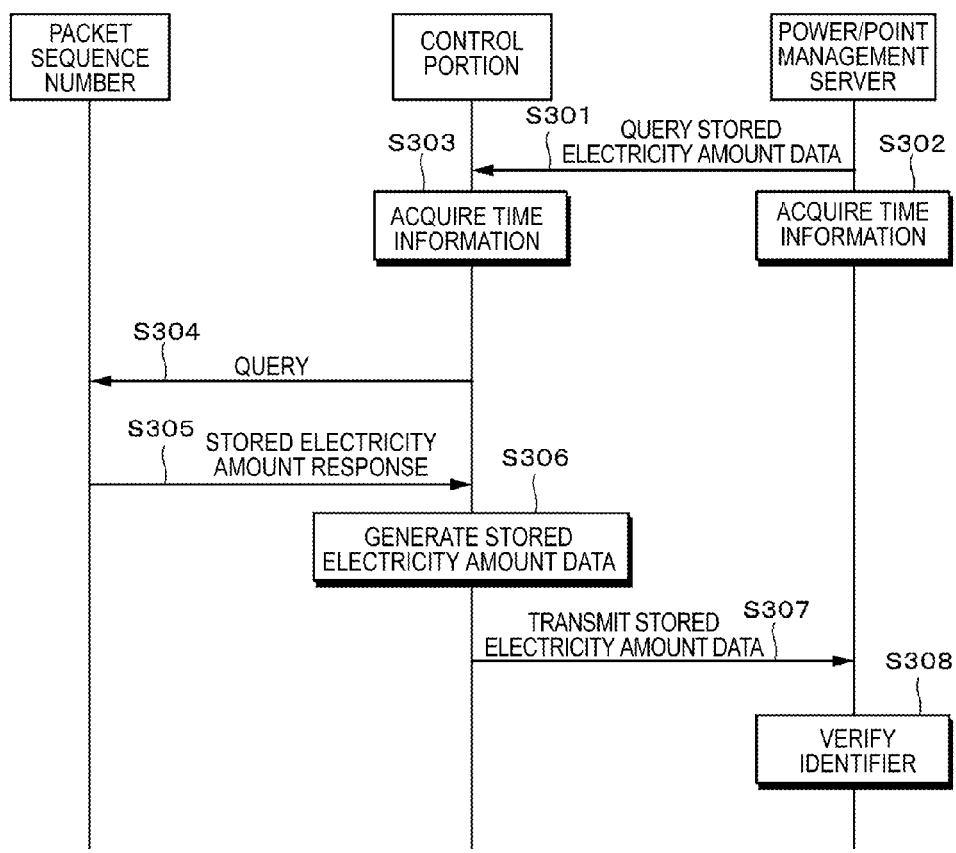
FIG. 20 is a flowchart showing a flow of identifier validation processing.

Processing performed between the power control device 1300 and the power/point management server 2300 will be explained with reference to FIG. 20. First, at step S301, the power/point management server 2300 transmits, to the power control device 1300, the command that queries the stored electricity amount data. Note that the query command is issued by the point issuing portion 223. Further, at step S302, the identifier verification portion 2302 acquires, from the clock portion 1301, time information that indicates a time of transmission of the query command.

Next, at step S303, the transmission data generation portion 1302 of the power control device 1300 acquires, from the clock portion 1301, time information that indicates a time at which the query command is received from the power/point management server 2300. Then, the query is performed with respect to the amount of electricity stored in the storage battery module 30. In response to the query, at step S305, the storage battery module 30 transmits the stored electricity amount information to the control portion 11.

Next, at step S306, the transmission data generation portion 1302 generates the stored electricity amount data that is formed of the stored electricity amount information, the time information (the identifier) acquired at step S303 and the header. Then, at step S307, the control portion 11 transmits the stored electricity amount data to the power/point management server 2300 via the communication portion 12.

Then, at step S308, the identifier verification portion 2302 of the power/point management server 2300 compares the time information acquired at step S302 with the time information included in the stored electricity amount data, and thus verifies whether or not the stored electricity amount data is valid. When the time information on the power/point management server 2300 side and the time information on the power control device 1300 side are within the predetermined close range, it is determined that the stored electricity amount data is valid, namely, that the stored electricity amount data has been generated in response to the latest query command.

When the stored electricity amount data is valid, the point issuing portion 223 issues the points based on the stored electricity amount information included in the stored electricity amount data. On the other hand, when the time information on the power/point management server 2300 side and the time information on the power control device 1300 side are not within the predetermined close range, it is determined that the stored electricity amount data is not valid, namely, that the stored electricity amount data has not been generated in response to the latest query command. In this case, the point issuing is not performed.

In this way, for example, even if a malicious energy storage equipment owner holds the stored electricity amount information when the amount of stored electricity is large and re-transmits the held stored electricity amount information in response to the query from the power/point management server 2300, it is determined that the stored electricity amount information is not valid. Thus, the points are not issued based on the stored electricity amount information and it is possible to inhibit the fraudulent acquisition of many points.

It should be noted that the identifier is not limited to the time information, and a packet sequence number may be used as the identifier as shown in FIG. 19B. In this case, the identifier verification portion 2302 can determine whether or not the stored electricity amount data is valid by checking the sequence number. Similarly to the above-described time information and packet sequence number, any information may be used as the identifier, as long as the information is unique to the transmitted stored electricity amount data and is information that differs for each time of generation and time of transmission.

6. Fourth Embodiment

6.1 Configuration of Power Control Device

Figure 21:
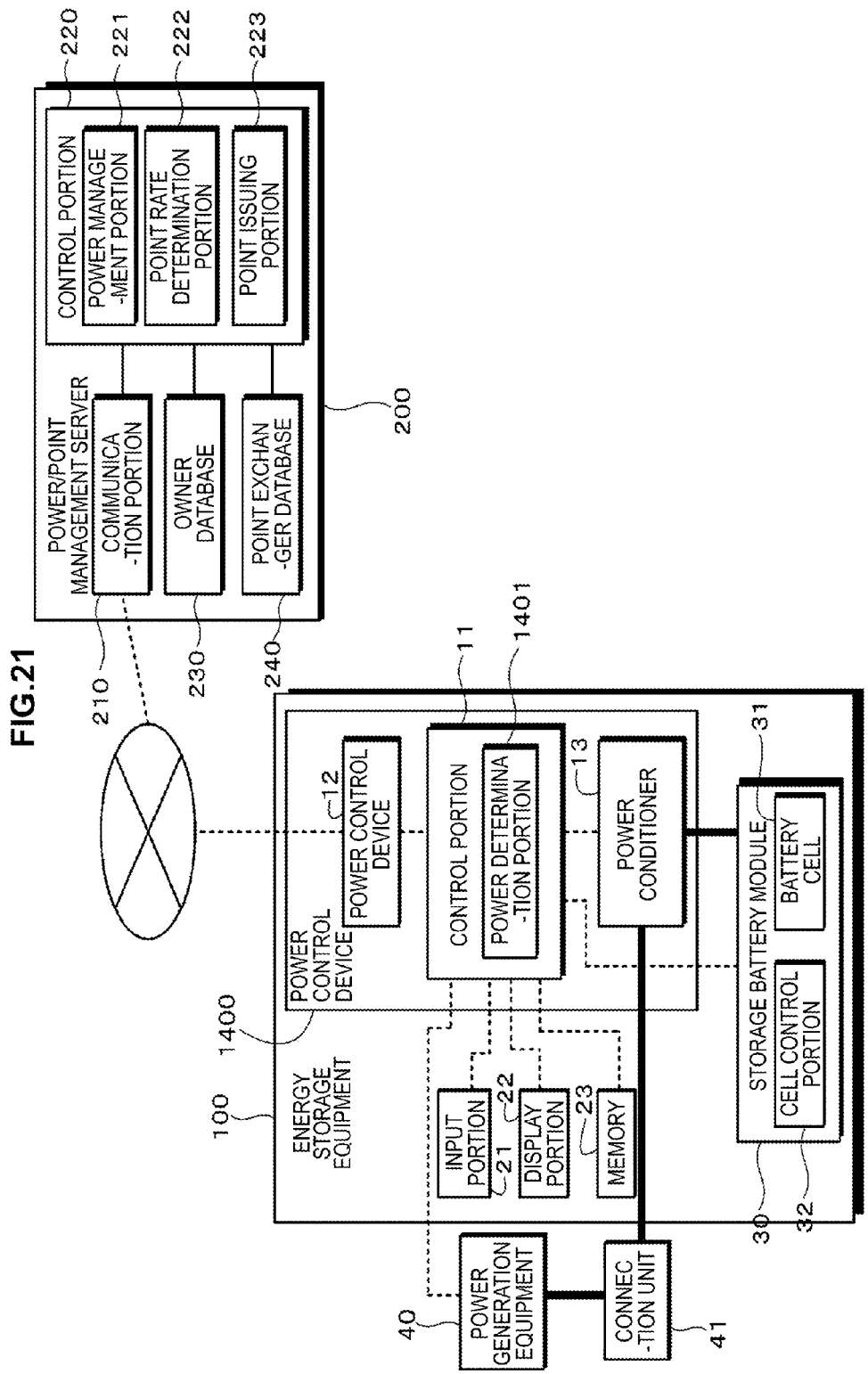
FIG. 21 is a block diagram showing a configuration of a power control device and the power/point management server according to a fourth embodiment.

Next, a fourth embodiment will be explained, which is an embodiment that addresses the threat described in section (5) above. FIG. 21 is a block diagram showing the configuration of the energy storage equipment 100 and the configuration of the power/point management server 200 according to the fourth embodiment.

In the fourth embodiment, by executing a predetermined program, the control portion 11 of a power control device 1400 functions as a power determination portion 1401. Apart from the power determination portion 1401, the configuration is the same as that explained with reference to FIG. 2 above, and an explanation is therefore omitted here.

The power determination portion 1401 determines whether or not the stored electricity amount information acquired from the storage battery module 30 and information acquired from the power conditioner 13 satisfy predetermined conditions. The information acquired from the power conditioner 13 and determination processing performed by the power determination portion 1401 will be explained in detail later. A determination result by the power determination portion 1401 is transmitted to the power/point management server 200 via the communication portion 12 and the network.

6.2 Processing According to Fourth Embodiment

Figure 22:
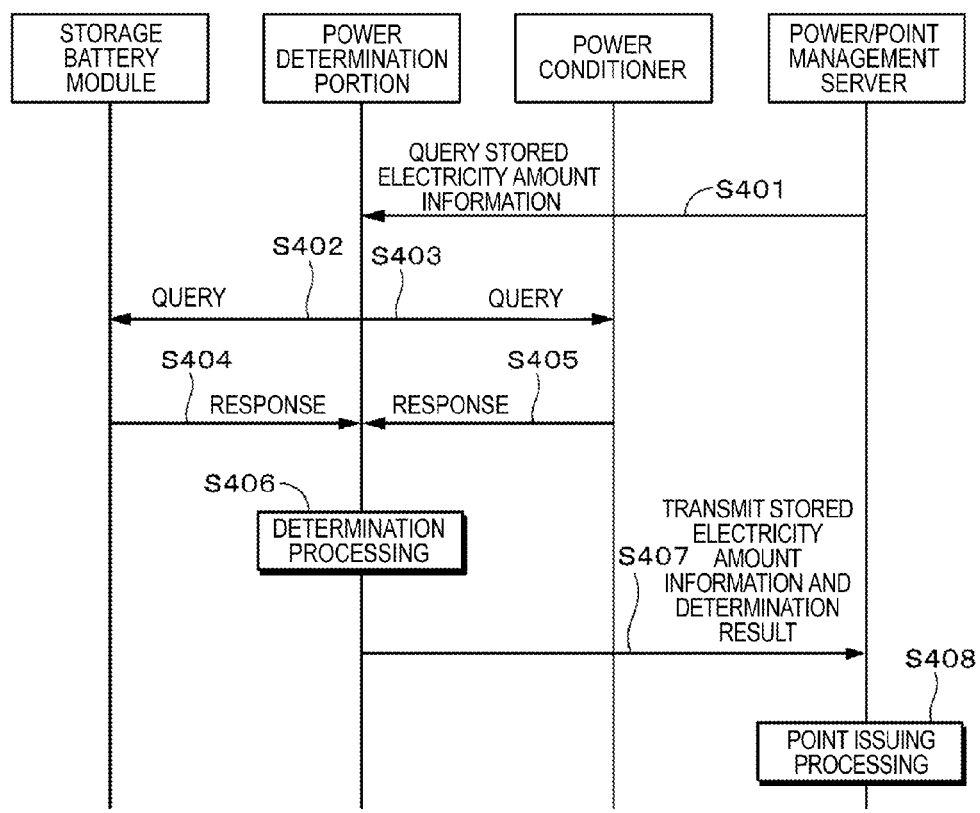
FIG. 22 is a sequence diagram of power determination processing.

Hereinafter, the power determination processing performed by the power determination portion 1401 will be explained. FIG. 22 is a sequence diagram of the power determination processing. First, at step S401, the query command is transmitted from the power/point management server 200 that instructs the power control device 1400 to transmit the stored electricity amount information. Next, at step S402, the power determination portion 1401 transmits, to the cell control portion 32 of the storage battery module 30, a query command that requests transmission of the information to be used in the power determination processing. Similarly, at step S403, the power determination portion 1401 also transmits, to the power conditioner 13, a query command that requests transmission of the information to be used in the power determination processing.

Next, at step S404, the cell control portion 32 of the storage battery module 30 transmits, to the power determination portion 1401, the requested information (hereinafter referred to as first determination information) to be used in the power determination processing. Here, the first determination information supplied from the storage battery module 30 will be explained. When the cell control portion 32 of the storage battery module 30 receives the query command from the power determination portion 1401, it measures an amount of stored electricity E1 in the storage battery module 30 at that point in time. Then, a difference is calculated between the amount of stored electricity E1 and an amount of stored electricity E0 that was previously measured when the power determination portion 1401 sent a previous query command (namely, E0−E1 is calculated). The cell control portion 32 transmits the amount of stored electricity difference (E0−E1) to the power determination portion 1401 as the first determination information.

Meanwhile, at step S405, the power conditioner 13 transmits, to the power determination portion 1401, the requested information (hereinafter referred to as second determination information) to be used in the power determination processing. Here, the second determination information transmitted from the power conditioner 13 will be explained. The power conditioner 13 constantly acquires a supply power amount P (t) of the power supplied to the storage battery module 30. A time at which the query command from the power determination portion 1401 is received is set to t0, and a time at which a previous query command is received from the power determination portion 1401 is set to 0. Then, an integral value P' of P (t) that is calculated using the following Formula 6 is transmitted to the power determination portion 1401 as the second determination information.

$$P' = \int_0^{t0} P(t)dt \quad \text{[Formula 6]}$$

Next, at step S406, the power determination portion 1401 estimates an amount of self-discharge of the storage battery module 30 as $\partial$, and determines whether or not the following Formula 7 is satisfied. When Formula 7 below is satisfied, the power determination portion 1401 determines that the amount of electricity stored in the storage battery module 30 and the supply power amount from the power conditioner 13 to the storage battery module 30 match each other. On the other hand, when Formula 7 below is not satisfied, the power determination portion 1401 determines that amount of electricity stored in the storage battery module 30 and the supply power amount from the power conditioner 13 to the storage battery module 30 do not match each other. Note that the determination that the amount of electricity stored in the storage battery module 30 and the supply power amount of the power conditioner 13 match each other is not limited to when Formula 7 is fully satisfied, and a range in which they are determined to match each other may have a predetermined width, taking into account a tolerance etc.

$$(E0-E1)+\partial=P' \quad \text{[Formula 7]}$$

More realistically, if it is assumed that an accuracy $\Delta\partial$ of the estimate of $\partial$ is estimated, the determination is performed based on the following Formula 8. Note that, in Formula 8, the equality sign part of the inequality sign can be present or absent.

$$(abs\{P'-(E0-E1)-\partial\}) \leq \Delta\partial \quad \text{[Formula 8]}$$

Note that, as it is possible for $\partial$ and $\Delta\partial$ to deteriorate over time, it is preferable for a value calculated using the following Formula 9 to be stored and held, and accumulated. By performing updates using the accumulated value, it is possible to improve the accuracy of the power determination processing.

$$P'-(E0-E1) \quad \text{[Formula 9]}$$

Note that it is assumed that initial values, at the time of shipment, of the amount of electricity stored in the storage battery module 30 and the power supply amount of the power conditioner 13 are known.

Next, at step S407, the control portion 11 transmits the power determination result and the stored electricity amount information to the power/point management server 200 via the communication portion 12. Then, at step S408, the point issuing portion 223 of the power/point management server 200 performs the point issuing processing based on the stored electricity amount information. As described above, the point issuing processing is performed when the power determination portion 1401 determines that the amount of electricity stored in the storage battery module 30 and the supply power amount of the power conditioner 13 match each other, and if they do not match, the point issuing processing is not performed.

When the point issuing processing is not performed, the power/point management server 200 may notify the power control device 1400 of that fact. The notification is presented to the energy storage equipment owner by being displayed as an image on the display portion 22 of the energy storage equipment 100, for example.

In the above explanation, the cell control portion 32 of the storage battery module 30 calculates "E0–E1" and the power conditioner 13 calculates a value of Formula 6, but the power determination portion 1401 may perform calculation of each of the values.

As described above, by accurately acquiring the amount of electricity stored in the storage battery module 30, it is possible to inhibit the fraudulent acquisition of points by overwriting the amount of stored electricity and so on.

6.3 First Modified Example of Fourth Embodiment

Figure 23:
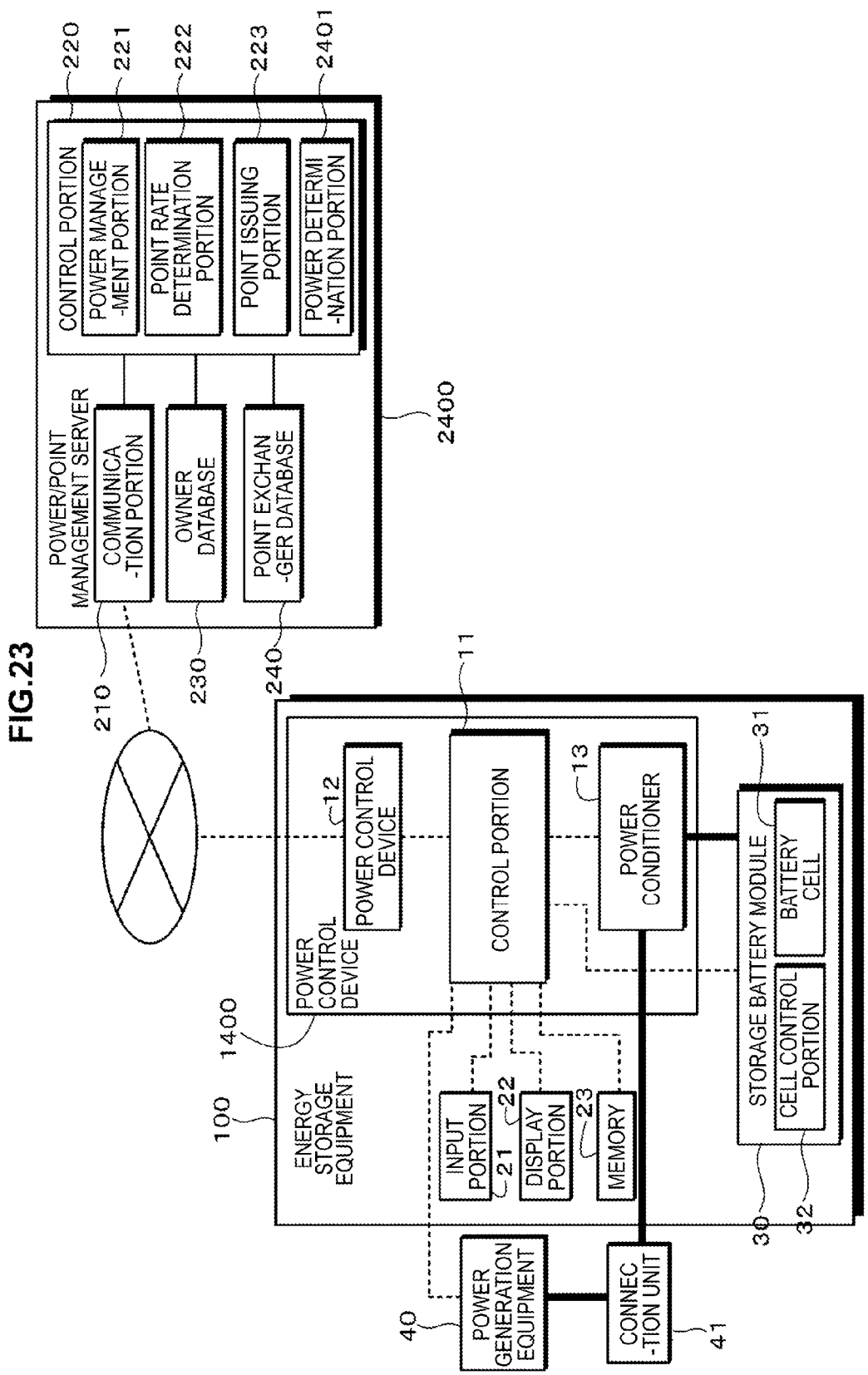
FIG. 23 is a block diagram showing a configuration of the power control device and a power/point management server according to a first modified example of the fourth embodiment.

Next, a first modified example of the fourth embodiment will be explained. FIG. 23 is a block diagram showing a configuration of a power/point management server 2400 and the power control device 1400 according to the first modified example of the fourth embodiment. According to the first modified example of the fourth embodiment, by executing a predetermined program, the control portion 220 of the power/point management server 2400 functions as a power determination portion 2401. Apart from the power determination portion 2401, the configuration is the same as that explained with reference to FIG. 2 above, and an explanation is therefore omitted here.

Figure 24:
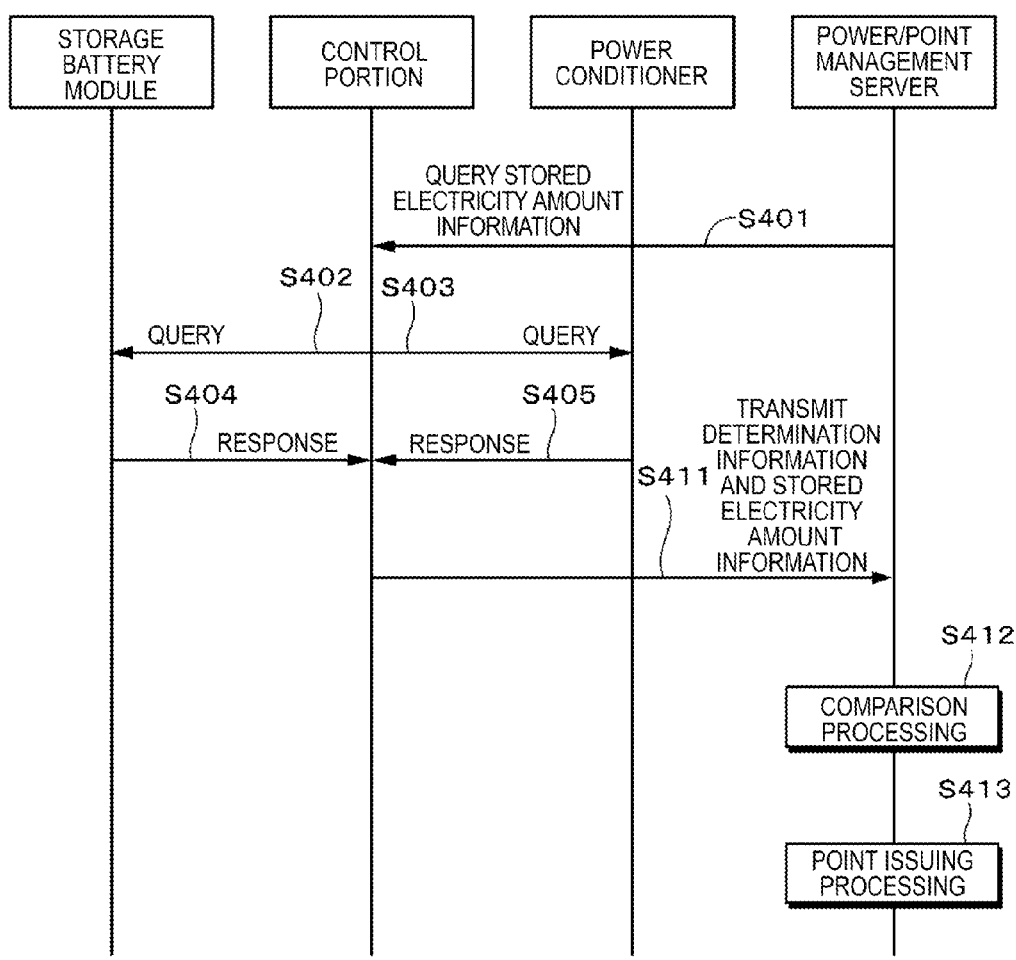
FIG. 24 is a sequence diagram of power determination processing according to the first modified example of the fourth embodiment.

FIG. 24 is a sequence diagram of the power determination processing according to the first modified example of the fourth embodiment. In the first modified example of the fourth embodiment, the control portion 220 of the power/point management server 2400 functions as the power determination portion 2401, and the power determination processing is performed on the power/point management server 2400 side. Note that step S401 to step S405 shown in the sequence in FIG. 24 are the same as those of the fourth embodiment and an explanation is therefore omitted here.

At step S411, the control portion 11 of the power control device 1400 transmits the first determination information, the second determination information and the stored electricity amount information to the power/point management server 2400 via the communication portion 12. Then, in the power/point management server 2400, the first determination information and the second determination information is supplied to the power determination portion 2401, and the stored electricity amount data is supplied to the point issuing portion 223. Next, at step S412, the power determination portion 2401 of the power/point management server 2400 performs the power determination processing. Note that the power determination processing is the same as that of the fourth embodiment and an explanation is therefore omitted here. The determination result by the power determination processing is supplied to the point issuing portion 223.

Then, at step S413, the point issuing portion 223 performs the point issuing processing based on the stored electricity amount information. The point issuing processing is performed when it is determined by the power determination portion 2401 that the first determination information and the second determination information satisfy the above-described Formula 7. On the other hand, when the first determination information and the second determination information do not satisfy the above-described Formula 7, the point issuing processing is not performed.

The power determination processing according to the first modified example of the fourth embodiment is performed in the above-described manner. In this way, the power determination processing may also be performed on the power/point management server 2400 side.

6.4 Second Modified Example of Fourth Embodiment

Figure 25:
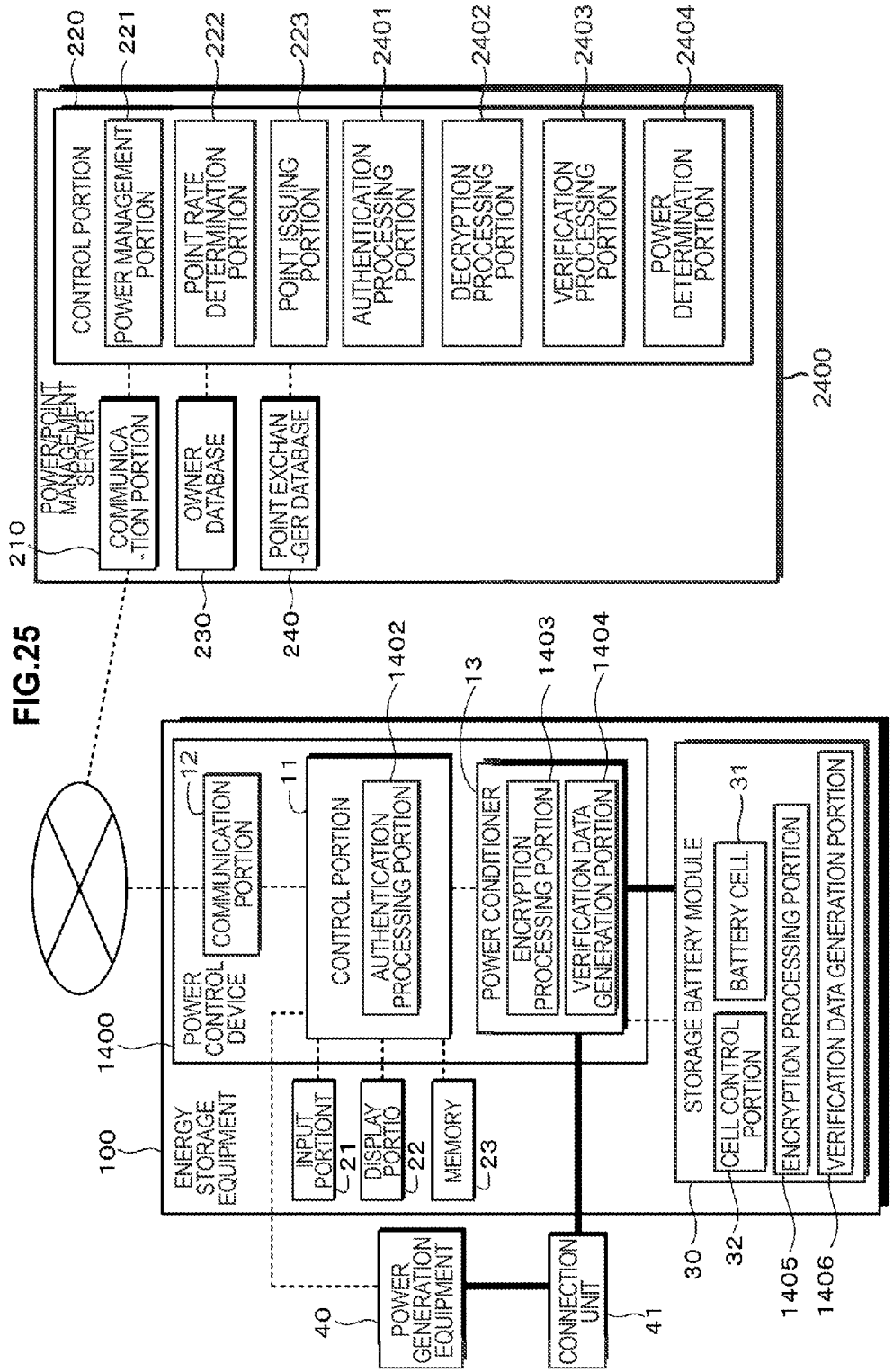
FIG. 25 is a block diagram showing a configuration of the power control device and the power/point management server according to a second modified example of the fourth embodiment.

Next, a second modified example of the fourth embodiment will be explained. The second modified example of the fourth embodiment is a case in which the above-described encryption processing and tampering verification processing according to the first embodiment are applied to the fourth embodiment. FIG. 25 is a block diagram showing the configuration of the second modified example of the fourth embodiment.

By executing a predetermined program, the control portion 11 of the power control device 1400 functions as an authentication processing portion 1402. The authentication processing portion 1402 is the same as the above-described authentication processing portion 1101 according to the first embodiment, and performs the mutual authentication with an authentication processing portion 2401 of the power/point management server 2400, using the challenge response system, for example.

Further, the power conditioner 13 is provided with an encryption processing portion 1403 and a verification data generation portion 1404. In addition, the storage battery module 30 is provided with an encryption processing portion 1405 and a verification data generation portion 1406. The power conditioner 13, and the encryption processing portion and the verification data generation portion of the storage battery module 30 may be realized by a CPU executing programs, or may be realized by dedicated hardware.

The functions of the encryption processing portion 1403 in the power conditioner 13 are the same as those according to the above-described first embodiment, and the encryption processing portion 1403 performs encryption processing on the second determination information using the common key encryption system, for example. Further, the functions of the verification data generation portion 1404 are the same as those according to the above-described first embodiment, and the verification data generation portion 1404 generates verification data that is used to verify whether or not the second determination information supplied from the power conditioner 13 to the control portion 11 has been tampered with. The verification data may be a MAC, a digital signature or the like.

The functions of the encryption processing portion 1405 of the storage battery module 30 are the same as those according to the above-described first embodiment, and the encryption processing portion 1405 performs encryption processing on the first determination information using the common key encryption system, for example. Further, the functions of the verification data generation portion 1406 are the same as those according to the above-described first embodiment, and the verification data generation portion 1406 generates verification data that is used to verify whether or not the first determination information supplied from the storage battery module 30 to the control portion 11 has been tampered with. The verification data may be a MAC, a digital signature or the like.

By executing predetermined programs, the control portion 220 of the power/point management server 2400 functions as the authentication processing portion 2401, a decryption processing portion 2402, a verification processing portion 2403 and a power determination portion 2404. The authentication processing portion 2401 is the same as the above-described authentication processing portion 2101 according to the first embodiment, and performs the mutual authentication with the authentication processing portion 1402 of the power control device 1400 using the challenge response system, for example.

The decryption processing portion 2402 uses a common key to decrypt the information encrypted by the power conditioner 13 and the storage battery module 30 using the common key encryption system, for example.

Based on the verification data, the verification processing portion 2403 verifies whether or not the information transmitted to the power/point management server 2400 from the power control device 1400 has been tampered with.

Figure 26:
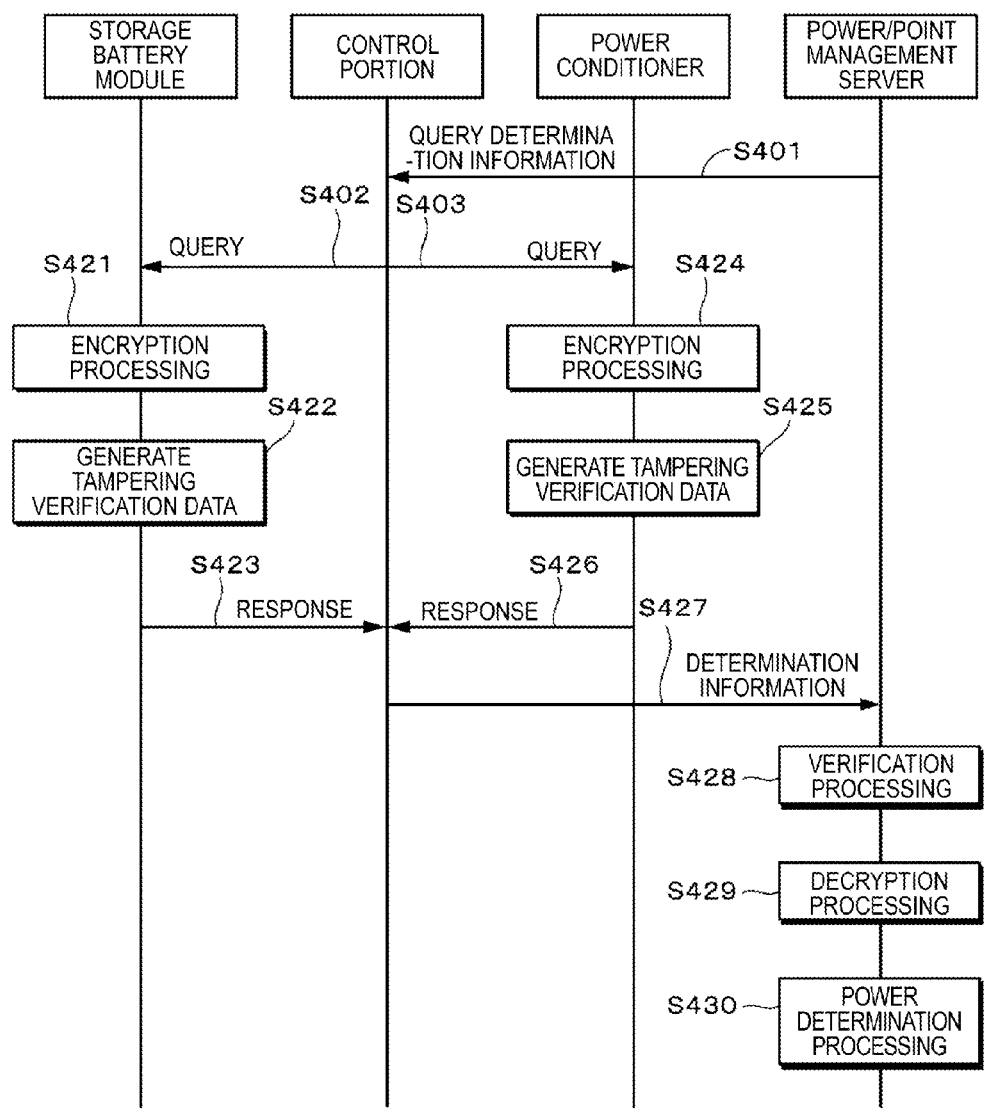
FIG. 26 is a sequence diagram showing power determination processing according to the second modified example of the fourth embodiment.

FIG. 26 is a sequence diagram of power determination processing according to the second modified example of the fourth embodiment. Note that, step S401 to step S403 shown in the sequence in FIG. 26 are the same as those shown in FIG. 22.

At step S421, in the storage battery module 30, the encryption processing portion 1405 performs encryption processing on the first determination information. Further, at step S422, the verification data generation portion 1406 generates verification data based on the first determination information. Then, at step S423, the verification data is added to the encrypted first determination information and the resultant first determination information is transmitted to the control portion 11.

Meanwhile, at step S424, in the power conditioner 13, the encryption processing portion 1403 performs encryption processing on the second determination information. Further, at step S425, the verification data generation portion 1404 generates verification data based on the second determination information. Then, at step S426, the verification data is added to the encrypted second determination information and the resultant second determination information is transmitted to the control portion 11.

Then, at step S427, the control portion 11 transmits the first determination information and the second determination information to the power/point management server 2400 via the communication portion 12.

At step S428, based on the verification data, the verification processing portion 2403 verifies whether or not the first determination information and the second determination information have been tampered with, and whether or not the first determination information and the second determination information have been transmitted from the valid transmission source. Next, at step S429, on the power/point management server 2400 side, the encryption processing portion 2402 decrypts the encrypted first determination information and second determination information.

Then, when it is determined by the verification processing portion 2403 that the first determination information and the second determination information have not been tampered with and have been transmitted from the valid transmission source, at step S430, the power determination portion 2404 performs the power determination processing of the first determination information and the second determination information.

By performing the encryption processing and the tampering verification processing on the first determination information and the second determination information in this manner, it is possible to enhance security in the power management system.

7. Fifth Embodiment

7.1 Configuration of Power Control Device

Figure 27:
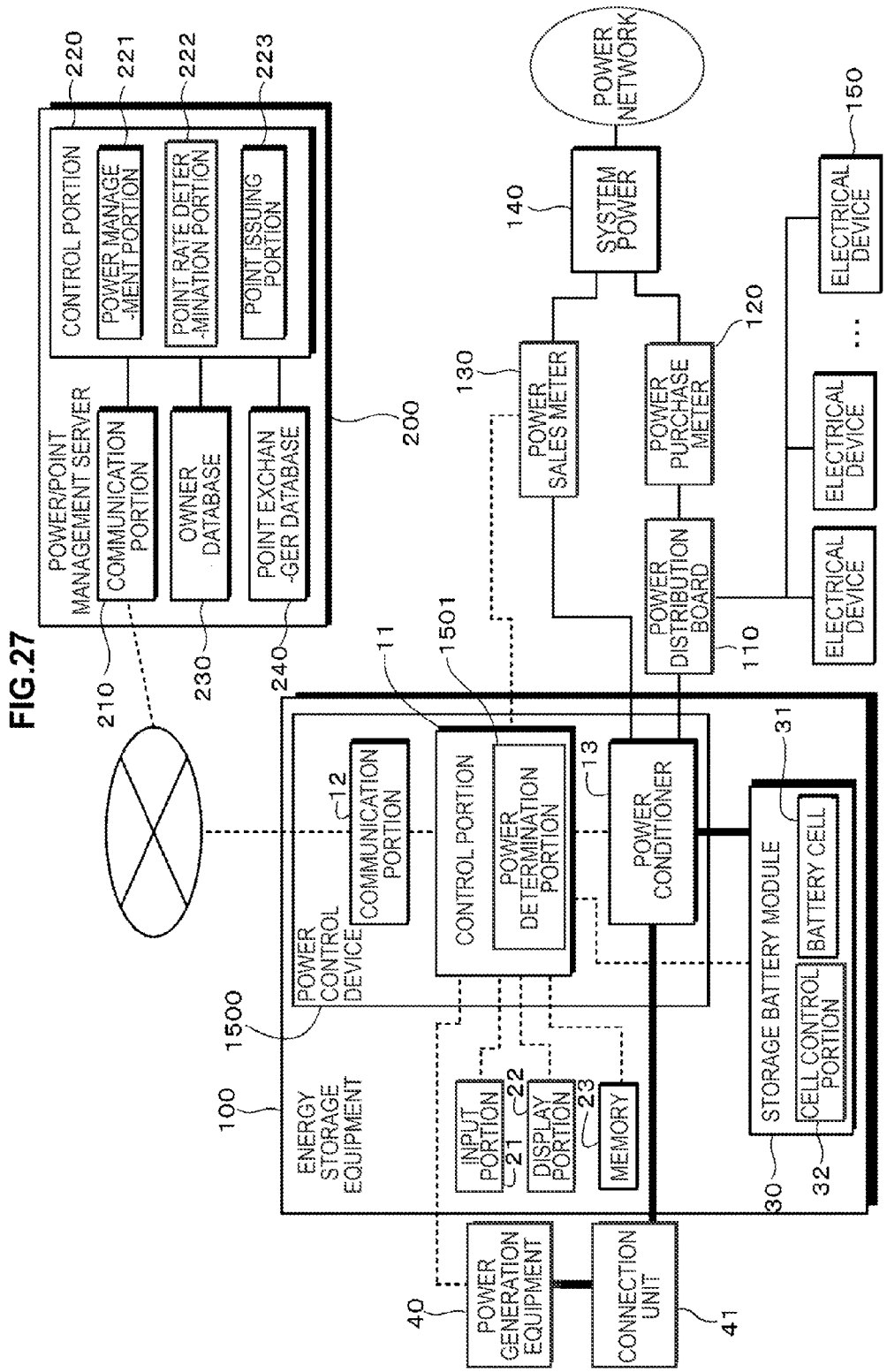
FIG. 27 is a block diagram showing a configuration of a power control device and the power/point management server according to a fifth embodiment.

Next, a fifth embodiment will be explained, which is an embodiment that addresses the threat described in section (6)

above. FIG. 27 is a block diagram showing the configuration of the energy storage equipment 100 and of the power/point management server 200 according to the fifth embodiment.

According to the fifth embodiment, by executing a predetermined program, the control portion 11 of a power control device 1500 functions as a power determination portion 1501. Apart from the power determination portion 1501, the configuration is the same as that explained with reference to FIG. 2 above, and an explanation is therefore omitted here.

First discharge amount information, which indicates an amount of electricity discharged to a power sales meter 130 from the power conditioner 13, is supplied to the power determination portion 1501 from the power conditioner 13. Further, second discharge amount information, which indicates an amount of electricity discharged to the power network via the power sales meter 130, is supplied to the power determination portion 1501 from the power sales meter 130. Then, the power determination portion 1501 determines whether or not the first discharge amount information and the second discharge amount information match each other, or determines whether or not the first discharge amount information and the second discharge amount information are approximate values within a predetermined range. A determination result by the power determination portion 1501 is transmitted to the power/point management server 200 via the communication portion 12 and the network.

7.2 Processing According to Fifth Embodiment

Figure 28:
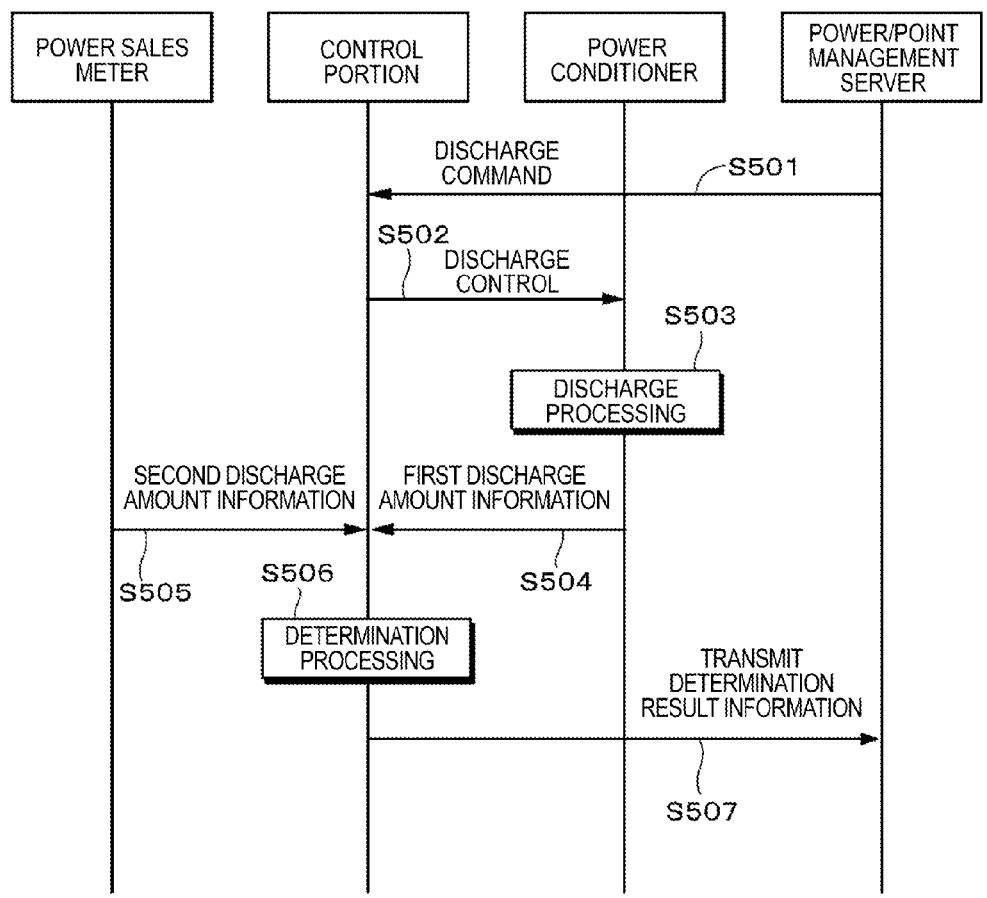
FIG. 28 is a sequence diagram of power determination processing according to the fifth embodiment.

Next, processing according to the fifth embodiment will be explained with reference to a sequence diagram shown in FIG. 28. First, at step S501, the power management portion 221 of the power/point management server 200 transmits, to the power control device 1500, the discharge command that instructs the discharge of the instructed amount of electricity to be discharged. Next, at step S502, the control portion 11 of the power control device 1500 controls the power conditioner 13 such that the electricity is discharged to the power sales meter 130. Then, at step S503, the power conditioner 13 discharges the electricity stored in the storage battery module 30, and outputs the electricity to the power sales meter 130.

When the discharge of electricity is complete, next at step S504, the power conditioner 13 transmits the first discharge amount information to the control portion 11. Further, when the discharge of electricity to the system power 140 is complete, at step S505, the power sales meter 130 transmits the second discharge amount information to the control portion 11.

Next, at step S506, the power determination portion 1501 determines whether or not the first discharge amount information and the second discharge amount information match each other, or whether or not the first discharge amount information and the second discharge amount information are approximate values within the predetermined range. In this way, it is possible to determine whether or not the discharge of electricity has been accurately performed. When the first discharge amount information and the second discharge amount information match each other or are approximate values within the predetermined range, it can be determined that the discharge of electricity has been accurately performed. On the other hand, when the first discharge amount information and the second discharge amount information do not match each other or are not approximate values within the predetermined range, it can be determined that the discharge of electricity has not been accurately performed. Note that the predetermined range of approximate values may be set in advance, taking into account error etc. arising from characteristics of the power conditioner 13, power loss on power paths and so on.

Then, at step S507, the control portion 11 of the power control device 1500 transmits determination result information to the power/point management server 200 via the communication portion 12. In this way, on the power/point management server 200 side, the point issuer can ascertain whether or not the discharge of electricity has been correctly performed.

Note that, when the power/point management server 200 receives the determination result that the discharge of electricity has not been correctly performed a predetermined number of consecutive times, or when the predetermined number of times is reached by accumulation, the power/point management server 200 may transmit, to the power control device 1500, a predetermined control signal that causes the display portion 22 to display that fact, thereby notifying the energy storage equipment owner of that fact.

When notifying a user, a message may be displayed on the display portion 22 that prompts the energy storage equipment owner to check whether or not a fault or an abnormality has occurred in the power control device 1500 or the energy storage equipment 100. Note that the determination result by the power determination portion 1501 is stored in the owner database 230 etc. in association with the information of each of the energy storage equipment owners, and this may be used as material to determine a fault or dishonest behavior etc.

7.3 Modified Example of Fifth Embodiment

Figure 29:
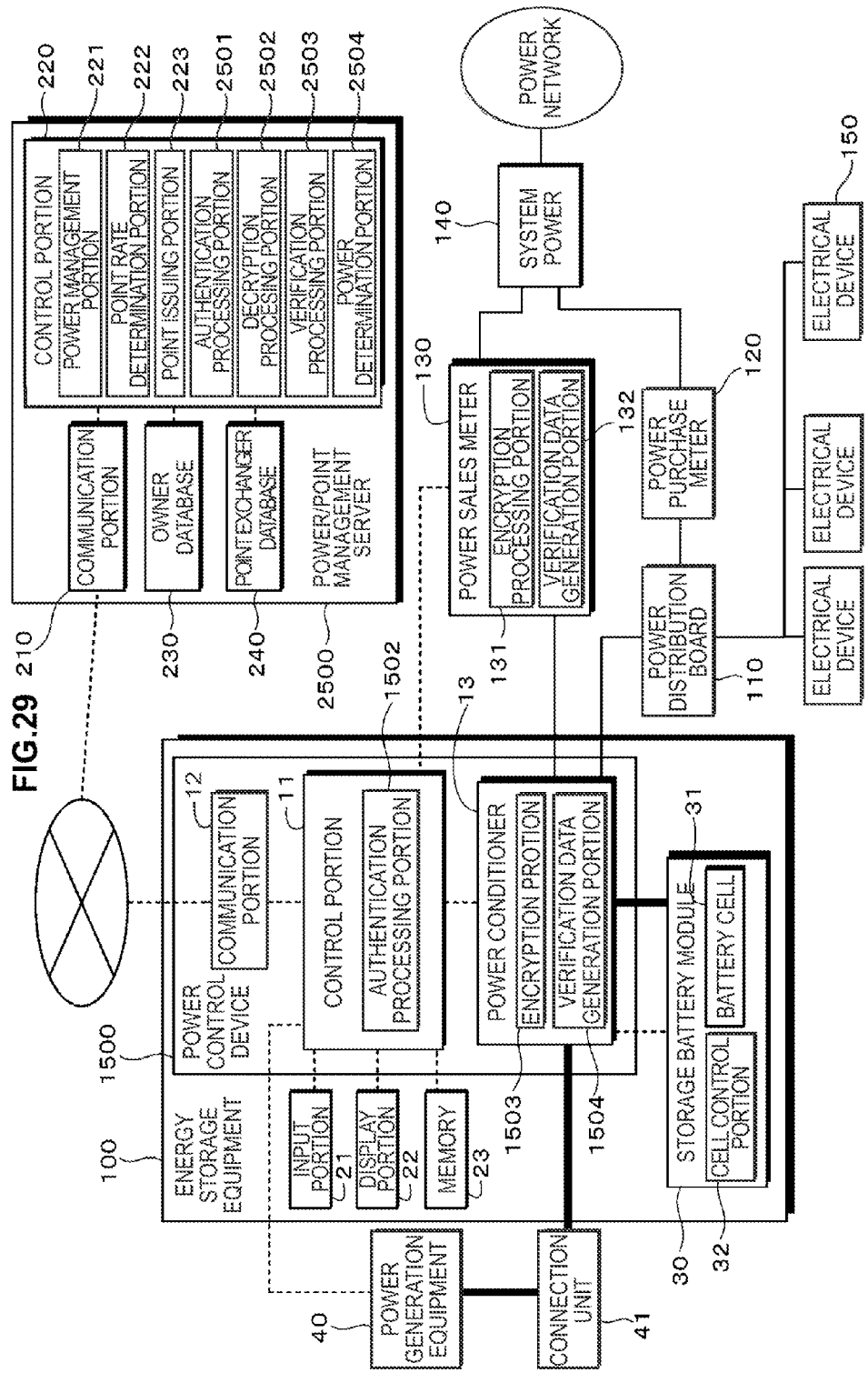
FIG. 29 is a block diagram showing a configuration of the power control device and a power/point management server according to a modified example of the fifth embodiment.

Next, a modified example of the fifth embodiment will be explained. The modified example of the fifth embodiment is a case in which the above-described authentication processing, encryption processing and tampering verification processing according to the first embodiment are applied to the fifth embodiment. FIG. 29 is a block diagram showing a configuration of the modified example of the fifth embodiment.

By executing a predetermined program, the control portion 11 of the power control device 1500 functions as an authentication processing portion 1502. The authentication processing portion 1502 is the same as the above-described authentication processing portion 1101 according to the first embodiment, and performs the mutual authentication with an authentication processing portion 2501 of a power/point management server 2500 using the challenge response system, for example.

The power conditioner 13 is provided with an encryption processing portion 1503 and a verification data generation portion 1504. Further, the power sales meter 130 is provided with an encryption processing portion 131 and a verification data generation portion 132. The power conditioner 13, and the encryption processing portion and the verification data generation portion of the power sales meter 130 may be realized by a CPU executing programs, or may be realized by dedicated hardware.

The functions of the encryption processing portion 1503 in the power conditioner 13 are the same as those according to the above-described first embodiment, and the encryption processing portion 1503 performs encryption processing on the first discharge amount information using the common key encryption system, for example. Further, the functions of the verification data generation portion 1504 are the same as those according to the above-described first embodiment, and the verification data generation portion 1504 generates verification data that is used to verify whether or not the first discharge amount information supplied from the power conditioner 13 to the control portion 11 has been tampered with. The verification data may be a MAC, a digital signature or the like.

The functions of the encryption processing portion 131 of the power sales meter 130 are the same as those according to the above-described first embodiment, and the encryption processing portion 131 performs encryption processing on the second discharge amount information using the common key encryption system, for example. Further, the functions of the verification data generation portion 132 are the same as those according to the above-described first embodiment, and the verification data generation portion 132 generates verification data that is used to verify whether or not the second discharge amount information supplied from the power sales meter 130 to the control portion 11 has been tampered with. The verification data may be a MAC, a digital signature or the like.

The control portion 220 of the power/point management server 2500 functions as an authentication processing portion 2501, a decryption processing portion 2502, a verification processing portion 2503 and a power determination portion 2504. The authentication processing portion 2501 is the same as the authentication processing portion 2101 of the above-described first embodiment, and performs the mutual authentication with the authentication processing portion 1502 of the power control device 1500 using the challenge response system, for example.

The decryption processing portion 2502 uses a common key to decrypt the first discharge amount information that has been encrypted by the power conditioner 13 using the common key encryption system, for example, and to decrypt the second discharge amount information that has been encrypted by the power sales meter 130 using the common key encryption system, for example.

Based on the verification data, the verification processing portion 2503 verifies whether or not the first discharge amount information and the second discharge amount information transmitted to the power/point management server 2500 from the power control device 1500 has been tampered with.

Figure 30:
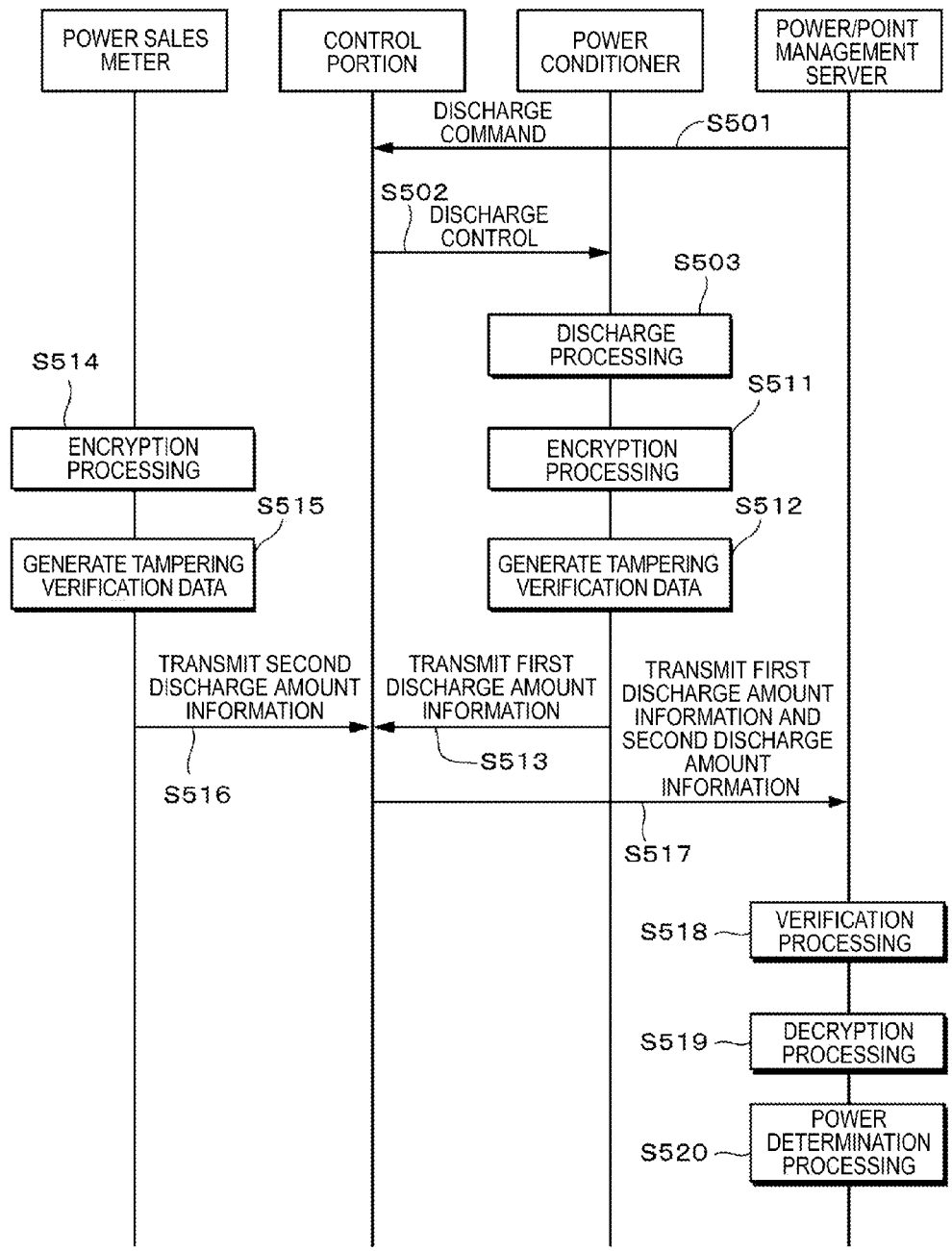
FIG. 30 is a sequence diagram of power determination processing according to the modified example of the fifth embodiment.

Hereinafter, processing according to the modified example of the fifth embodiment will be explained with reference to a sequence diagram shown in FIG. 30. Note that step S501 to step S503 are the same as those of the fifth embodiment and an explanation is therefore omitted here.

After the discharge of electricity to the power sales meter 130 is complete at step S503, the encryption processing portion 1503 of the power conditioner 13 performs encryption processing on the first discharge amount information at step S511. Next, at step S512, the verification data generation portion 1504 of the power conditioner 13 generates verification data with respect to the first discharge amount information. Then, at step S513, the power conditioner 13 transmits the encrypted first discharge amount information and the verification data to the control portion 11 of the power control device 1500.

Meanwhile, after the discharge of electricity to the system power 140 is complete, the encryption processing portion 131 of the power sales meter 130 performs encryption processing on the second discharge amount information at step S514. Next, at step S515, the verification data generation portion 132 of the power sales meter 130 generates verification data with respect to the second discharge amount information. Then, at step S516, the power sales meter 130 transmits the encrypted second discharge amount information and the verification data to the control portion 11 of the power control device 1500.

Next, at step S517, the control portion 11 transmits the first discharge amount information and its verification data, and the second discharge amount information and its verification data to the power/point management server 2500.

Next, at step S518, the verification processing portion 2503 verifies whether or not the first discharge amount information and the second discharge amount information have been tampered with, based on their respective verification data. Then, at step S519, the decryption processing portion 2502 of the power/point management server 2500 decrypts the encrypted first discharge amount information and second discharge amount information.

Then, at step S520, the power determination portion 2504 performs determination processing of the first discharge amount information and the second discharge amount information. In this way, it is possible to determine whether or not the discharge of electricity has been performed accurately. When the first discharge amount information and the second discharge amount information match each other or are approximate values within a predetermined range, it can be determined that the discharge of electricity has been accurately performed. On the other hand, when the first discharge amount information and the second discharge amount information do not match each other or are not approximate values within the predetermined range, it can be determined that the discharge of electricity has not been accurately performed.

As described above, the power determination processing may be performed on the power/point management server 2500 side. Further, by performing the encryption processing and the tampering verification processing on the first discharge amount information and the second discharge amount information, it is possible to enhance security of the power management system.

8. Sixth Embodiment

Figure 31:
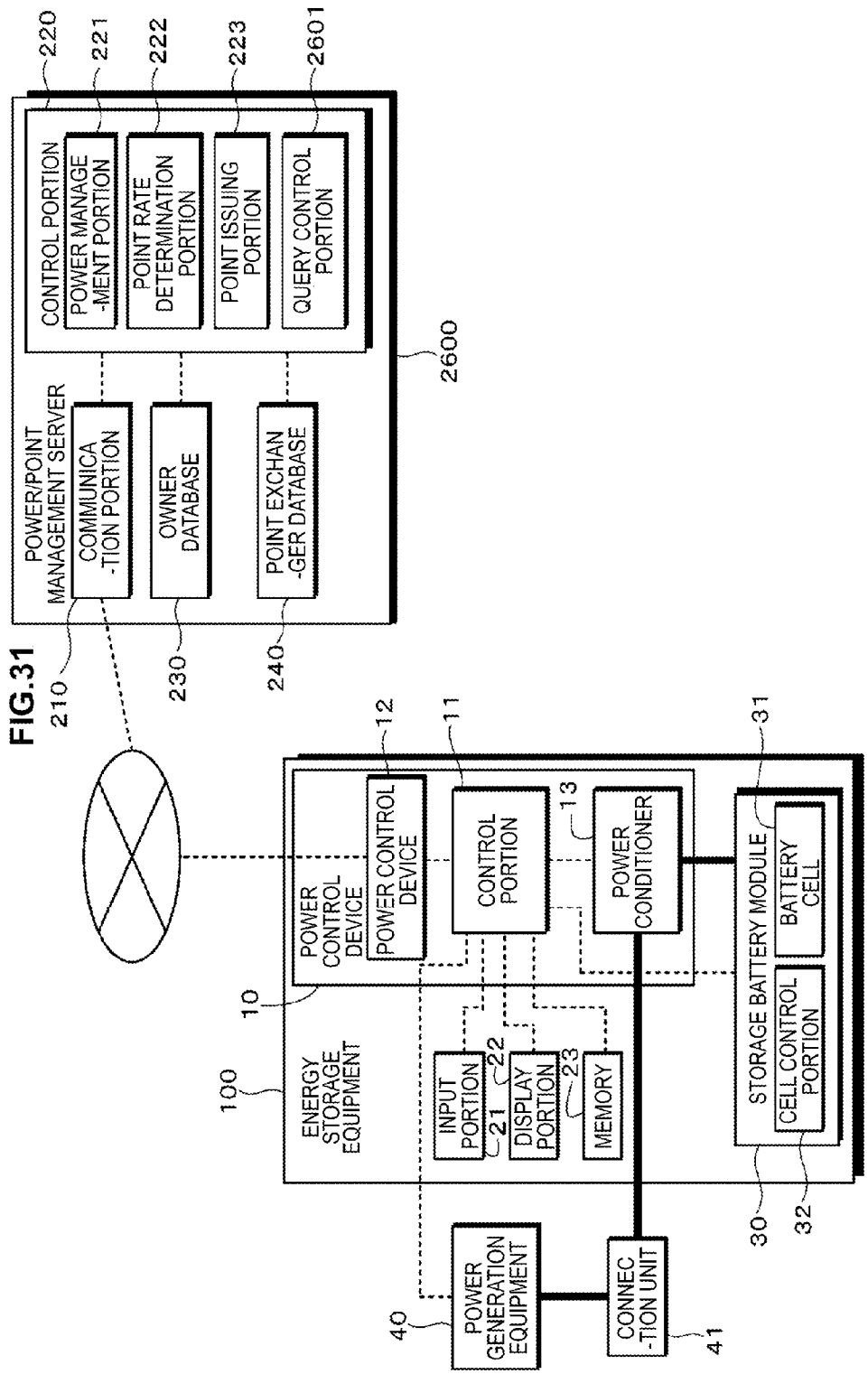
FIG. 31 is a block diagram showing a configuration of the power control device and a power/point management server according to a sixth embodiment.

Next, a sixth embodiment will be explained, which is an embodiment that addresses the threat described in section (7) above. FIG. 31 is a block diagram showing the configuration of the energy storage equipment 100 and a configuration of a power/point management server 2600 according to the sixth embodiment. The control portion 220 of the power/point management server 2600 of the sixth embodiment additionally functions as a query control portion 2601.

Based on a predetermined query schedule, the query control portion 2601 transmits a predetermined control signal to the point issuing portion 223 and thus controls issue of the command querying the stored electricity amount information performed by the point issuing portion 223. More specifically, the issue of the query command by the point issuing portion 223 is performed based on the control of the query control portion 2601.

Figure 32:
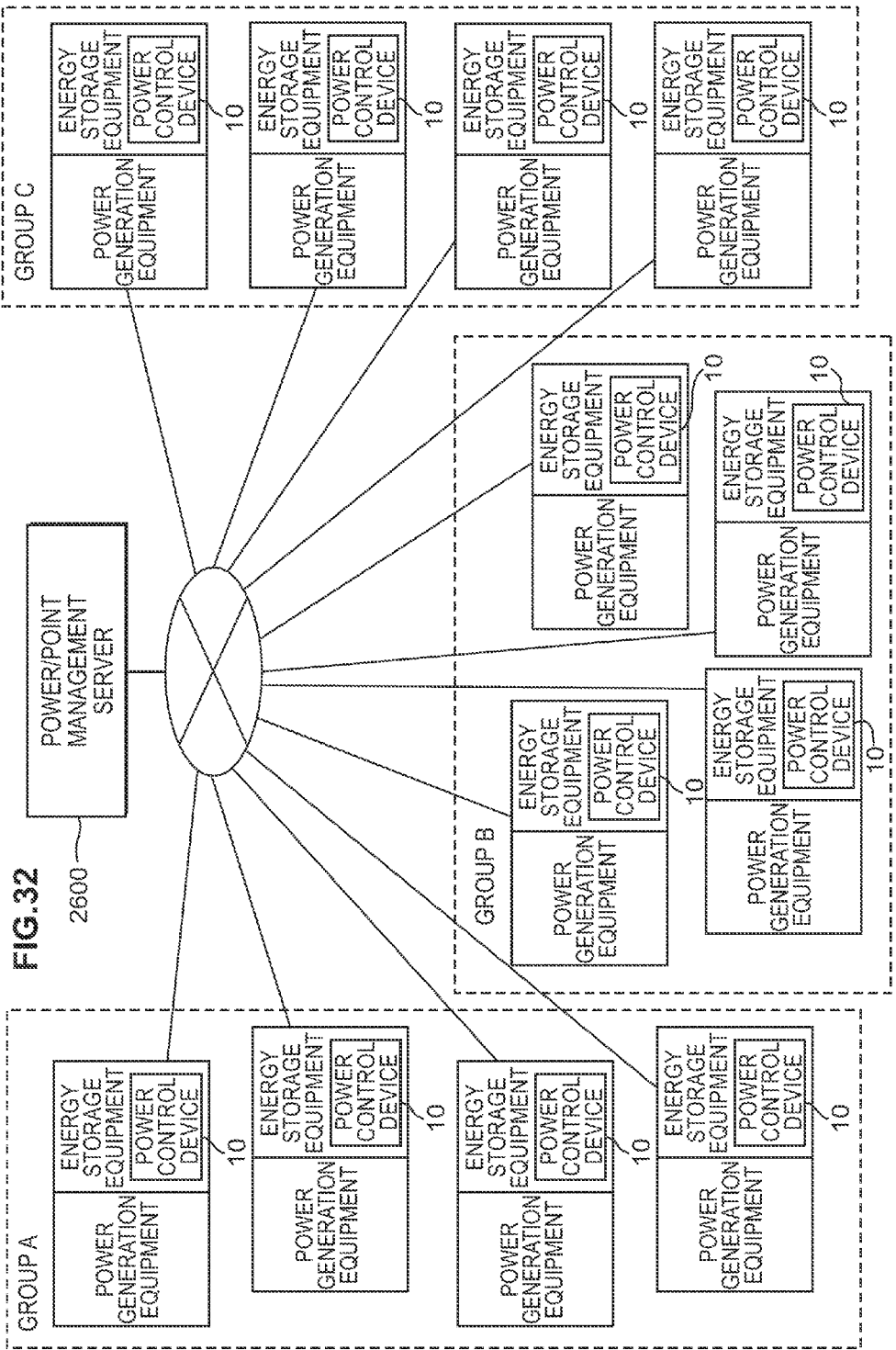
FIG. 32 is a diagram showing an example of dividing the power control devices into groups.

Based on installation addresses of the power control device 10, the energy storage equipment 100 and the power generation equipment 40 (hereinafter referred to as the power control device 10 etc.), which are included in the owner information stored in the owner database 230, the query control portion 2601 ascertains positions of the power control device 10 etc. Then, as shown in FIG. 32, based on the installation addresses etc. of the power control devices 10 etc., the power control devices 10 etc. are divided into a plurality of groups. In FIG. 32, the power control devices 10 etc. are divided into 3 groups, namely group A to group C. Then, the issue of the command that queries the stored electricity amount information is controlled such that the point issuing portion 223 issues the command per group in the order of group A, group B and then group C, for example.

Note that the number of power control devices 10 etc. included in a single group may be determined by performing load estimation based on the processing capability of the power/point management server 2600, and by setting the number such that the load does not exceed a predetermined level that is set in advance.

In the above-described manner, the query command that queries the amount of stored electricity is not transmitted simultaneously to all the power control devices 10 that are under the management of the power/point management server 2600, and are transmitted in a dispersed manner. Thus, a great quantity of the stored electricity amount information is not transmitted to the power/point management server 2600 at a single time. As a result, it is possible to disperse the load on the power/point management server 2600.

In addition, the query control portion 2601 may constantly monitor the load on the power/point management server 2600, and when the load becomes equal to or greater than the predetermined level, the query control portion 2601 may stop the query command, for example.

Further, by similar functions to those of the query control portion 2601, control may be performed when the power management portion 221 issues the various commands, such as the charge command, the discharge command and the stop command etc.

9. Seventh Embodiment

Figure 33:
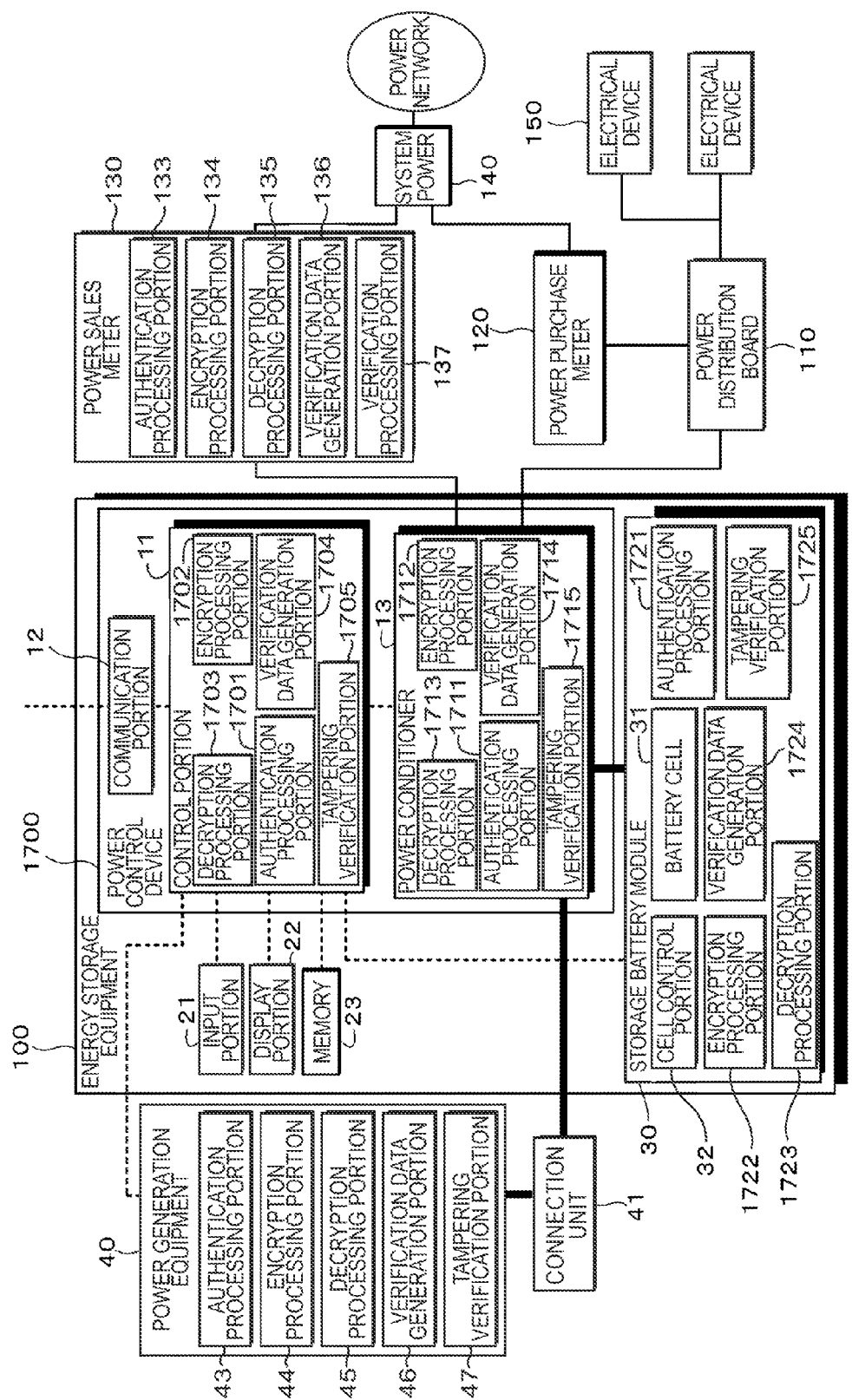
FIG. 33 is a block diagram showing a configuration of a power control device and a power/point management server according to a seventh embodiment.

Next, a seventh embodiment will be explained, which is an embodiment that addresses the threat described in section (8) above. FIG. 33 is a block diagram showing the configuration of the energy storage equipment 100 according to the seventh embodiment.

In the seventh embodiment, the control portion 11 of a power control device 1700 functions as an authentication processing portion 1701, an encryption processing portion 1702, a decryption processing portion 1703, a verification data generation portion 1704 and a verification processing portion 1705. Further, the power conditioner 13 is provided with an authentication processing portion 1711, an encryption processing portion 1712, a decryption processing portion 1713, a verification data generation portion 1714 and a verification processing portion 1715. Additionally, the storage battery module 30 is provided with an authentication processing portion 1721, an encryption processing portion 1722, a decryption processing portion 1723, a verification data generation portion 1724 and a verification processing portion 1725.

The power generation equipment 40 is also provided with an authentication processing portion 43, an encryption processing portion 44, a decryption processing portion 45, a verification data generation portion 46 and a verification processing portion 47. In addition, the power sales meter 130 is provided with an authentication processing portion 133, an encryption processing portion 134, a decryption processing portion 135, a verification data generation portion 136 and a verification processing portion 137.

The functions of the respective authentication processing portion, encryption processing portion, decryption processing portion, verification data generation portion and verification processing portion are similar to those described in the first embodiment above. Note that each portion may be realized by a CPU executing programs, or may be realized by dedicated hardware.

In the seventh embodiment, the mutual authentication is respectively performed between the control portion 11 and the power conditioner 13, between the control portion 11 and the storage battery module 30, between the control portion 11 and the power generation equipment 40 and between the control portion 11 and the power sales meter 130. The method of the mutual authentication is the same method as that described in the first embodiment above.

Further, using the same methods as described in the first embodiment above, the encryption processing and the tampering verification processing are also performed with respect to the data transmitted and received, respectively, between the control portion 11 and the power conditioner 13, the control portion 11 and the storage battery module 30, the control portion 11 and the power generation equipment 40 and the control portion 11 and the power sales meter 130.

More specifically, the encryption processing and the tampering verification processing are performed on the supply power amount (the amount of power supplied to the storage battery module 30) transmitted from the power conditioner 13 to the control portion 11, on the stored electricity amount information that is supplied from the storage battery module 30 to the control portion 11, on the generated electricity amount information that is supplied from the power generation equipment 40 to the control portion 11 and on the discharge amount information that is supplied from the power sales meter 130 to the control portion 11. However, the processing is not limited to that described above, and the encryption processing and the tampering verification processing may be performed on all of the various data and commands that are transmitted and received.

It should be noted that results indicating the success or failure of the mutual authentication between the control portion 11 and each of the other portions (the power conditioner 13, the storage battery module 30, the power generation equipment 40 and the power sales meter 130) may be transmitted to the power/point management server and the status of each thus managed.

10. Eighth Embodiment

Figure 34:
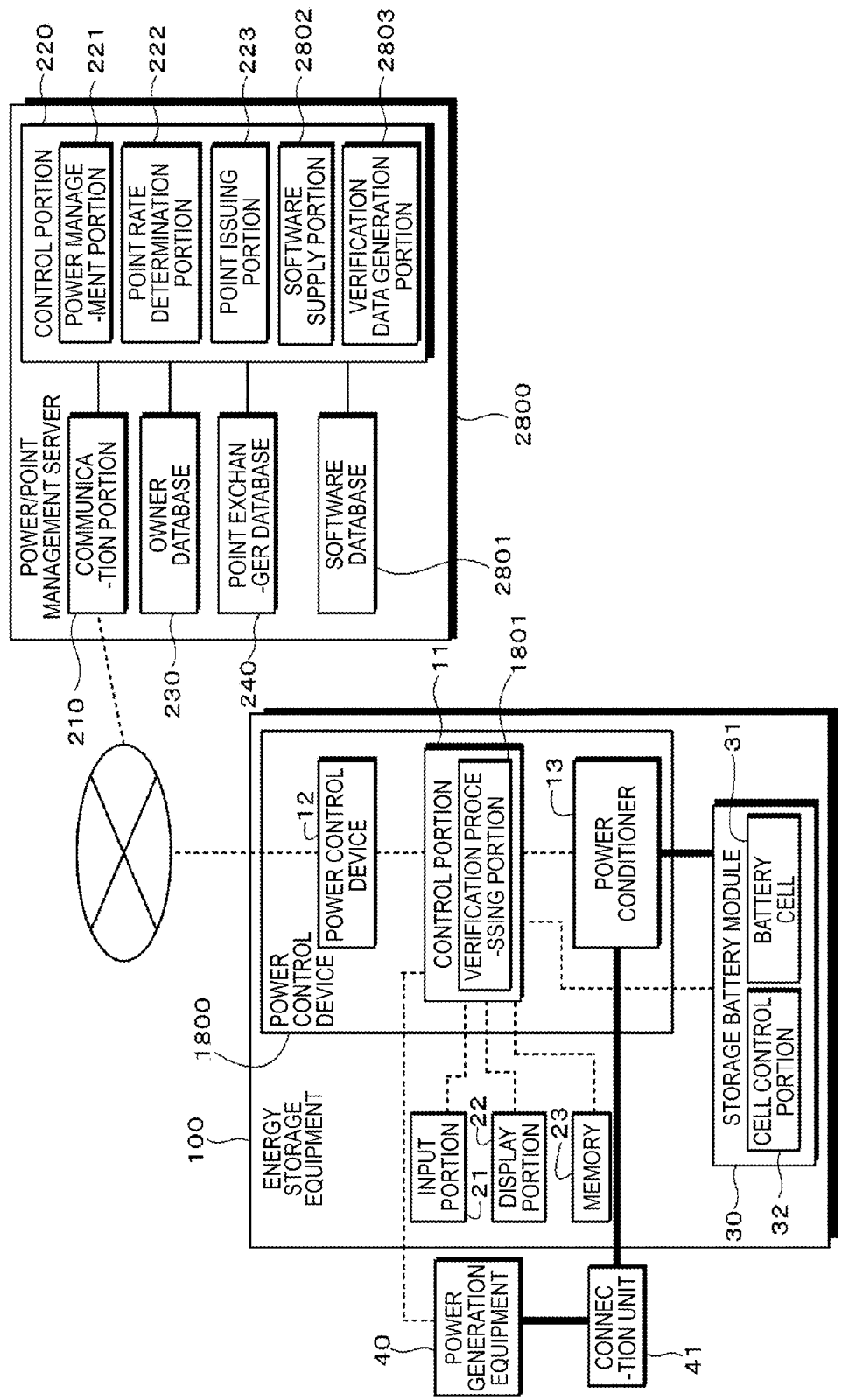
FIG. 34 is a block diagram showing a configuration of a power control device and a power/point management server according to an eighth embodiment.

Next, an eighth embodiment will be explained, which is a further embodiment that addresses the threat described in section (8) above. FIG. 34 is a block diagram showing the configuration of the energy storage equipment 100 and a configuration of a power/point management server 2800 according to the eighth embodiment. In the eighth embodiment, the power/point management server 2800 is provided with a software database 2801. Further, by executing predetermined programs, the control portion 220 functions as a software supply portion 2802 and a verification data generation portion 2803. The control portion 11 of a power control device 1800 functions as a verification processing portion 1801.

The software database 2801 stores various types of software that are used in the power control device 1800, the energy storage equipment 100 and the power generation equipment 40. In addition, update data for the stored software is also stored. Note that the software and the update data stored in the software database 2801 are supplied to the software database 2801 from a server of an external software development company or the like via the network, and are then stored in the software database 2801. Further, the software and the update data may also be uploaded to the software database 2801 by the point issuer.

The software supply portion 2802 supplies the software that is stored in the software database 2801. In accordance with a request from the power control device 1800, for example, the software supply portion 2802 selects a relevant software from among the software stored in the software database 2801. Further, the software may be supplied to the power control device 1800 based on an instruction input by the point issuer.

In addition, the software may be supplied to the power control device 1800 in accordance with a predetermined algorithm. For example, even if there is no request from the power control device 1800 that is the newly connected power control device 1800, the necessary software is supplied.

Further, when the software update data is stored in the software database 2801, the software supply portion 2802 supplies the update data to the power control device 1800.

The verification data generation portion 2803 has the same functions as those described in the first embodiment etc., and generates verification data that is used to perform tampering verification with respect to the software and the update data that is supplied by the software supply portion 2802. The generated verification data is added to the software and the update data and is transmitted to the power control device 1800.

The control portion 11 of the power control device 1800 functions as the verification processing portion 1801. The verification processing portion 1801 has the same functions as those described in the first embodiment etc., and performs tampering verification processing based on the verification data that is added to the software or the update data. For example, when the verification data is a digital signature, the verification processing portion 1801 performs the verification processing using a public key of an originator.

When a verification result by the verification processing portion 1801 indicates that the software or the update data has not been tampered with and is valid, the control portion 11 of the power control device 1800 installs and uses the software supplied from the power/point management server 2800. Further, an update is performed using the update data. Then, when the software is to be used on portions other than the control portion 11, such as the power conditioner 13 and the power generation equipment 40 etc., the software or the update data is supplied to each of the portions via the control portion 11.

In this way, the software used on the power control device 1800 and the energy storage equipment 100 etc. is limited to the valid software only, and it is thus possible to inhibit the problem described in section (8) above, namely, to inhibit analysis etc. of the power control device 1800 and the energy storage equipment 100 etc.

11. Ninth Embodiment

11.1 Configuration of Power/Point Management Server

Figure 35:
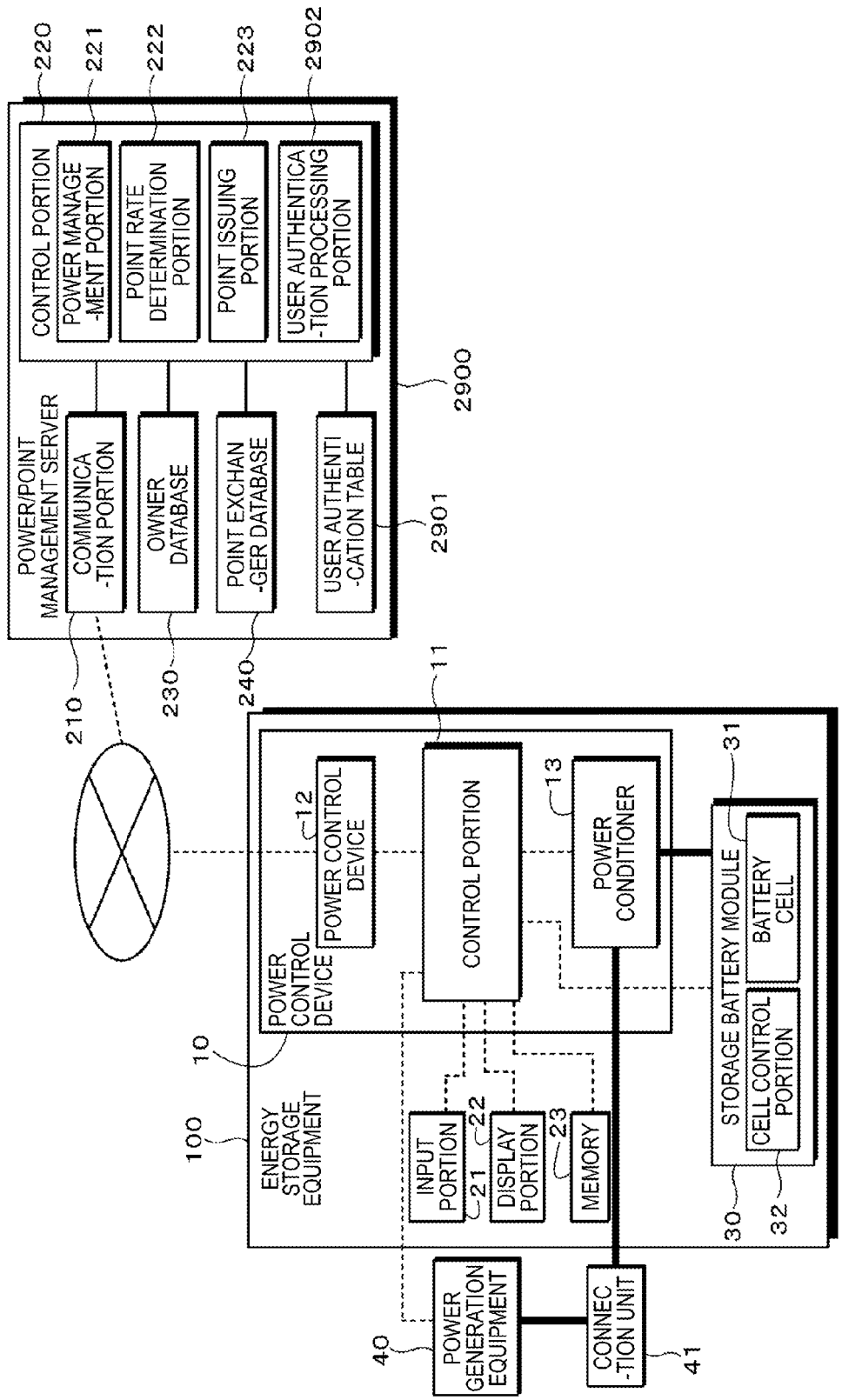
FIG. 35 is a block diagram showing a configuration of the power control device and a power/point management server according to a ninth embodiment.

Next, a ninth embodiment will be explained, which is an embodiment that addresses the threat described in section (9) above. FIG. 35 is a block diagram showing the configuration of the power control device 10 and a configuration of a power/point management server 2900 according to the ninth embodiment. In the ninth embodiment, the power/point management server 2900 has a user authentication table 2901, and further, the control portion 220 of the power/point management server 2900 functions as a user authentication portion 2902.

In the ninth embodiment, user authentication is performed, for example, when the energy storage equipment owner performs a setting operation to set a service utilization method for the services by the power management system. If authentication is not performed when performing the setting operation to set the service utilization method, there is a risk that a third party may make settings that are not intended by the energy storage equipment owner. However, the user authentication is not limited to when the setting operation to set the service utilization method is performed, and the user authentication may be always performed when the energy storage equipment owner performs any kind of operation with respect to the power control device 10.

The user authentication table 2901 is formed of a recording medium and stores user IDs set by users in association with passwords, as shown in FIG. 36. These pieces of information are set when use of the services by the power management system according to the present technology is started, and are stored in the user authentication table 2901. Further, the information may be stored in association with the equipment ID of the power control device 10 that is owned by the energy storage equipment owner.

The user authentication portion 2902 performs authentication processing of the energy storage equipment owner that uses the energy storage equipment 100 etc. The user authentication portion 2902 refers to the user authentication table 2901 and performs user authentication by determining whether or not an associated relationship between the user ID and the password input by the energy storage equipment owner is a match. When the associated relationship between the input user ID and the password matches that in the user authentication table 2901, it is determined that the person that has input the user ID and the password is the valid energy storage equipment owner. On the other hand, when the associated relationship between the input user ID and password does not match that in the user authentication table 2901, it is determined that the person that has input the user ID and the password is not the valid energy storage equipment owner.

11.2 Processing According to Ninth Embodiment

FIG. 37 is a sequence diagram showing a flow of user authentication processing. First, at step S901, the energy storage equipment owner accesses the power control device 10. The power control device 10 is accessed, for example, by the energy storage equipment owner using the input portion 21 to perform a predetermined input operation. Next, at step S902, by performing predetermined image display control, the control portion 11 displays a user ID and password input screen on the display portion 22, such as that shown in FIG. 38A. In response, at step S903, the energy storage equipment owner uses the input portion 21 to input the user ID and the password.

When the user ID and the password have been input, next, at step S904, the control portion 11 transmits the input user ID and password to the power/point management server 2900 via the communication portion 12. Then, the user ID and the password are supplied to the user authentication portion 2902. Note that, when the control portion 11 of the power control device 10 transmits the user ID and the password to the power/point management server 2900 via the communication portion 12, the control portion 11 may cause the display portion 22 to display a display screen, such as the one shown in FIG. 38B, that indicates to the energy storage equipment owner that the authentication is being performed.

Next, at step S905, the user authentication portion 2902 determines whether or not a combination of the supplied user ID and password matches that in the user authentication table 2901. Then, at step S906, the user authentication portion 2902 transmits to the power control device 10 data that indicates an authentication result. When the user authentication portion 2902 determines that the combination of the user ID and the password matches that in the user authentication table 2901, the user authentication portion 2902 transmits data indicating that the valid energy storage equipment owner has been authenticated to the power control device 10. Then, by performing predetermined image display control, the control portion 11 of the power control device 10 displays a service utilization method setting screen on the display portion 22, such as the one shown in FIG. 38C.

On the other hand, when it is determined that the combination of the user ID and the password does not match that in the user authentication table 2901, the user authentication portion 2902 transmits data indicating that the valid energy storage equipment owner cannot be authenticated to the power control device 10. Then, by performing predetermined display control, the control portion 11 causes the display portion 22 to display a screen, such as the one shown in FIG. 38D, that prompts the energy storage equipment owner to once more input the user ID and the password. Note that the images shown in FIG. 38A to FIG. 38D are examples only and the images displayed on the display portion 22 are not limited to those examples.

The user authentication processing is performed using the password in this way. Note that the user authentication is not limited to using the password. For example, biometric authentication may be adopted, using a fingerprint, a voice print, vein patterns, a retina and the like. Note that, when using the biometric authentication, it is necessary for the power control device 10 to be provided with sensors, cameras etc. to acquire information used in the authentication of the fingerprint etc.

From the point of view of security, it is preferable for the user authentication processing to be performed apart from when setting the service utilization method. For example, the user authentication processing may also be performed when the energy storage equipment owner uses the terminal device 50 to access the power control device 10 from outside, as described above with reference to FIG. 2. In this way, it is possible to inhibit fraudulent access by a third party other than the energy storage equipment owner.

When the power control device 10 is accessed from outside using the terminal device 50, first, a user ID and password input screen, such as the one shown in FIG. 38A, is displayed on a display portion of the terminal device 50. Then, authentication processing is performed similarly to the above-described authentication processing. Access is only allowed when it is verified that the energy storage equipment owner is valid. In this way, it is possible for the energy storage equipment owner to verify a stored electricity status, a discharge status etc., and to set the operation mode and so on when away from home.

It should be noted that the present technology is not limited to the configurations of the first embodiment to the ninth embodiment, and the configurations of the first embodiment to the ninth embodiment may be combined in any manner.

12. Effects of Present Technology

Currently, the electricity market is limited to bulk trading, and it is not possible to participate in the electricity market, for example, with the amount of electricity that is stored in this type of the small-scale energy storage equipment 100 that is installed in a general household. For example, a trading unit on the Japan Electric Power Exchange is 1000 kW of electric power and 30 minutes of time. Therefore, a minimum amount of power that can be traded is 500 kWh. Meanwhile, a storage capacity of household storage batteries is a maximum of around several tens of kWh, and output is around several kW at most. As a result, it is difficult for general households to individually participate in the electricity market, even if the use of power generation equipment and energy storage equipment increases in general households etc. This is one factor preventing participation in the electricity market.

With the present technology, it is preferable for the point issuer who has the power/point management server 200 to have under its management a plurality of the energy storage equipment owners who own the power generation equipment 40 and the energy storage equipment 100. Then, the electricity trading between the plurality of the energy storage equipment 100 and the electricity market is performed under the management of the power/point management server 200. By bundling a plurality of electricity trades in this manner, an electricity trading volume is larger, and it is as if bulk trading is being performed. As a result, even when it is difficult to participate in the electricity market through small lot trading, bulk trading under advantageous conditions is made possible by bundling together a plurality of the energy storage equipment owners.

The energy storage equipment owner owns the energy storage equipment 100, but the electricity supply control of the energy storage equipment 100 is performed based on management instructions of the power/point management server 200. Then, the power/point management server 200 performs the sale and purchase of electricity based on the electricity price in the electricity market. In addition, the energy storage equipment owner is issued with points in accordance with the amount of stored electricity. Thus, the energy storage equipment owner can obtain a profit through points in accordance with the amount of stored electricity, without concern for the electricity price in the electricity market and without taking on any price fluctuation risk. In this way, as it is possible to suppress the price fluctuation risk of the electricity price with respect to the energy storage equipment owner, the adoption of power generation equipment and energy storage equipment throughout society can be encouraged.

Further, until now, even when corporations and households consider the adoption of power generation equipment utilizing natural energies, in order to contribute to the environment, due to poor conditions for installation (a ratio of clear skies is too low for photovoltaic power generation, wind is too weak or too strong for wind power generation etc.), there are cases in which it seems that the adoption of natural energy power generation equipment is not economically viable and the adoption of the power generation equipment is abandoned. However, even if the adoption of the natural energy power generation equipment does not seem economically viable, by adopting the power management system according to the present technology instead, it is possible to reduce economic risk. It is thus possible to encourage the adoption of power generation equipment and energy storage equipment. Further, as a result of the spread of the power management system according to the present technology, it is possible to contribute to load leveling of power plants and to reduce an environmental load of society as a whole.

Additionally, with the present technology, the point issuer can raise profits by selling the electricity at an appropriate timing and at an appropriate price. Therefore, by using the system according to the present technology, the point issuer can cover system operation costs.

Further, by using the present technology, the goods/services provider that provides the goods and services can also obtain large profits. In general, products and services that take into account the environment are relatively high in price compared to normal products and services. It is thought that customers who have a high environmental awareness will be the customers who purchase these relatively high-priced products and services.

As it can be assumed that the energy storage equipment owner participating in the system according to the present technology is highly environment-conscious, if a company that wishes to sell environment-friendly products and services becomes the goods/services provider, an increase in sales can be expected. Further, even if it is the company that does not handle environment-friendly products and services, participation in the system according to the present technology is, in itself, a contribution to environmental activities, and thus the company can promote itself to society as being environmentally conscious.

The present technology achieves various effects, such as those described above, and as it is possible to confer profits on each party participating in the system according to the present technology, it is possible to encourage the adoption of energy storage equipment.

13. Modified Examples

Hereinabove, the embodiments of the present technology are specifically explained. It should be understood by those skilled in the art that various modifications, combinations, sub-combinations and alterations may occur depending on design requirements and other factors insofar as they are within the scope of the appended claims or the equivalents thereof.

The present technology can also take the following configurations.

(1) A power control device that, together with a storage battery, forms energy storage equipment, the power control device including:
 a communication portion that communicates with a power management device that manages charge and discharge of the storage battery;
 a power conditioner that supplies electricity to a predetermined destination for supply;
 a control portion that controls operation of the power conditioner based on instructions from the power management device that are received by the communication portion; and
 an authentication processing portion that performs authentication processing with the power management device.

(2) The power control device according to (1), further including:
 at least one of an encryption processing portion and a verification data generation portion, when authentication by the authentication processing portion is successful, the encryption processing portion encrypting communication with the power management device and the verification data generation portion generating verification data used to verify whether content of the communication with the power management device has been tampered with,
 wherein the communication portion transmits the verification data to the power management device.

(3) A power management device including:
 a reception portion that receives stored electricity amount information indicating an amount of stored electricity in a storage battery, the stored electricity amount information being transmitted from a power control device that forms energy storage equipment together with the storage battery;
 a point issuing portion that issues points with respect to each of the energy storage equipment in accordance with the amount of stored electricity indicated by the stored electricity amount information; and
 an identification information database that stores identification information corresponding to the power control device.

(4) A power control device that, together with a storage battery, forms energy storage equipment, the power control device including:
 a reception portion that receives instructions from a power management device that manages charge and discharge of the storage battery;
 a power conditioner that supplies electricity to a predetermined destination for supply;
 a control portion that controls operation of the power conditioner based on the instructions from the power management device;
 an identifier generation portion that generates a predetermined identifier; and
 a transmission portion that transmits stored electricity amount information indicating an amount of stored electricity in the storage battery together with the identifier to the power management device.

(5) The power control device according to (4), wherein
 the identifier generation portion generates time information by measuring a time.

(6) The power control device according to any one of (1) to (5), wherein
 the time information indicates a time of a time point at which a query about the stored electricity amount information is received from the power management device.

(7) A power management device including:
 a reception portion that receives stored electricity amount information indicating an amount of stored electricity in a storage battery and a predetermined identifier, the stored electricity amount information and the predetermined identifier being transmitted from a power control device that forms energy storage equipment together with the storage battery;
 a point issuing portion that performs a query, with respect to the power control device, about the stored electricity amount information indicating the amount of stored electricity in the storage battery, and issues points with respect to each of the energy storage equipment in accordance with the amount of stored electricity indicated by the stored electricity amount information; and
 an identifier verification portion that verifies validity of the stored electricity amount information based on the identifier.

(8) The power management device according to (7), further including:
 a time measurement portion that generates time information by measuring a time;
 wherein the predetermined identifier indicates a time, and
 wherein the identifier verification portion verifies the validity of the stored electricity amount information by comparing the time information generated by the time measurement portion with the predetermined identifier.

(9) The power management device according to (7) or (8), wherein
 the time information indicates a time at which the query about the stored electricity amount information is performed by the point issuing portion with respect to the power control device.

(10) A power control device that, together with a storage battery, forms energy storage equipment, the power control device including:
 a reception portion that receives instructions from a power management device that manages charge and discharge of the storage battery;
 a power conditioner that supplies electricity to a predetermined destination for supply;
 a control portion that controls operation of the power conditioner based on the instructions from the power management device;
 a power determination portion that determines whether an amount of stored electricity in the storage battery and a supply power amount from the power conditioner to the storage battery satisfy predetermined conditions; and a transmission portion that transmits, to the power management device, stored electricity amount information indicating the amount of stored electricity in the storage battery and determination result information indicating a determination result by the power determination portion.

(11) The power control device according to (10), further including:

an encryption processing portion that encrypts the stored electricity amount information and the determination result information.

(12) The power control device according to (10) or (11), further including:

a verification data generation portion that generates verification data used to verify whether the stored electricity amount information and the determination result information have been tampered with;

wherein the transmission portion transmits the verification data together with the stored electricity amount information and the determination result information.

(13) A power management device including:

a reception portion that receives stored electricity amount information and determination result information transmitted from a power control device, the power control device forming energy storage equipment with a storage battery and the power control device including a reception portion that receives instructions from the power management device that manages charge and discharge of the storage battery, a power conditioner that supplies electricity to a predetermined destination for supply, a control portion that controls operation of the power conditioner based on the instructions from the power management device, a power determination portion that determines whether an amount of stored electricity in the storage battery and a supply power amount from the power conditioner to the storage battery satisfy predetermined conditions, and a transmission portion that transmits, to the power management device, the stored electricity amount information indicating the amount of stored electricity in the storage battery and the determination result information indicating a determination result by the power determination portion; and a point issuing portion that issues points with respect to each of the energy storage equipment in accordance with the amount of stored electricity indicated by the stored electricity amount information when the determination result information satisfies the predetermined conditions.

(14) The power management device according to (13), further including:

at least one of a decryption processing portion and a verification processing portion, the decryption processing portion decrypting the stored electricity amount information and the determination result information that are encrypted and transmitted, and the verification processing portion verifying whether the stored electricity amount information and the determination result information have been tampered with, based on verification data that is transmitted together with the stored electricity amount information and the determination result information.

(15) A power control device that, together with a storage battery, forms energy storage equipment, the power control device including:

a reception portion that receives instructions from a power management device that manages charge and discharge of the storage battery;

a power conditioner that is connected to a discharge meter and that supplies electricity to a predetermined destination for supply, the discharge meter measuring an amount of discharge to a power network;

a control portion that controls operation of the power conditioner based on the instructions from the power management device; and a power determination portion that determines whether an amount of electricity output from the power conditioner to the discharge meter and the amount of electricity that is output to the power network via the discharge meter satisfy predetermined conditions.

(16) A power management device including:

a reception portion that receives stored electricity amount information indicating an amount of stored electricity in a storage battery, the stored electricity amount information being transmitted from a plurality of power control devices that each form, together with the storage battery, energy storage equipment;

a point issuing portion that performs a query, with respect to the plurality of power control devices, about the stored electricity amount information, and issues points with respect to each of the power control devices in accordance with the amount of stored electricity indicated by the stored electricity amount information that is received by the reception portion; and a query control portion that controls the query by the point issuing portion about the stored electricity amount information.

(17) The power management device according to (16), wherein the query control portion divides the plurality of power control devices into a plurality of groups, and controls the query by the point issuing portion about the stored electricity amount information such that the query about the stored electricity amount information is performed per each of the groups.

(18) A power management device including:

a reception portion that receives stored electricity amount information indicating an amount of stored electricity in a storage battery, the stored electricity amount information being transmitted from a power control device that forms energy storage equipment together with the storage battery;

a point issuing portion that issues points with respect to each of the energy storage equipment in accordance with the amount of stored electricity indicated by the stored electricity amount information;

a software database that stores software;

a verification data generation portion that generates tampering verification data that is used to verify whether software supplied to the power control device, from among the software stored in the software database, has been tampered with; and a software supply portion that supplies the tampering verification data and the software stored in the software database to the power control device.

(19) A power control device that, together with a storage battery, forms energy storage equipment, the power control device including:

a reception portion that receives instructions from a power management device that manages charge and discharge of the storage battery;

a power conditioner that supplies electricity to a predetermined destination for supply;

a control portion that controls operation of the power conditioner based on the instructions from the power management device;

an input portion that receives an input of authentication information from a user; and a transmission portion that transmits the authentication information to the power management device.

(20) A power management device including:

a communication portion that receives stored electricity amount information and authentication information that are transmitted from a power control device that forms energy storage equipment together with a storage battery, the stored electricity amount information indicating an amount of stored electricity in the storage battery and the authentication information being input on the power control device by a user;

a point issuing portion that issues points for each of the energy storage equipment in accordance with the amount of stored electricity indicated by the stored electricity amount information; and a user authentication portion that performs authentication of the user based on the authentication information.

(21) A power management system including:

a power control device, which forms energy storage equipment together with a storage battery; and a power management device, wherein the power control device includes a first communication portion that communicates with the power management device and transmits stored electricity amount information indicating an amount of stored electricity in the storage battery, a power conditioner that supplies electricity to a predetermined destination for supply, a control portion that controls operation of the power conditioner, and a first authentication processing portion that performs authentication processing with the power management device, and wherein the power management device includes a second communication portion that communicates with the power control device and receives the stored electricity amount information, a point issuing portion that issues points for each of the energy storage equipment in accordance with the amount of stored electricity indicated by the stored electricity amount information, and a second authentication processing portion that performs the authentication processing with the power control device.

The present disclosure contains subject matter related to that disclosed in Japanese Priority Patent Application JP 2011-125379 filed in the Japan Patent Office on Jun. 3, 2011, the entire content of which is hereby incorporated by reference.

What is claimed is:

1. A power control device that, together with a storage battery, forms energy storage equipment, the power control device comprising:

a reception portion that receives instructions from a power management device that manages charge and discharge of the storage battery;

a power conditioner that supplies electricity to a predetermined destination for supply;

a control portion that controls operation of the power conditioner based on the instructions from the power management device;

a power determination portion that determines whether an amount of stored electricity in the storage battery and a supply power amount from the power conditioner to the storage battery satisfy predetermined conditions; and a transmission portion that transmits, to the power management device, stored electricity amount information indicating the amount of stored electricity in the storage battery and determination result information indicating a determination result by the power determination portion.

2. The power control device according to claim 1, further comprising:

an encryption processing portion that encrypts the stored electricity amount information and the determination result information.

3. The power control device according to claim 1, further comprising:

a verification data generation portion that generates verification data used to verify whether the stored electricity amount information and the determination result information have been tampered with;

wherein the transmission portion transmits the verification data together with the stored electricity amount information and the determination result information.

4. A power management device comprising:

a reception portion that receives stored electricity amount information and determination result information transmitted from a power control device, the power control device forming energy storage equipment with a storage battery and the power control device including a reception portion that receives instructions from the power management device that manages charge and discharge of the storage battery, a power conditioner that supplies electricity to a predetermined destination for supply, a control portion that controls operation of the power conditioner based on the instructions from the power management device, a power determination portion that determines whether an amount of stored electricity in the storage battery and a supply power amount from the power conditioner to the storage battery satisfy predetermined conditions, and a transmission portion that transmits, to the power management device, the stored electricity amount information indicating the amount of stored electricity in the storage battery and the determination result information indicating a determination result by the power determination portion; and a point issuing portion that issues points with respect to each of the energy storage equipment in accordance with the amount of stored electricity indicated by the stored electricity amount information when the determination result information satisfies the predetermined conditions.

5. The power management device according to claim 4, further comprising:

at least one of a decryption processing portion and a verification processing portion, the decryption processing portion decrypting the stored electricity amount information and the determination result information that are encrypted and transmitted, and the verification processing portion verifying whether the stored electricity amount information and the determination result information have been tampered with, based on verification data that is transmitted together with the stored electricity amount information and the determination result information.

* * * * *